United States Patent [19]
Wright et al.

[11] Patent Number: 5,549,111
[45] Date of Patent: Aug. 27, 1996

[54] METHOD AND APPARATUS FOR ADJUSTABLE FREQUENCY SCANNING IN ULTRASOUND IMAGING

[75] Inventors: J. Nelson Wright, Menlo Park; Christopher R. Cole, Cupertino; Albert Gee, Los Altos; Hugh G. Larsen, Los Altos Hills; Samuel H. Maslak, Woodside, all of Calif.

[73] Assignee: Acuson Corporation, Mountainview, Calif.

[21] Appl. No.: 432,868

[22] Filed: May 2, 1995

Related U.S. Application Data

[63] Continuation-in-part of Ser. No. 286,524, Aug. 5, 1994.
[51] Int. Cl.$^6$ .................................................. A61B 8/00
[52] U.S. Cl. .................................................. 128/742; 73/642
[58] Field of Search .................... 128/660.07, 660.08, 128/660.09, 661.01; 73/612, 628, 642, 609; 348/607, 608, 609, 610, 611

[56] References Cited

U.S. PATENT DOCUMENTS

| | | | |
|---|---|---|---|
| 3,805,596 | 4/1974 | Klahr | 73/67.8 |
| 3,872,498 | 3/1975 | Pritchard | 348/609 |
| 3,924,454 | 12/1975 | McElroy et al. | 73/628 |
| 4,140,022 | 2/1979 | Maslak | 73/626 |
| 4,413,520 | 11/1983 | Murakami et al. | 73/609 |
| 4,442,715 | 4/1984 | Brisken et al. | 73/626 |
| 4,534,221 | 8/1985 | Fife et al. | 73/626 |
| 4,542,653 | 9/1985 | Liu | 128/660 |
| 4,550,607 | 11/1985 | Maslak et al. | 73/626 |
| 4,569,231 | 2/1986 | Carnes et al. | 73/626 |
| 4,631,710 | 12/1986 | Yamaguchi et al. | 367/103 |
| 4,638,467 | 1/1987 | Takeuchi | 367/105 |
| 4,676,105 | 6/1987 | Matzuk | 128/660.07 |
| 4,699,009 | 10/1987 | Maslak et al. | 73/626 |

(List continued on next page.)

OTHER PUBLICATIONS

*Beamforming,* Dan E. Dudgeon & Russell M. Mersereau, *Multidimensional Digital Signal Processing,* Section 6.2, Prentice Hall, 1984.
*Digital Signal Processing for Sonar,* William C. Knight, Roger G. Pridham, Steven M. Kay, *Proceedings of the IEEE,* vol. 69, No. 11, Nov., 1981.
*Fundamentals of Digital Array Processing,* Dan E. Dudgeon, *Proceedings of the IEEE,* vol. 65, No. 6, Jun. 1977.
*Digital Beamforming Antennas; An Introduction,* Hans Steyskal *Microwave Journal,* Jan. 1987.
*Acoustic Imaging for Nondestructive Evaluation,* Gordon S. Kino, *Proceedings of the IEEE,* vol. 67, pp. 510–525, Apr., 1979.

(List continued on next page.)

*Primary Examiner*—George Manuel
*Attorney, Agent, or Firm*—Brinks Hofer Gilson & Lione

[57] ABSTRACT

Method for scanning a field of view using a scan format, wherein the carrier frequency of the imaging pulse is higher in the center of the field of view than at the edges. The frequency variation can be accomplished on transmit by modulating appropriately delayed programmable initial waveform information samples with a programmable carrier frequency. This results in a pulse transmitted into the body whose frequency is highest in the center portion of the scan, and is reduced in a controlled fashion as the steering angle is increased in order to mitigate grating lobe artifacts. The technique preserves signal energy because modulation merely translates the signal in frequency substantially without modification of the pulse shape itself. The technique is also useful on receive, wherein demodulation to or near baseband followed by post-beamformation pre-detection remodulation can correct for systematic scan-line-to-scan-line phase variations to ensure scan-line-to-scan-line phase coherency for subsequent coherent processing across scan lines or for coherent image formation using the phase and amplitude information from multiple beams.

80 Claims, 21 Drawing Sheets

Microfiche Appendix Included
(19058 Microfiche, 195 Pages)

U.S. PATENT DOCUMENTS

| | | | |
|---|---|---|---|
| 4,733,562 | 3/1988 | Saugeon | 73/626 |
| 4,809,184 | 2/1989 | O'Donnell et al. | 364/413.25 |
| 4,839,652 | 6/1989 | O'Donnell et al. | 341/122 |
| 4,881,190 | 11/1989 | Praitko et al. | 364/718 |
| 4,886,069 | 12/1989 | O'Donnell | 128/661.01 |
| 4,893,284 | 1/1989 | Magrane | 367/12 |
| 4,896,287 | 1/1990 | O'Donnell et al. | 364/754 |
| 4,975,885 | 12/1990 | Hassler et al. | 367/7 |
| 4,983,970 | 1/1991 | O'Donnell et al. | 341/122 |
| 5,005,419 | 4/1991 | O'Donnell et al. | 73/626 |
| 5,014,710 | 5/1991 | Maslak et al. | 128/660.05 |
| 5,111,695 | 5/1992 | Engeler et al. | 73/626 |
| 5,142,649 | 8/1992 | O'Donnell | 367/7 |
| 5,148,810 | 9/1992 | Maslak et al. | 128/661.01 |
| 5,165,413 | 11/1992 | Maslak et al. | 128/660.05 |
| 5,203,823 | 4/1993 | Wadaka et al. | 73/602 |
| 5,230,340 | 7/1993 | Rhyne | 128/661.01 |
| 5,235,982 | 8/1993 | O'Donnell | 128/660.07 |
| 5,235,986 | 8/1993 | Maslak et al. | 128/661.01 |
| 5,249,578 | 10/1993 | Karp et al. | 128/661.01 |
| 5,261,280 | 11/1993 | Matzuk | 73/602 |
| 5,261,408 | 11/1993 | Maslak et al. | 128/661.01 |
| 5,301,168 | 4/1994 | Miller | 367/11 |
| 5,325,858 | 7/1994 | Morizumi | 128/660.07 |
| 5,360,007 | 11/1994 | Shinomura et al. | 128/661.01 |

OTHER PUBLICATIONS

*Underwater Acoustic Imaging*, Jerry L. Sutton, *Proceedings of the IEEE*, vol. 67, pp. 554–556, Apr., 1979.

*Grating Lobe Reduction in Ultrasonic Synthetic Focusing*, M. H. Bae, I. H. Sohn and S. E. Park, *Electronic Letters*, vol. 27, No. 14, Jul. 4, 1991.

*Digital Beamforming for Radar*, P. Barton, *Proceedings of the IEEE*, vol. 127, pt. F, No. 4, Aug. 1980.

*A Digital Synthetic Focus Acoustic Imaging System*, P. D. Carl, G. S. Kino, C. S. Desilets, and P. M. Grant, *Acoustic Imaging*, vol. 8, 1978.

*Digital Beamforming in Ultrasound*, B. D. Steinberg, *IEEE Transactions of Ultrasonics, Ferroelectronics, and Frequency Control*, vol. 39, Nov. 1992.

*Multirate Digital Signal Processing*, Ronald E. Crochiere and Lawrence R. Rabiner, Prentice–Hall, 1983.

*Digital Signal Processing Applications Using the ADSP–2100 Family*, vol. 1, Amy Mar, ed., Prentice–Hall, 1992.

*A Novel Approach to Digital Beamforming*, Roger Pridham and Ronald A. Mucci, *Journal of the Acoustical Society of America*, vol. 63, Feb. 1978.

*Digital Interpolation Beamforming for Low Pass and Band Pass Signals*, Roger G. Pridham and Ronald A. Mucci, *Proceedings of the IEEE*, vol. 67, Jun. 1979.

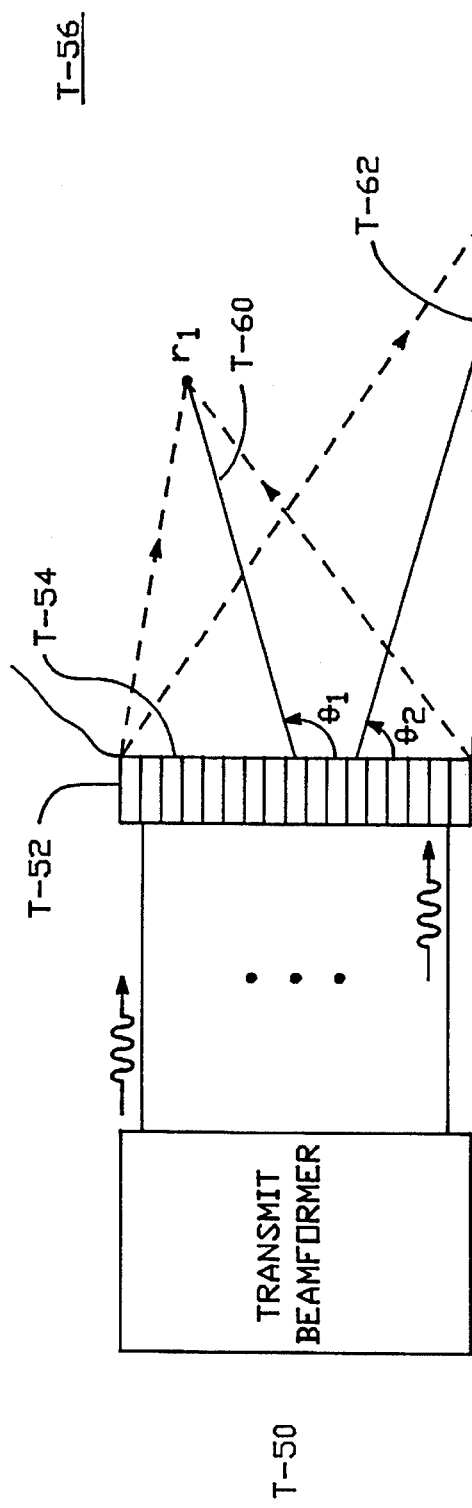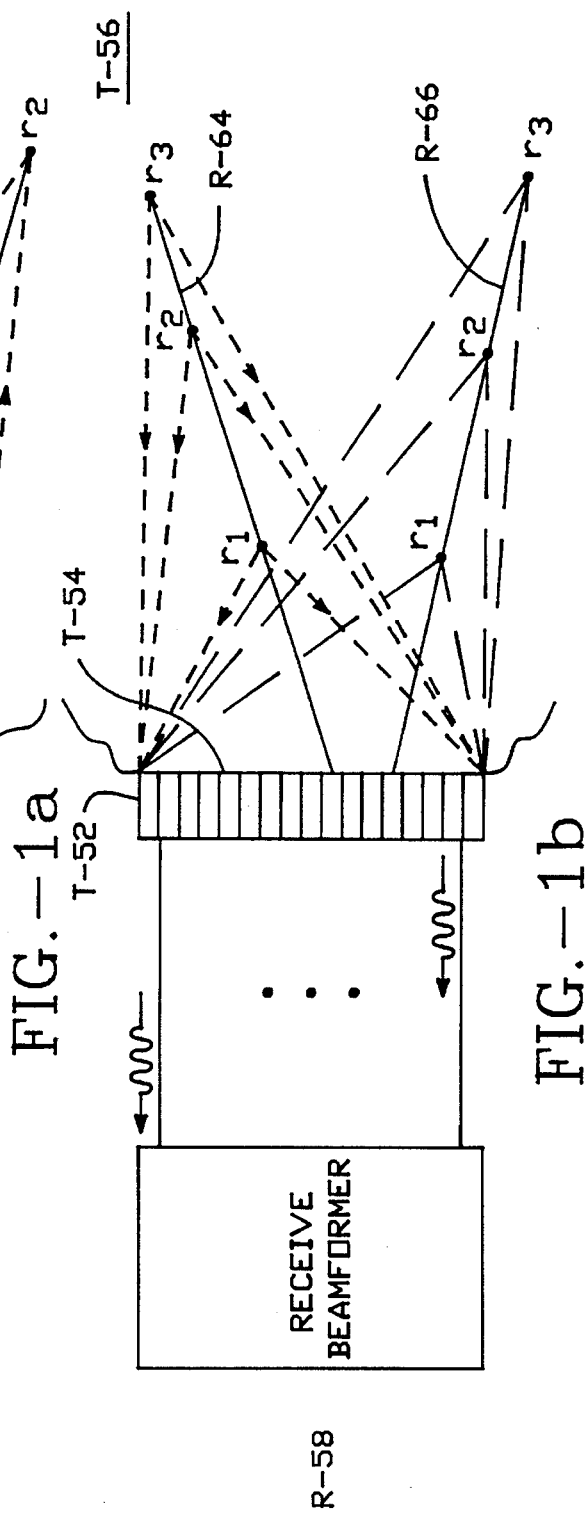
FIG.-1a
FIG.-1b

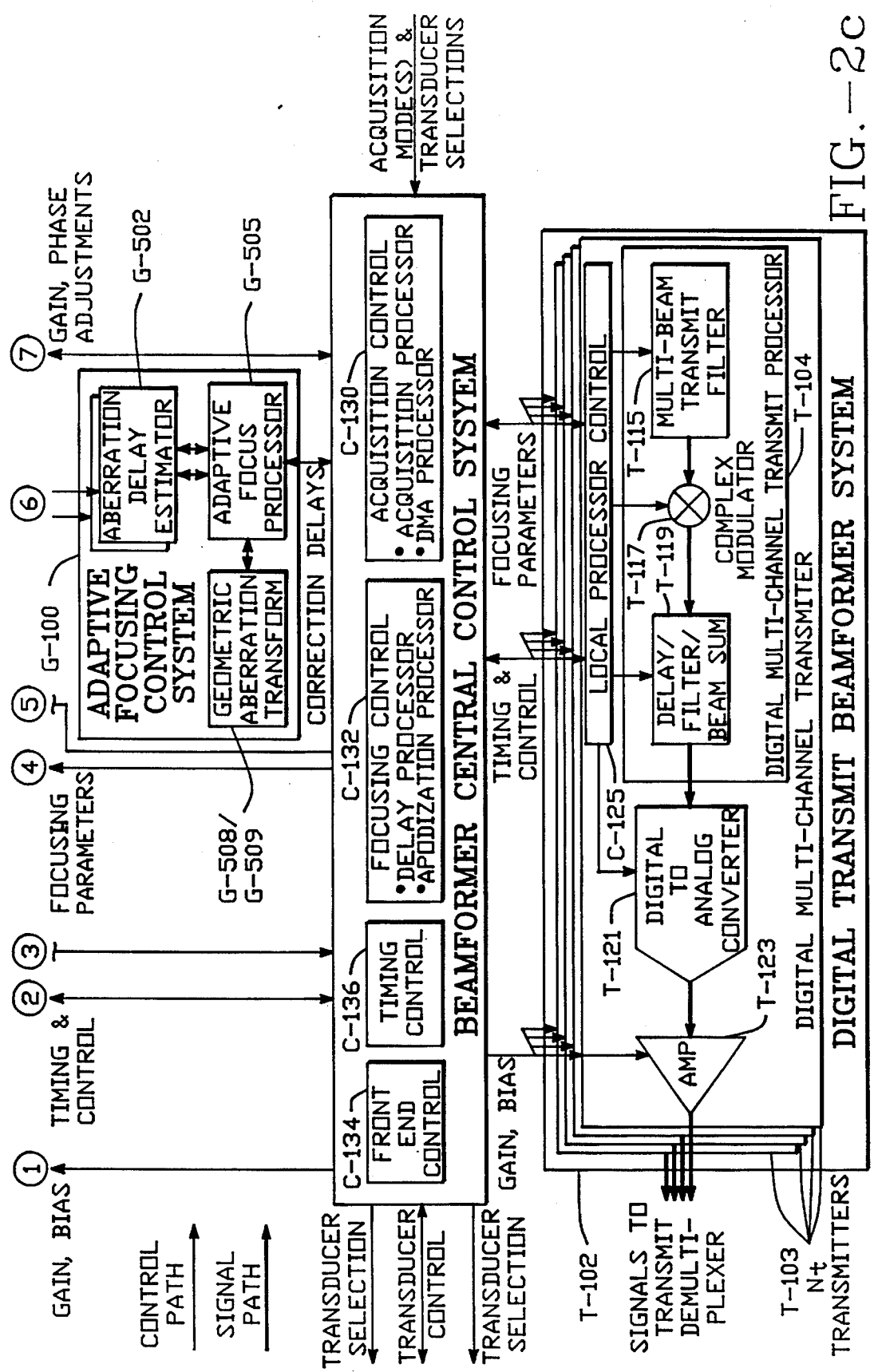

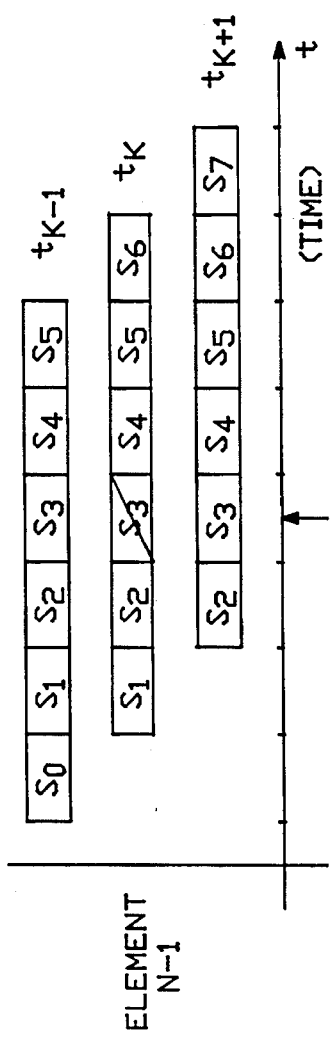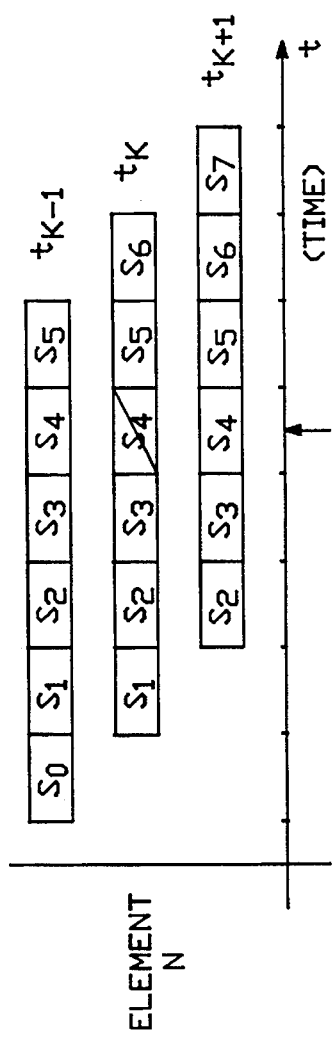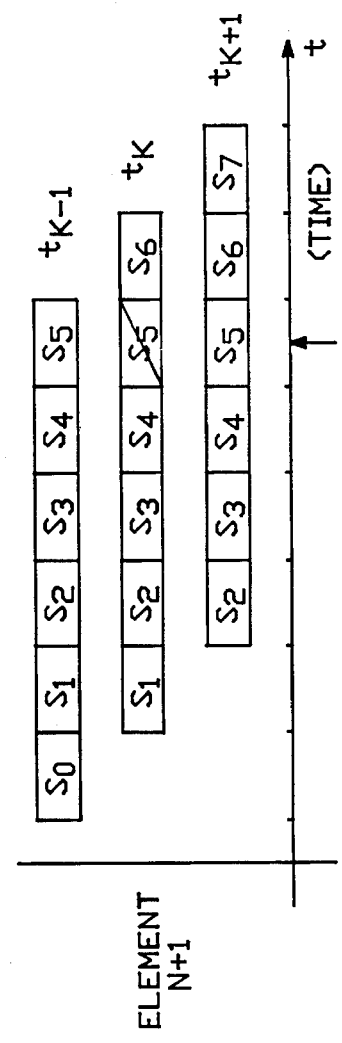

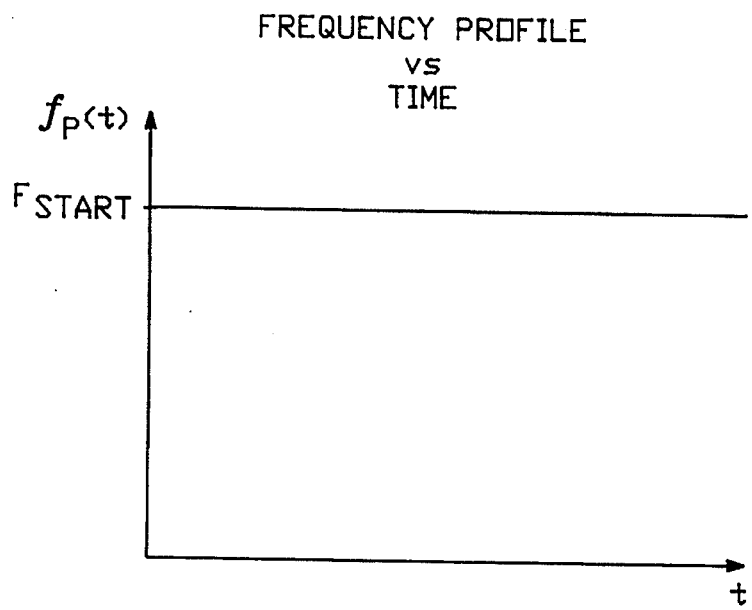
FIG.—18a
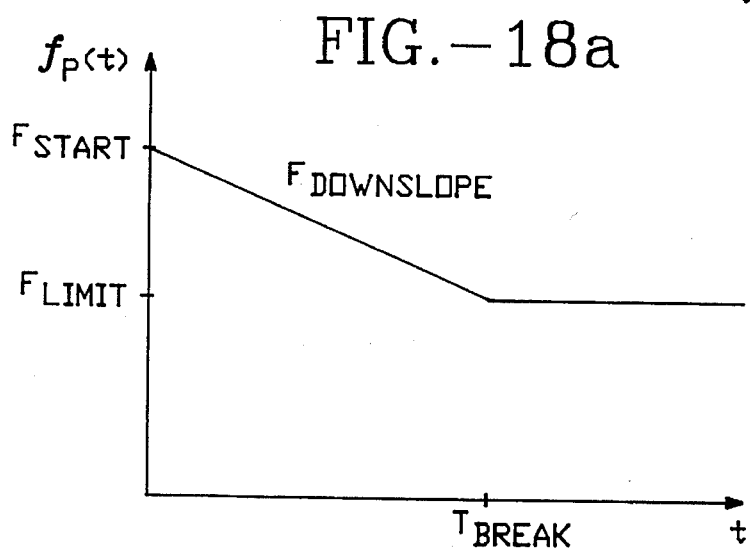
FIG.—18b
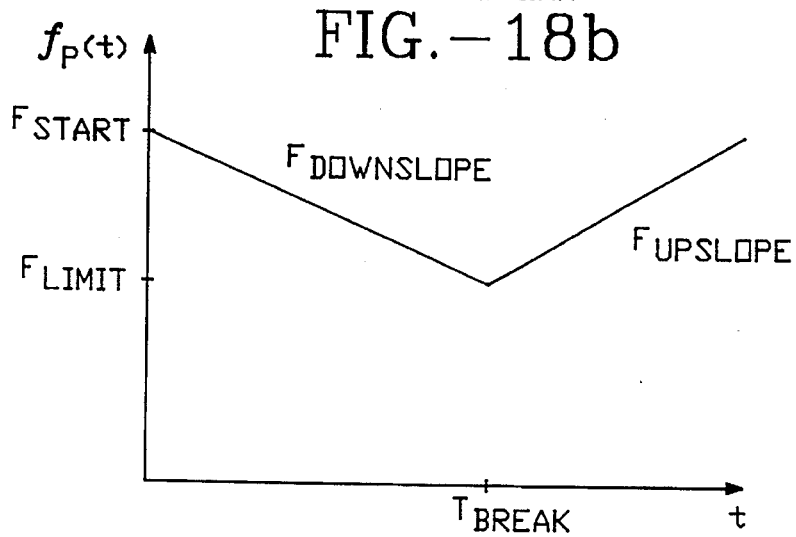
FIG.—18c

FREQUENCY PROFILE
vs
TIME

METHOD AND APPARATUS FOR ADJUSTABLE FREQUENCY SCANNING IN ULTRASOUND IMAGING

REFERENCE TO RELATED APPLICATION

This application is a continuation in part of Ser. No. 08/286,524 filed Aug. 5, 1994.

REFERENCE TO MICROFICHE APPENDIX

This application includes a microfiche appendix of 195 sheets of microfiche having 19,058 frames. A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

CROSS-REFERENCED TO RELATED APPLICATIONS

This application is related to:

a. METHOD AND APPARATUS FOR RECEIVE BEAMFORMER SYSTEM, Wright et al., Attorney Docket No. 5055-77;

b. METHOD AND APPARATUS FOR TRANSMIT BEAMFORMER SYSTEM, Cole et al., Attorney Docket No. 5055-78;

c. METHOD AND APPARATUS FOR FOCUS CONTROL OF TRANSMIT AND RECEIVE BEAMFORMER SYSTEMS, Gee et al., Attorney Docket No. 5055-79;

d. METHOD AND APPARATUS FOR DOPPLER RECEIVE BEAMFORMER SYSTEM, Maslak et al., Attorney Docket No. 5055-80;

e. METHOD AND APPARATUS FOR A BASEBAND PROCESSOR OF A RECEIVE BEAMFORMER SYSTEM, Wright et al., Attorney Docket No. 5055-84;

f. METHOD AND APPARATUS FOR BEAMFORMER SYSTEM WITH VARIABLE APERTURE, Cole et al., Attorney Docket No. 5055-85.

The above patent applications are all commonly assigned with the present application, filed concurrently with the present application, and are all incorporated herein by reference in their entirety.

The present application is related to the following previously filed applications:

a. METHOD AND APPARATUS FOR REAL-TIME, CONCURRENT ADAPTIVE FOCUSING IN AN ULTRASOUND BEAMFORMER IMAGING SYSTEM, Wright et al., Ser. No. 08/286,528, filed Aug. 5, 1994;

b. METHOD AND APPARATUS FOR A GEOMETRIC ABERRATION TRANSFORM IN AN ADAPTIVE FOCUSING ULTRASOUND BEAMFORMER SYSTEM, Wright et al., Ser. No. 08/286,664, filed Aug. 5, 1994;

c. METHOD AND APPARATUS FOR COHERENT IMAGE FORMATION, Wright et al., Ser. No. 08/286, 510, filed Aug. 5, 1994.

FIELD OF THE INVENTION

This invention relates to coherent imaging systems including, for example, radar, sonar, seismic, and ultrasound systems, using vibratory energy, and in particular, but not limited to, phased array ultrasound imaging systems for scan formats such as linear, steered linear, sector, circular, Vector®, steered Vector® and other types of scan formats in imaging modes such as, by way of example only, B-mode (gray-scale imaging mode), F-mode (flow or color Doppler imaging mode), M-mode (motion mode) and D-mode (spectral Doppler mode).

More particularly, this invention relates to the advantageous combination of imaging with a phased array transducer with large aperture, high frequency, and a wide field of view due to increased steering angle. More specifically, this invention provides for a flexible and efficient means for improved spatial resolution in the central portion of the field of view while maintaining good imaging performance towards the outer edge regions of the image in various formats.

Although the invention will be discussed with respect to an ultrasound system, the invention can be implemented with other types of coherent imaging systems.

BACKGROUND OF THE INVENTION

A. Literature

The open literature, which presents issues relevant to imaging systems in general, includes the following documents which are incorporated herein by reference:

1. Dan E. Dudgeon, "Fundamentals of Digital Array Processing," *Proceedings of the IEEE*, volume 65, pp. 898–904, June 1977.

2. Dan E. Dudgeon and Russell M. Mersereau, *Multidimensional Digital Signal Processing*, Chapter 6, Section 2: "Beamforming," Prentice Hall, 1984.

3. William C. Knight, Roger G. Pridham, and Steven M. Kay, "Digital Signal Processing for Sonar," *Proceedings of the IEEE*, volume 69, pages 1451–1506, November 1981. (Digital beamformers for use in sonar described on pages 1465–1471.)

4. Roger G. Pridham and Ronald A. Mucci, "A Novel Approach to Digital Beamforming," *Journal of the Acoustical Society of America*, volume 63, pages 425–434, February 1978.

5. Roger G. Pridham and Ronald A. Mucci, "Digital Interpolation Beamforming for Low-Pass and Bandpass Signals," *Proceedings of the IEEE*, volume 67, pages 904–919, June 1979.

6. P. Barton, "Digital Beamforming for Radar," *IEE Proceedings*, volume 127, part F, number 4, August 1980.

7. P. D. Carl, G. S. Kino, C. S. Desilets and P. M. Grant, "A Digital Synthetic Focus Acoustic Imaging System," *Acoustic Imaging*, volume 8, pp. 39–53, 1978.

8. B. D. Steinberg, "Digital Beamforming in Ultrasound," *IEEE Transactions on Ultrasonics, Ferroelectrics, and Frequency Control*, volume 39, pp. 716–721, November 1992.

9. Hans Steyskal, "Digital Beamforming Antennas," *Microwave Journal*, volume 30, No. 1, pp. 107–124, January 1987.

10. R. E. Crochiere and L. R. Rabiner, "Multirate Digital Signal Processing," Chapter 2, Prentice Hall, 1983.

B. Analog and Hybrid (Analog-Digital) Beamformer Systems

Relevant analog and hybrid (analog-digital) phased array beamformer system art can be found in the following patents which are incorporated herein by reference:

| U.S. Pat. No. : | Title: | Inventor(s): |
| --- | --- | --- |
| 4,140,022 | MULTIPLE TRANSDUCER ACOUSTIC IMAGING APPARATUS | Samuel H. Maslak |
| 4,550,607 | PHASED ARRAY ACOUSTIC IMAGING SYSTEM | Samuel H. Maslak J. Nelson Wright |
| 4,699,009 | DYNAMICALLY FOCUSED LINEAR PHASED ARRAY ACOUSTIC IMAGING SYSTEM | Samuel H. Maslak Hugh G. Larsen |
| 5,014,710 and 5,165,413 | STEERED LINEAR COLOR DOPPLER IMAGING | Samuel H. Maslak Donald J. Burch J. Nelson Wright Hugh G. Larson Donald R. Langdon Joel S. Chaffin Grant Fash, III |

C. Digital Beamformer Systems

The concept of a digital beamformer system has been proposed in the art with respect to ultrasound systems. By way of example, the following U.S. patents, all of which are incorporated herein by reference, discuss various aspects of such systems. The patents include:

| U.S. Pat. No. : | Title: | Inventor(s): |
| --- | --- | --- |
| 4,809,184 | METHOD AND APPARATUS FOR FULLY DIGITAL BEAM FORMATION IN A PHASED ARRAY COHERENT IMAGING SYSTEM | Matthew O'Donnell Mark Magrane |
| 4,839,652 | METHOD AND APPARATUS FOR HIGH SPEED DIGITAL PHASED ARRAY COHERENT IMAGING SYSTEM | Matthew O'Donnell William E. Engeler Thomas L. Vogelsong Steven G. Karr Sharbel E. Noujaim |
| 4,886,069 | METHOD OF, AND APPARATUS FOR, OBTAINING A PLURALITY OF DIFFERENT RETURN ENERGY IMAGING BEAMS RESPONSIVE TO A SINGLE EXCITATION EVENT | Matthew O'Donnell |
| 4,893,284 | CALIBRATION OF PHASED ARRAY ULTRASOUND PROBE | Mark G. Magrane |
| 4,896,287 | CORDIC COMPLEX MULTIPLIER | Matthew O'Donnell William E. Engeler |
| 4,975,885 | DIGITAL INPUT STAGE FOR AN ULTRASOUND APPARATUS | Dietrich Hassler Erhard Schmidt Peter Wegener |
| 4,983,970 | METHOD AND APPARATUS FOR DIGITAL PHASED ARRAY IMAGING | Matthew O'Donnell William E. Engeler John J. Bloomer John T. Pedicone |
| 5,005,419 | METHOD AND APPARATUS FOR COHERENT IMAGING SYSTEM | Matthew O'Donnell Kenneth B. Welles, II Carl R. Crawford Norbert J. Plec Steven G. Karr |
| 5,111,695 | DYNAMIC PHASE FOCUS FOR COHERENT IMAGING BEAM FORMATION | William E. Engeler Matthew O'Donnell John T. Pedicone John J. Bloomer |
| 5,142,649 | ULTRASONIC IMAGING SYSTEM WITH MULTIPLE, DYNAMICALLY FOCUSED TRANSMIT BEAMS | Matthew O'Donnell |
| 5,230,340 | ULTRASOUND IMAGING SYSTEM WITH IMPROVED DYNAMIC FOCUSING | Theador L. Rhyne |
| 5,235,982 | DYNAMIC TRANSMIT FOCUSING OF A STEERED ULTRASONIC BEAM | Matthew O'Donnell |
| 5,249,578 | ULTRASOUND IMAGING SYSTEM USING FINITE IMPULSE RESPONSE DIGITAL CLUTTER FILTER WITH FORWARD AND REVERSE COEFFICIENTS | Sidney M. Karp Raymond A. Beaudin |

D. Adjustable Frequency Scanning

Ultrasound medical systems using phased arrays have been used for some time. Three basic scan and display formats have generally been used in combination with planar linear transducer arrays, that is, arrays in which the transmit/receive surface of individual transducer elements are positioned in a single plane (approximately) and generally have uniform element spacing.

Two-dimensional images have been formed by a linear-type scan format where ultrasonic beams corresponding to parallel scan lines normal to or at a constant angle to a line connecting the transmit surfaces of the elements are generated by selected groups of transducer elements shifted across the array. Linear scanning with parallel scan lines has a field of view determined by the width of the physical aperture of the transducer array.

In a sector-type scan format, the transducer elements are spaced much closer together than generally used for linear scan transducers, typically at half-wavelength or so intervals. This permits acoustic scan lines to be steered without generating grating lobes and allows both the size of the transducer array to be decreased and the field of view to be increased at deeper depths. Sector-phased arrays form acoustic scan lines that all originate from a single point at the center of the face of the transducer array.

In a Vector®-type scan format, the scan lines lie along rays which need not originate from a single point on the face of the transducer array, but rather may pass through a substantially common vertex that is typically not on the face of the transducer array. The variably located vertex is usually a selectable distance behind the face of the transducer array to provide an extended field of view. The common vertex can be anywhere (including in front of the array) and need not be on a centerline normal to the array. More generally, the individual scan lines in a Vector® format scan can intersect the transmitting surface of the array at different origins and with different steering angles relative to a normal to the array. The Vector® scan format is described in U.S. Pat. Nos. 5,148,810; 5,235,986; and 5,261,408, and are incorporated herein by reference.

The linear, sector and Vector® scan formats can be used also with transducer arrays whose transmitting surfaces are not planar, but rather are curved. In addition, many scan formats can be defined other than linear, sector and Vector® formats, but all can be defined by specifying, for each scan line, both a point of intersection with the transducer array and a steering angle relative to a respective normal thereto, and the minimum and maximum range of the scan line. For three-dimensional scan formats, another parameter set may need to be specified as well such as using two steering angles (azimuth and elevation) relative to a respective normal. Also, while the transmitting and receiving arrays are typically the same physical array, in general they can be different physical arrays.

It is well-known that phased array ultrasonic imaging with a sampled aperture is subject to the effects of grating lobes due to the periodic nature of the array element spacing and the coherent nature of the ultrasound waves. Grating lobes appear as regions of sensitivity at angles away from the direction of interest, and can produce interference effects resulting in image ambiguity artifacts.

High spatial resolution and a large field of view are desirable qualities for an ultrasound imaging system. The former requires high frequency operation and/or a large active aperture, and the latter requires a large imaging aperture and/or the ability to steer the imaging beam far from the normal to the transducer without incurring grating lobe artifacts.

When phased array imaging beams are steered far away from the normal, i.e. 30 degrees or more, the appearance of grating lobes may become a more significant contributor to image artifacts. Further, sensitivity or gain is lost due to the effects of loss of sensitivity of the individual elements at high steering angles. In fact, the combination of these two effects act together to worsen the impact of grating lobe artifacts.

One means for countering the effects of reduced sensitivity from steered beams is to lower the nominal imaging center frequency. This will, however, reduce the overall spatial lateral resolution in the image field of view if applied to every scan line. Another means is to increase the system gain for beams away from the center of the image. But this is merely a gain adjustment, and does nothing to improve signal-to-noise ratio or dynamic range.

Other means for mitigating the effects of grating lobes involve disadvantageous compromises. Reducing the element-to-element spacing, typically to half-wavelength spacing at the center frequency, will limit or eliminate the grating lobe artifact, but does so at the expense of lateral resolution. Increasing the number of active electronic channels may also help, but at a substantial increase in complexity and cost. Reducing the maximum steering angle can also mitigate the grating lobe artifact, but at the expense of a narrowed field of view.

Means for reducing the grating lobe by means of decreasing the imaging frequency on a scan-line-by-scan-line basis has previously been described in Yamaguchi, et al., U.S. Pat. No. 4,631,710. In this patent, a variable bandpass filter is described whose characteristics (high and low cut-off frequencies) are controlled as a function of steering angle. This filter includes a wideband amplifier, a variable high pass filter, and a variable low pass filter. It works by cutting off high frequency pulse energy selectively with scan angle. As described, this filter may be applied to some combination of: (1) each output from a pulser, or transmitter, (2) each reception signal from a receiving transducer element, (3) a composite receive beam, (4) an original transmission or excitation signal.

The above means to control grating lobe energy suffers from many disadvantages. First, providing one such device per transmit channel and/or one per receive channel would be prohibitively complex and electronic component intensive for a high performance ultrasound imaging system, wherein 128 or more transmitters and receivers may be active simultaneously, thus requiring 256 or more such devices. These devices would have to comprise extremely well-matched, tight tolerance parts over a very broad frequency range, since they are being applied pre-beamforming, in order to avoid introducing phase errors that could otherwise destroy the coherence needed for beamformation summation. All of this means that the added cost of building individual bandpass filters on a per channel basis for either receive, transmit, or both, would be very high.

Secondly, the proposal to apply the variable bandpass filter to an original transmission signal would require that an arbitrary waveform be delayed on a per channel basis after wave shaping. Not only does this involve a dedicated analog delay line for each active transmit channel, but each delay line would have to possess a very large bandwidth because the center frequency of each excitation pulse must vary as a function of scan line over a large frequency range, even for a particular transducer. Of course, if the imaging system is to be used for a variety of transducers with widely varying center frequencies (typical transducer center frequencies range from 2.0 MHz to 7.5 MHz or more for modern high performance medical ultrasound imaging systems), the bandwidth requirement becomes extreme. For a high performance ultrasound imaging system, which typically has from 32 to 128 or so simultaneously active transmitters, this again represents very high cost.

Thirdly, the approach of the Yamaguchi patent suffers from an inherent loss of signal-to-noise ratio because useful signal energy is lost. This applies generally, regardless of where in the system the variable bandpass filter is applied. Concentrating on the patent's proposal to apply the variable bandpass filter to the composite receive beam (since all remaining proposals, as described above, are not realistically realizable with reasonable cost, other considerations notwithstanding), the approach taken in the patent amounts to simply discarding signal energy received outside the band of interest. Thus, if the bandwidth is reduced by 50%, then 50% of the signal energy is simply discarded. Moreover, the signal energy being discarded is in precisely the frequency region where the transducer is maximally sensitive, and so a very significant loss in signal-to-noise ratio results.

Grating lobe reduction is discussed also in ELECTRONIC LETTERS, Jul. 4, 1991, vol. 27, no. 14, "Grating Lobe Reduction in Ultrasonic Synthetic Focusing", by M. H. Bae, I. H. Sohn, and S. B. Park. However, the solution discussed therein applies only to synthetic focusing with a single element. The solution amounts to effectively reducing the "spacing" between adjacent synthesized elements by a factor of two. In array processing, this amounts to increasing the number of simultaneously active channels by a factor of 2, which is already well known to the art and does not solve the problem of reducing grating lobes with a given number of channels.

SUMMARY OF THE INVENTION

Roughly described, the invention provides means for transmit and receive pulse waveform processing without discarding signal energy while controlling the imaging frequency on a per scan-line basis. Preferably, the imaging frequency is reduced as a function of steering angle, in the case of Vector® or sector scanning, or as a function of the degree of end alignment, in the case of curved linear or linear scanning. This permits a combination of high imaging frequency operation, and therefore high resolution, in the central portion of the image, with a wide field of view that suppresses grating lobe artifacts in the outer lateral portions of the image. Lateral resolution is reduced near the scan edges in exchange for maintenance of sensitivity and immunity to grating lobes.

Preferably the per scan-line frequency variation is accomplished on transmit by means of digital construction of the transmit pulse, whereby an appropriately delayed initial waveform samples of a pulse waveform is modulated to a programmable imaging frequency that varies for different scan lines. The imaging frequency is programmed to result in an imaging pulse transmitted into the body whose center frequency is highest in the central portion of the scan, and is reduced in a controlled fashion for mitigation of grating lobe artifact levels as the steering angle increases or as the beam origin approaches end-alignment. The technique preserves the pulse signal energy, because modulation merely frequency translates the signal energy of the initial waveform samples, without modification of the pulse shape itself.

As used herein, steering angle is measured relative to a normal at the point on the transducer array transmit or receive surface where the scan line intersects, a 0° steering angle being coincident with the normal. The same definition applies to three-dimensional (3D) scan formats produced from two-dimensional (2D) transducer arrays, and to curved transducer array surfaces. Also, the initial waveform samples preferably represent a real or in-phase/quadrature (I/Q) baseband excitation pulse waveform centered at or near 0 Hz. The baseband excitation pulse waveform is then modulated up to the imaging frequency and digital-to-analog converted before application to the transducer on transmit.

On receive, the waveform signals received from the transducers are delayed and demodulated back to a common digital baseband centered at or near 0 Hz. The demodulation frequency for each beam is typically, but not necessarily, the same as the modulation frequency applied to transmit the beam. The resulting waveforms are then coherently summed with those from other channels. The resultant beamformed signal is then passed through a baseband filter which is preferably fixed and does not vary on a scan-line-by-scan-line basis. The baseband filter removes unwanted products of modulation and demodulation and noise, but need not significantly reduce the desired signal energy. Throughout this process, signal energy is thus preserved, maximizing the signal-to-noise ratio and therefore sensitivity.

Further, it can be shown that by remodulating the post-beamformed signal at the output of the baseband filter, phase coherence can be maintained across scan lines. This permits the possibility of advantageously forming coherent linear combinations of the scan lines for the purpose of lateral filtering or coherent interpolation of additional image samples before performing non-linear operations such as log detection and envelope detection, after which phase information is lost. See the cited METHOD AND APPARATUS FOR COHERENT IMAGE FORMATION co-pending patent application.

Additionally, not only can the receive demodulation frequency be varied as a function of scan line, but it may also be varied as a function of range. This has the advantage of being able to track the downshifting of the imaging pulse center frequency as it propagates through an attenuating medium, such as human soft tissue. This operation further serves to preserve signal energy by adjusting the processing to track the frequency location of the signal energy.

One object of this invention is to provide cost-efficient high-performance means to vary the imaging pulse center frequency so as to achieve a substantially higher imaging pulse center frequency in the most important central portion of the field of view wherein steering is less, and a lower imaging pulse center frequency towards the outer lateral portions of the image where the effects of grating lobes would otherwise be more significant.

Another object of this invention is to increase the lateral field of view over that which would be possible with a scan format that uses a fixed imaging pulse center frequency selected to avoid grating lobe artifacts.

Another object of this invention is to preserve the pulse energy by shifting it through modulation and demodulation so as to maximize sensitivity and signal-to-noise ratio.

Adjustable frequency imaging provides the combined advantage of large under-sampled (elements spaced at greater than $\lambda/2$) imaging apertures with high imaging pulse center frequency and large field of view. Conventional fixed frequency imaging must trade off these desired qualities against each other to avoid sensitivity losses and image artifacts.

Adjustable frequency imaging can be advantageously applied to all scan formats in which the scan lines are steered with respect to a normal to the face of the transducer array. This includes, for example, scan formats such as described in U.S. Pat. Nos. 5,148,810 and 5,261,408. Adjustable frequency imaging can also be applied even when no steering is performed, to minimize grating lobe artifacts as scan line origins become nearer to the physical end of the transducer array. It can also be applied to 3D scans from 2D arrays.

BRIEF DESCRIPTION OF THE DRAWINGS

The invention will be described with respect to particular embodiments thereof, and reference will be made to the drawings, in which:

FIGS. 1a and 1b conceptually depict the transmission and reception of ultrasound beams to and from body tissue;

FIGS. 2b and 2c taken together depict a detailed block diagram of the ultrasound beamformer system of FIG. 2a;

FIGS. 14a, 14b and 14c depict graphically the storage and selection of appropriate time delayed data from the variable time delay memory of the digital multi-channel receive processor of FIG. 12.

FIGS. 18a, 18b and 18c depict graphs of typical signal frequency downshifting profiles that can be applied for signal demodulation and fine phase adjustment in the complex multiplier and for signal remodulation in the phase aligner.

DETAILED DESCRIPTION OF THE PREFERRED EMBODIMENT

Figure 2A:
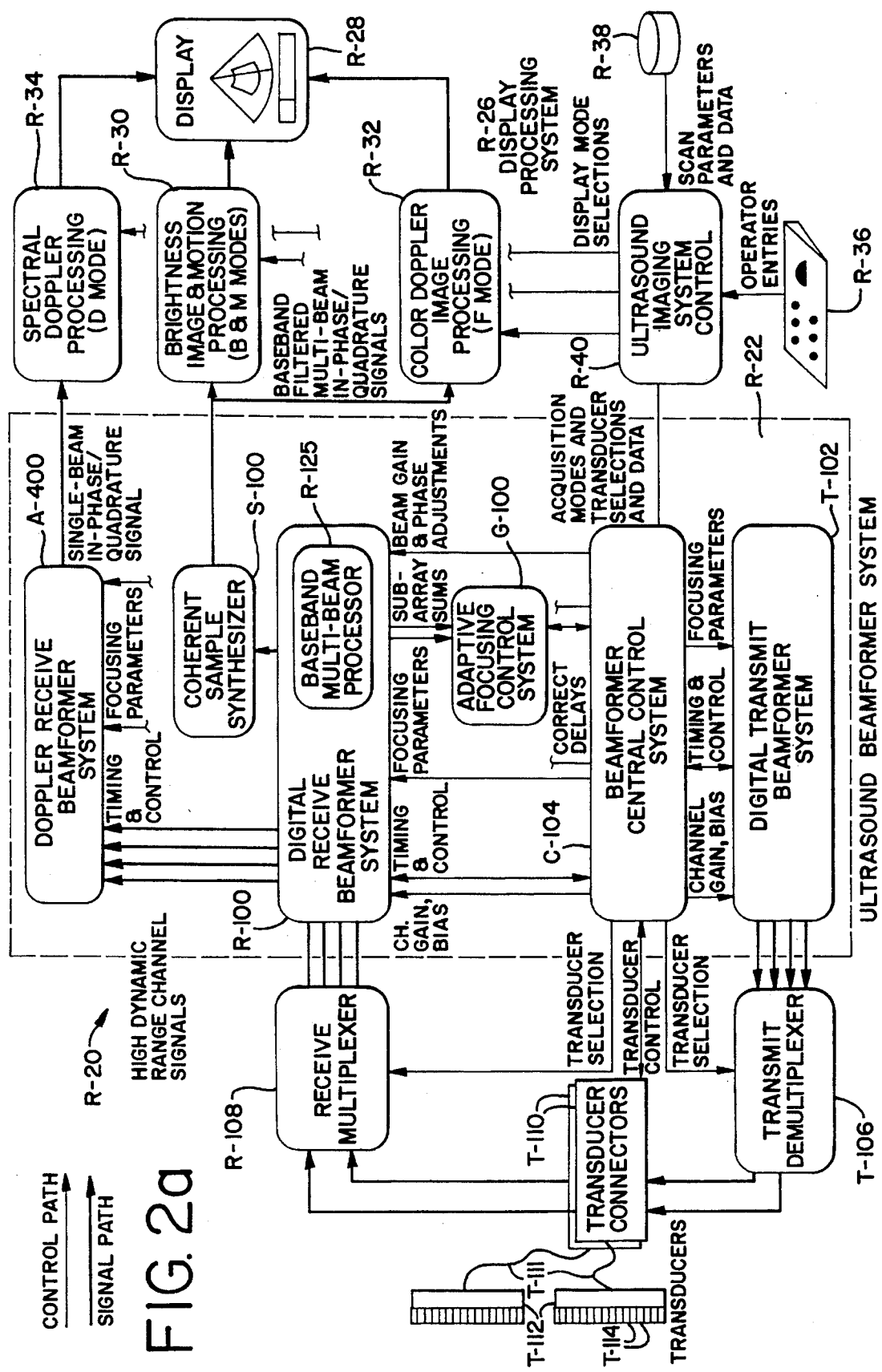
FIG. 2a depicts a high level block diagram schematic of a novel ultrasound beamformer system of an ultrasound medical imaging system.

The present invention represents a component of a medical ultrasound imaging system for which additional patent applications, listed above, have been simultaneously filed in the United States Patent and Trademark Office. These applications are hereby incorporated by reference.

A. Overview of Preferred Beamformer System Architecture

1. Ultrasound Signal Description

With respect to the present invention, ultrasound imaging is accomplished by firing (transmitting) into body tissue or other objects to be imaged a scan sequence of focused ultrasonic beams centered along straight lines in space called transmit scan lines (FIG. 1a). The transmit scan lines are generated by a transmit beamformer and an ultrasound transducer array. The transmit scan lines are spaced to produce a planar linear, planar sector or other display of the tissue via a pre-defined firing or scanning pattern. Focused to some defined depth in the tissue, the ultrasonic transmit continuous-wave (CW) or pulse-wave (PW) signal, propagating at an assumed constant propagation velocity of nominally c=1540 m/sec through the tissue, interacts with the tissue and reflects a small portion of the signal back to the ultrasound transducer array that initiated the ultrasound signal. The round trip delay time is shortest for those targets closest to the ultrasound transducer array, and longest for those targets farthest from the transducer array. With the application of appropriate time delays, the receive beamformer (FIG. 1b) can dynamically focus receive beams along straight lines in space called receive scan lines commencing, for example, with the shallowest range (depth) of interest and evolving toward the deepest range of interest.

FIGS. 1a and 1b depict representations of transmit and receive scan lines (solid) and straight-line signal propagation paths from individual elements (dashed), respectively. In FIG. 1a, the transmit beamformer is generally identified by T-50 with the transducer array T-52 containing a multiplicity of individual transducer elements T-54 organized as a linear phased array in this particular embodiment. As is known in the art, there are a great variety of transducer array configurations available for use with ultrasound transmit and receive beamformer systems. As can be seen in FIG. 1a, the transmit beamformer T-50 sends appropriately time-delayed electrical signals to the individual transducer elements T-54. These transducer elements T-54 then in turn convert electrical signals into acoustic waves that propagate into the body tissue T-56. By applying different time delays to the excitation signals sent to the individual transducer elements T-54, transmit scan lines T-60 and T-62, having respective foci $r_1$ and $r_2$, can be established. It is to be understood that each of these transmit scan lines is representative of a center line of a different transmit beam which is steered and focused into the body to be imaged.

The transmit beamformer T-50 can generate simultaneous multiple beams along different scan lines, or different focal depths along the same scan line (compound focus). Further, the multiple transmit beams can each scan the entire image format or be transmitted such that each of the multiple beams only scans a specified section of the image format.

FIG. 1b depicts a digital receive beamformer R-58 which is also connected to the transducer array T-52. Also depicted in FIG. 1b are receive scan lines R-64, R-66 corresponding to a dynamically focused first receive beam and a dynamically focused second receive beam, respectively. The beams are sampled in range at a plurality of focal depths ($r_1$, $r_2$, $r_3$) along each scan line. In the digital receive signal path of the present invention, transducer array signals can be selectively separated into data representative of multiple individual beams.

Each scan line of a transmit or receive scan pattern can be parameterized by the origin on the transducer array, the scan line orientation (angle θ) and the focus depth or range (r). The ultrasound imaging system of the present invention stores a precomputed sparse data set of focusing time delay and aperture apodization values indexed by these parameters (based on geometric considerations as is known in the art) and expands the values by real-time computational means to control the transmit and receive beamformation systems that produce the desired scan lines.

Figure 2B:
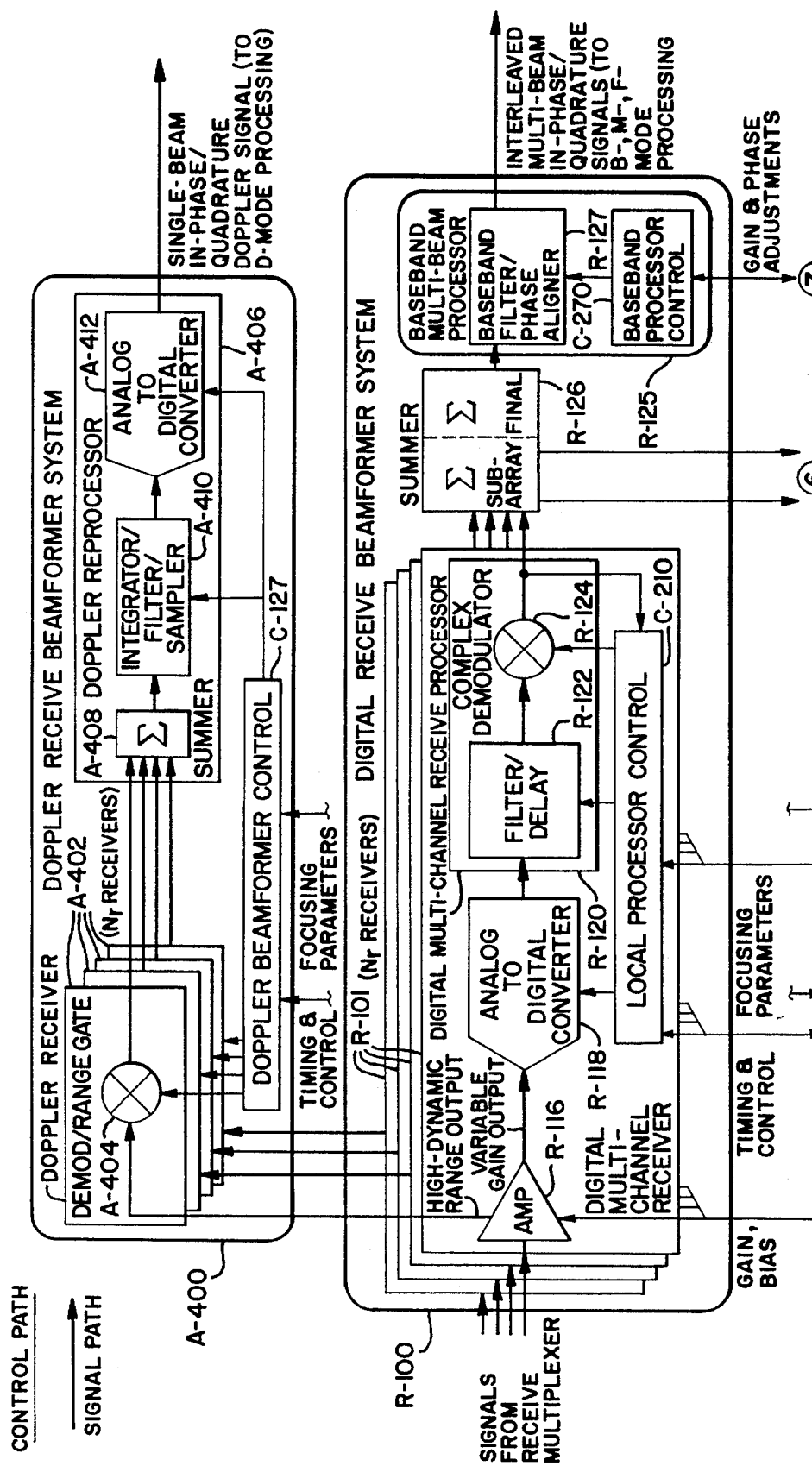

2. Beamformer System:

FIGS. 2a, 2b, 2c depict an overall block diagram of a medical ultrasound imaging system R-20. Ultrasound system R-20 includes a beamformer system R-22, one or more transducers T-112, a display processing system R-26 with a display R-28 and an ultrasound imaging system control R-40.

In FIGS. 2a, 2b, or 2c, the beamformer system R-22 includes inventive and novel (1) digital transmit beamformer system T-102, (2) digital receive beamformer system R-100, (3) beamformer central control system C104, (4) adaptive focusing control system G-100, (5) Doppler receive beamformer system A-400, (6) baseband multi-beam processor R-125, and (7) coherent sample synthesizer S-100. These systems are depicted as high level, functional block diagrams. The blocks are abstracted from the actual implementation of a preferred embodiment in order to better illustrate the signal processing functions performed.

As indicated in FIG. 2a, beamformer system R-22 provides two sources of digital beam data to the display processing system R-26: (1) Doppler receive beamformer single-beam complex in-phase/quadrature data representing coherent temporal sampling of the beam (CW case) or coherent temporal sampling at one range location along the beam (PW case), and (2) digital receive beamformer multi-beam complex in-phase/quadrature data representing coherent sampling in range along each receive scan line. Beamformer system R-22 can be operated to provide a sequence of scan lines and associated samples as above to provide data for a variety of display modes. By way of example, possible display modes and their associated processors include (1) brightness image and motion processor R-30 for B-mode (gray-scale imaging) and M-mode (motion display), (2) color Doppler image processor R-32 for flow imaging, and (3) spectral Doppler processor R-34 for wide dynamic non-imaging Doppler velocity vs. time displays. Additional display modes can be created from the two complex data sources of R-22, as will be obvious to those skilled in the art.

Ultrasound system R-20 also includes a transmit demultiplexer T-106 for routing the output waveforms from the transmitters T-103 to the transducer elements T-114, a receive multiplexer R-108 for routing the input waveforms from the transducer elements T-114 to the receivers R-101, one or more transducer connectors T-110 and transducer arrays T-112. Many types of transducer arrays can be used with the present system.

Ultrasound system R-20 also includes an ultrasound imaging system control R-40, archival memory R-38 for storing scan parameters and scan data, and operator interface R-36.

As used herein, the term ultrasonic refers to frequencies above the range of human hearing. However, the transducer arrays T-112 are optimized for frequencies typically within the range of 2–10 MHz.

The transducer array T-112 is interchangeable with a variety of different kinds of transducer arrays, including but not limited to linear, curved, curvilinear and annular transducer arrays. A variety of transducer array shapes and frequencies are desirable in order to satisfy the requirements of a variety of different clinical settings. However, the transducer arrays T-112 are typically optimized for frequencies within the above specified range of 2–10 MHz. The medical ultrasound system R-20 performs the three major functions of driving the ultrasonic transducer array of elements T-114 to transmit focused ultrasound energy, receiving and focusing back-scattered ultrasound energy impinging on the transducer array T-114, and controlling the transmit and receive functions to scan a field of view in scan formats including (but not limited to) linear, sector or Vector® format.

In FIGS. 2a, 2b, 2c, the control signals are communicated over the light lead lines while the signal paths are depicted with heavy lead lines.

3. Digital Transmit Beamformer System:

The digital transmit beamformer T-102 (FIG. 2c) is the subject of the above cited co-pending application entitled: METHOD AND APPARATUS FOR TRANSMIT BEAMFORMER SYSTEM. It is to be understood that in a preferred embodiment, the digital transmit beamformer T-102 is comprised of a plurality of digital multi-channel transmitters T-103, one digital multi-channel transmitters for one or more of the individual transducer elements T-114. The transmitters are multi-channel in that each transmitter can process, in a preferred embodiment, up to four independent beams. Thus, for example, 128 multi-channel transmitters have 512 channels. In other preferred embodiments, more than four independent beams can be achieved. Processing more than four beams per processor is within the scope of the invention.

In a preferred embodiment, each of the digital multi-channel transmitters T-103 produces as its output in response to an excitation event the superposition of up to four pulses, each pulse corresponding to a beam. Each pulse has a precisely programmed waveform, whose amplitude is apodized appropriately relative to the other transmitters and/or channels, and delayed by a precisely defined time delay relative to a common start-of-transmit (SOT) signal. Transmitters T-103 are also capable of producing CW.

Each digital multi-channel transmitter T-103 conceptually comprises a multiple beam transmit filter T-115 which provides an output to a complex modulator T-117. The output from complex modulator T-117 is communicated to a delay/filter block T-119, and therefrom is provided to a digital-to-analog converter (DAC) T-121. The output of the DAC T-121 is amplified by an amplifier T-123. The multiple beam transmit filter T-115, the complex modulator T-117 and the delay/filter block T-119 comprise a digital multi-channel transmit processor T-104.

The transmit filter T-115 can be programmed to provide any arbitrary real or complex waveform responsive to a start-of-transmit (SOT) signal. The transmit filter T-115 is implemented with a memory which stores real or complex samples of any desired and arbitrary pulse waveform, and a means of reading the samples out sequentially in response to the start-of-transmit (SOT) signal delayed by a component of the focusing delay. In a preferred embodiment, the memory of T-115 is programmed to store baseband representations of real or complex pulse envelopes.

Block T-115, although primarily a memory, is referred to herein as a transmit filter, as the output of block T-115 can be thought of as the time response of a filter to an impulse. The complex modulator T-117 upconverts the envelope to the transmit frequency and provides appropriate focusing phase and aperture apodization.

Delay/filter block T-119 conceptually provides any remaining focusing delay component and a final shaping filter. The digital-to-analog converter (DAC) T-121 converts the transmit waveform samples to an analog signal. The transmit amplifier T-123 sets the transmit power level and generates the high-voltage signal which is routed by the transmit demultiplexer T-106 to a selected transducer element T-114.

Associated with each multi-channel transmit processor T-104 is a local or secondary processor control C-125 which provides control values and parameters, such as apodization and delay values, to the functional blocks of multi-channel transmit processor T-104. Each local or secondary channel control C-125 is in turn controlled by the central or primary control system C104.

4. Digital Receive Beamformer System:

The digital receive beamformer R-100 (FIG. 2b) is the subject of the above-identified application entitled: METHOD AND APPARATUS FOR RECEIVE BEAMFORMER SYSTEM which has been incorporated herein by reference.

The signals from the individual transducer elements T-114 represent return echoes or return signals which are reflected from the object being imaged. These signals are communicated through the transducer connectors T-110 to the receive multiplexer R-108. Through multiplexer R-108, each transducer element T-114 is connected separately to one of the plurality of digital multi-channel receivers R-101 which taken together with summer R-126 comprise the digital receive beamformer R-100 of the invention. The receivers are multi-channel in that each receiver can process, in a preferred embodiment, up to four independent beams. Processing more than four beams per processor is within the scope of the invention.

Each digital multi-channel receiver R-101 can, in a preferred embodiment, comprise the following elements which are represented by the high level function block diagram in FIG. 2b. These elements include a dynamic low-noise and variable time-gain amplifier R-116, an analog-to-digital converter (ADC) R-118, and a digital multi-channel receive processor R-120. The digital multi-channel receive processor R-120 conceptually includes a filter/delay unit R-122 and a complex demodulator R-124. The filter/delay unit R-122 provides for filtering and coarse focusing time delay. The complex demodulator R-124 provides for fine focusing delay in the form of a phase rotation and apodization (scaling or weighting), as well as signal demodulation to or near baseband. The digital multi-channel receivers R-101 communicate with summer R-126 where the signal samples associated with each beam from each receive processor are summed to form final receive scan line samples, and the resulting complex samples provided to baseband processor R-125. The exact functioning and composition of each of these blocks will be more fully described hereinbelow with respect to the remaining figures.

A local or secondary control C-210 is associated with each digital multi-channel receiver R-101. Local processor control C-210 is controlled by central or primary control C104 and provides timing, control and parameter values to each said receiver R-101. The parameter values include focusing time delay profiles and apodization profiles.

5. Doppler Receive Beamformer System:

The Doppler receive beamformer system A-400 for wide dynamic range, nonimaging Doppler acquisition includes analog receivers A-402, each of which receives echo signals from a respective one or more transducers T-114. Each of the Doppler receivers A-402 includes a demodulator/range gate A-404 which demodulates the received signal and gates it (PW mode only) to select the echo from a narrow range. The analog outputs of the Doppler receivers A-402 are communicated to a Doppler preprocessor A-406. In preprocessor A-406, the analog signals are summed by summer A-408 and then integrated, filtered, and sampled by analog processor A-410. Preprocessor A-406 then digitizes the sampled analog signal in an analog-to-digital converter (ADC) A-412. The digitized signal is communicated to the display processing system R-26. The Doppler receive beamformer system is the subject of the above identified co-pending patent application entitled: METHOD AND APPARATUS FOR DOPPLER RECEIVE BEAMFORMER SYSTEM which has been incorporated herein by reference.

Associated with all Doppler receivers A-402 is a single local or secondary Doppler beamformer control C-127. Doppler beamformer control C-127 is controlled by central or primary control system C104 and provides control and focusing parameter values to the Doppler receive beamformer system A-400.

As pointed out in the above patent application describing the Doppler receive beamformer system A-400, the present beamformer system R-22 advantageously combines an imaging digital receive beamformation system R-100 and a nonimaging Doppler receive beamformation system A-400 in a manner which uses the same digital transmit beamformation system T-102 and the same transducer array and allows the digital receive beamformation system R-100 to be optimized for imaging modes such as B-mode and color Doppler imaging, and therefore has high spatial resolution, while the accompanying Doppler receive beamformation system has a wide dynamic range and is optimized for use in acquiring signals for nonimaging Doppler processing.

6. Beamformer Central Control System:

The beamformer central control system C104 of the present invention controls the operation of the digital transmit beamformer system T-102, the digital receive beamformer system R-100, the Doppler receive beamformer system A-400, the adaptive focusing control system G-100, and the baseband processor R-127. The beamformer control is more fully discussed in the above referenced and incorporated patent application entitled: METHOD AND APPARATUS FOR FOCUS CONTROL OF TRANSMIT AND RECEIVE BEAMFORMER SYSTEMS.

The main control functions of the central control system C-104 are depicted in FIG. 2c. The control functions are implemented with four components. The acquisition control C-130 communicates with the rest of the system including the ultrasound system control R-40 and provides high level control and downloading of scanning parameters. The focusing control C-132 computes in real time the dynamic delay and apodization digital values required for transmit and receive beamformation, which includes pre-computed and expanded ideal values plus any estimated correction values provided by adaptive focusing control system G-100. The front end control C-134 sets the switches for the demultiplexer T-106 and the multiplexer R-108, interfaces with the transducer connectors T-110, and sets the gain and bias levels of all transmitter amplifiers T-123 and all receive amplifiers R-116. The timing control C-136 provides all the digital clocks required by the digital circuits. This includes the sampling clocks for all the transmitter DACs T-121 and receiver ADCs R-118.

In a preferred embodiment central control C-104 expands sparse tables of focusing time delay and aperture apodization values based on pre-computed and stored data, through such techniques as interpolation and extrapolation. The expanded delay and apodization values are communicated as a profile of values across the transducer aperture to the local processor controls, where the delay and apodization data expansion in range is completed to per-transducer-element, per-sample, per-beam values.

7. Adaptive Focusing Control System:

Adaptive focusing control system G-100 provides for real time concurrent adaptive focusing. Adaptive focusing control system G-100 is comprised of an adaptive focus processor G-505 which provides focus correction delay values to the focus control C-132 of the central control C104. Adaptive focus processor G-505 operates on output produced by aberration value estimators G-502 from data gathered from the subarray summers R-126 of the digital receive beamformer system R-100. Accordingly, aberration correction values, preferably aberration delay and amplitude values, are adaptively measured for each receive scan line or for a subset of receive scan lines in range regions corresponding to transmit focal depths by the adaptive focusing control subsystem G-100 shown in FIG. 2c. Adaptive focusing control system G-100 is more fully described in the above identified co-pending patent application entitled: METHOD AND APPARATUS FOR REAL TIME, CON-

CURRENT ADAPTIVE FOCUSING IN AN ULTRASOUND BEAMFORMER IMAGING SYSTEM.

It is to be understood that in addition to the adaptive focusing control system which adjusts focus delays, that a number of adaptive control systems are contemplated. These systems, by way of example, include (1) adaptive contrast enhancement control system for adjusting focus delays and aperture apodizations, (2) adaptive interference cancellation control for adjusting focus delays and phases, aperture apodizations, and (3) adaptive target enhancement control for adjusting focus delays and phase, aperture apodizations, imaging transmit and receive frequencies and baseband waveform shaping.

Another aspect of adaptive focusing which can be included in the preferred embodiment of the adaptive focusing control system G-100 is a geometric aberration transform device G-508/509 which can provide aberration correction delay values to the adaptive focus processor G-505 for scan lines and scan line depth locations for which measured aberration values were not collected by aberration value estimators G-502. More specifically, measured aberration correction values are written to a delay table in G-508/509. G-508/509 retrieves values from the delay table according to look-up rules of the geometric aberration transform to form focusing delay correction profiles across the aperture valid for depths, scan geometries, and acquisition modes other than the depth, scan geometry, and mode for which aberration correction values were measured. The geometric aberration transform device G-508/509 is the subject of the above identified co-pending U.S. patent application entitled: METHOD AND APPARATUS FOR A GEOMETRIC ABERRATION TRANSFORM IN AN ADAPTIVE FOCUSING ULTRASOUND BEAMFORMER SYSTEM.

8. Baseband Processor System

The baseband processor R-125 provides for filtering, and receive-scan-line-to-receive-scan-line (beam-to-beam) amplitude and phase adjustments as discussed herein and in the above-referenced and incorporated patent application entitled METHOD AND APPARATUS FOR A BASEBAND PROCESSOR FOR A RECEIVE BEAMFORMER SYSTEM and the above-referenced patent application entitled METHOD AND APPARATUS FOR COHERENT IMAGE FORMATION.

The baseband processor R-125 additionally includes a baseband filter, a complex multiplier, and a baseband processor control which controls the operation of the baseband filter and complex multiplier. The baseband processor control is controlled by central control C-104.

9. Coherent Sample Synthesizer System

The coherent sample synthesizer system S-100 (FIG. 2a) is the subject of the above-identified application entitled: METHOD AND APPARATUS FOR COHERENT IMAGE FORMATION.

This system exploits the multi-beam transmit and multi-beam receive capability of the invention to acquire and store coherent (pre-detection) samples of receive beam data along actual scan lines and to perform interpolation of the stored coherent samples to synthesize new coherent samples at new range locations along existing scan lines or along synthetically-created scan lines. Both acquired and synthesized samples are passed to the display processing system R-26.

10. Transmit and Receive Multiplexers

The connectivity between the transducer array elements T-114 and the processors T-103, R-101, A-402 of the digital transmit, digital receive, and Doppler receive beamformer systems is established through a transmit demultiplexer T-106 and a separate receive multiplexer R-108, as shown in FIG. 2a. The multiple-transducer multiplexer configuration shown in FIG. 2a permits selection of transmit and receive apertures lying entirely within a single transducer array or straddling across two transducer arrays. The two multiplexers are independently controlled by the beamformer central control system C-104 and may be programmed to support a number of acquisition modes, including sliding aperture and synthetic aperture modes. The multiplexers and their connectivity are the subject of the above-cited co-pending application entitled: METHOD AND APPARATUS FOR BEAMFORMER SYSTEM WITH VARIABLE APERTURE.

B. Method

To consider a specific example of the method of implementation of the invention, consider a planar transducer array which has half-wavelength spacing at a center frequency of f=2.5 MHz. As used herein, the center frequency of a signal is the center of mass of the power spectrum of the signal, and due to filtering and the like, may not be identical to the modulation frequency. Under this condition, the element spacing is d=0.616 mm since $\lambda=c/f$. The value of c=1.54 mm/μsec used herein is an approximation of the speed of sound in the human body; it will be understood that different approximations are possible.

It is well known that the grating lobe angle $\theta_g$ for a planar array is given by $$\sin(\theta_S) - \sin(\theta_g) = \lambda/d \tag{1}$$

where $\theta_g$=the grating lobe angle $\theta_S$=the steering angle $\lambda$=signal wavelength d=element spacing.

Equation (1) predicts that when the element spacing $d=\lambda/2$, then for a steering angle of +90 degrees, the grating angle is at −90 degrees.

A more practical use for this equation is to consider what happens when the maximum steering angle $\theta_{S,max}=\pm 45$ degrees, and the element spacing is $\lambda/2$. In this case, which is well known to give good imaging performance in terms of grating lobe behavior, $\sin(\theta_S)-\lambda/d=-1.29$. Rearranging, and substituting for $\lambda$ in terms of the center frequency f gives:

$$f=c/d \cdot 1.0/[\sin(|\theta_S|)+1.29], |\theta_S| \leq 45° \tag{2}$$

Equation (2) now gives the maximum frequency as a function of steering angle, or scan line. This can be written in tabular form as follows:

TABLE I

| $\theta_S$ [degrees] | f [MHz] |
|---|---|
| 0 | 3.87 |
| 5 | 3.63 |
| 10 | 3.42 |
| 15 | 3.22 |
| 20 | 3.06 |
| 25 | 2.92 |
| 30 | 2.79 |
| 35 | 2.68 |
| 40 | 2.59 |
| 45 | 2.50 |

Formulated in this way, there is a substantially unique frequency for each scan line. It is clear that there is considerable flexibility to quantize the frequencies across a scan rather coarsely, and choose frequencies which are convenient, for example rounded to the nearest 0.1 MHz, or even the nearest 0.5 MHz or so. However, in the case where the selection of center frequency is rather coarse, there may be a requirement for video filtering across scan lines, to smooth the appearance of the resulting image. Such filtering may be applied, for example, either during the scan conversion process or by subsequent spatial filtering across several adjacent scan lines. In either case, the advantages described here still apply. In addition, it will be appreciated that equation (2) can be generalized for any $\theta_{S,max}$, merely by substituting the appropriate constant $K(\theta_{S,max})$ for the value 1.29 in equation (2).

Alternatively, a somewhat different strategy can be advantageously used to determine which scan lines should use which frequency step. First, a relatively high center frequency may be preselected for the central portion of the image, this frequency being maintained as a function of increasing steering angle until a predefined criteria is violated, at which time a preselected lower center frequency is used to achieve even greater steering angles, until the criteria is again violated, then an even lower preselected center frequency is used to achieve still greater steering, and so on until the maximum desired steering angle is reached.

Figure 3A:
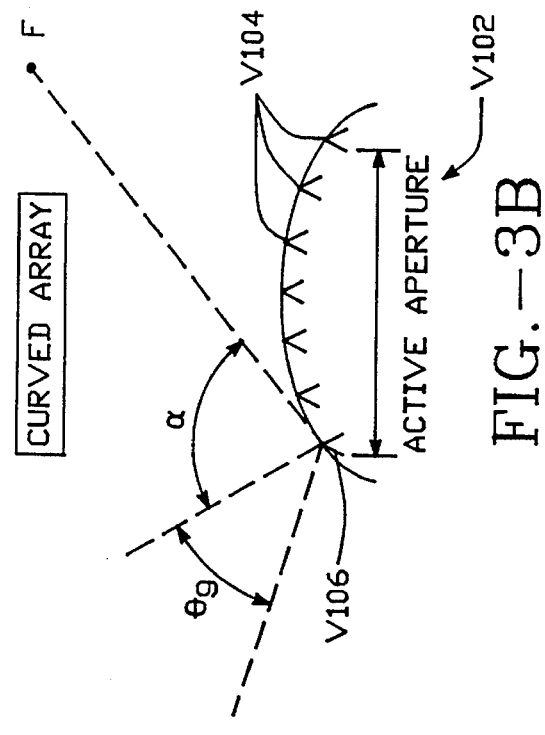
FIGS. 3A, 3B, 4A and 4B symbolically illustrate geometric parameters for an ultrasonic transducer array.
Figure 3B:
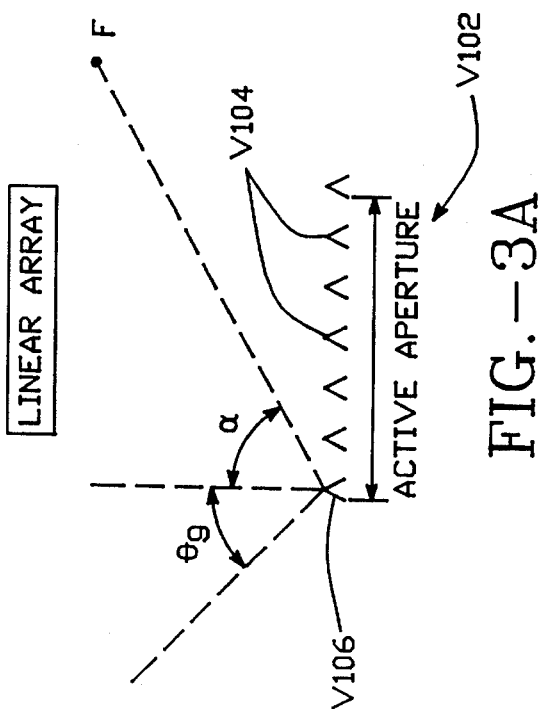

An appropriate criteria for determining at which angle to step down to a lower frequency can be determined with reference to FIGS. 3A and 3B. FIG. 3A symbolically illustrates a linear array having an active aperture V102 containing a plurality of transmit or receive elements V104. A focal point is illustrated at F. FIG. 3B illustrates the same for a curved array. In either case, it can be seen that the maximum steering angle is that associated with the end element V106 of the array, meaning the element farthest from the focal point F. We consider the steering angle of only the end element, which is equal to the acceptance angle, and the corresponding grating lobe associated with that element. Accordingly, equation (1) now becomes, referring to FIGS. 3A and 3B:

$$\sin(\theta_g) = \sin(\alpha) - \lambda/d \quad (3)$$

If we now require that the steering angle of the end element, i.e. the acceptance angle, must be less than, or in the limit equal to, the negative of the grating lobe angle, i.e. $\alpha = -\theta_g$, then the limit on the acceptance angle can be written $$\sin(\alpha) = \lambda/(2 \cdot d) \quad (4)$$

This criteria indicates that each element in the array is more sensitive to a target at the receive focal point than the same target at the grating lobe angle, except for the end element, for which the sensitivities of a target at the receive focal point and at the grating lobe angle are equal.

Figure 4A:
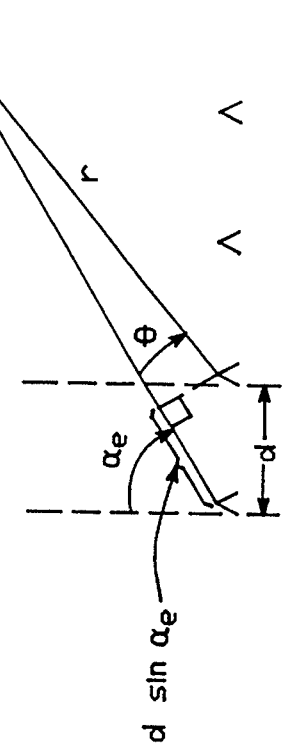
Figure 4B:
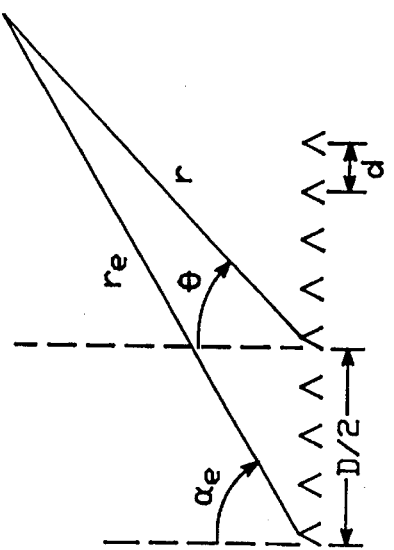

Referring now to the geometry in FIGS. 4A and 4B, we can generate a relationship between the maximum allowable steering angle in a frequency step, the active aperture and its corresponding receive focal point, and the specified center frequency. This relationship is given by $$\sin(\theta_{S,max}) = [\kappa/(2 \cdot f_\#)]\{-b + [b^2 - b + (\lambda/d \cdot f_\#)^2]^{1/2}\} \quad (5)$$

where, $b = (1 - [\lambda/(2d)]^2)$ $f_\# = (r/D) =$ the f-number $d =$ the element-to-element spacing $r =$ focal range $D =$ the active aperture $\kappa =$ a selectable constant chosen to maintain the grating lobe below a specified level, where $0 < \kappa < 1.0$. Note that $\kappa = 0.707$ guarantees that $\theta_{max} = 45$ degrees when $d = \lambda/2$.

Consider the following example:

$d = 0.308$ mm $f_\# = 6$ $\kappa = 0.707$

We can now calculate the following table:

TABLE II

| Frequency in MHz | Maximum steering angle in degrees |
|---|---|
| 3.5 | 28.4 |
| 3.0 | 34.8 |
| 2.75 | 39.2 |
| 2.5 | 45.0 |

Two different strategies for managing the frequency as a function of steering angle have thus been presented, and many variations of these strategies may be employed.

Furthermore, as previously mentioned, the technique of decreasing the transmit and/or receive frequency for linear scan formats using linear or curved linear transducers as the scan line approaches end-alignment can be an effective means to manage the grating lobe in those scan formats as well. For example, if it is desired to maintain a specific active aperture, then the relationship between the acceptance angle $\alpha$ for the end element and the frequency $f = c/\lambda$ can be derived from equations (3) and (4) above. Other strategies can be developed which take into account both steering angle and end-alignment, as would be useful for Vector® scan formats.

Note that whether the frequency steps are managed as a function of steering angle or as a function of degree of end-alignment, or both, when the frequency steps are large, it may be desirable to apply a lateral video filter to the detected video output to smooth transitions across the scan lines. The use of such video filters is well known in the art in other contexts.

C. Modulation, Demodulation and Remodulation

As previously mentioned, it is desirable for some post-beamforming, pre-detection purposes to maintain coherent phase alignment on receive, between two or more beams in a scan. That is, for a given range, it is desirable that the baseband I/Q signal received from a first receive beam be phase-aligned with the baseband I/Q signal received from a second receive beam. Beam-to-beam phase alignment is not inherent when the modulation frequency is different for the two beams, but rather, a range-dependent phase difference is introduced. Nevertheless, it can be shown that the range-dependent phase difference can be systematically corrected by remodulating the baseband I/Q signals after beamformation.

Consider an idealized representation of a signal at the output of a beamformer which has been coherently summed across multiple elements, and has undergone modulation on transmit, demodulation on receive, and coherent summation:

$$x(t-2r/c) = e(t-2r/c) \cdot e^{j[\omega_m \cdot (t-2r/c)]} \cdot e^{-j[\omega_d \cdot t]} \quad (6)$$

where, $e(t) =$ a baseband I/Q signal envelope, $\omega_m = 2\pi f_m =$ a modulation frequency [MHz], $\omega_d = 2\pi f_d =$ a demodulation frequency [MHz], $r =$ some imaging depth (range) [cm].

Note that the actual center frequency of the imaging pulse, $x(t-2r/c)$, depends additionally on other things, such as tissue attenuation, filtering in the transmit and receive processing chains, and other effects not explicitly considered in (6). Also not explicitly included in equation (6) are the detailed representations of delay and phase adjustments necessary for coherent summation, though these could be surmised by those skilled in the art. This detail is not required to motivate the particular results presented here.

The transmit modulation frequency, the receive demodulation frequency, or both, may in general be range dependent. In particular, $$\omega_m = \omega_m(R_t), \text{ and } \omega_d = \omega_d(R_r),$$

where $R_t$=the distance from the active array center to the transmit focus, $R_r$=the distance from the active array center to the receive focus.

For a system which is dynamically updated, this means that $\omega_d$ is continuously updated.

We now consider a scanline 1 corresponding to a modulation frequency $\omega_m^1$, a demodulation frequency $\omega_d^1$, and a post-beamformer remodulation frequency $\omega_r^1$; and an adjacent scan line 2, with respective modulation, demodulation, and remodulation frequencies $\omega_m^2$, $\omega_d^2$, $\omega_r^2$. It can be shown that the post-beamformed phase difference between these two scan lines as a result of the different modulation, demodulation, and remodulation frequencies can be bounded by an amount $\Delta v$, where $$\Delta v < (\omega_m^2 - \omega_m^1) \cdot T_p - [(\omega_d^2 + \omega_r^2) - (\omega_d^1 + \omega_r^1)] \cdot 2R_r/c \quad (7)$$

where, $T_p$=the imaging pulse duration at any depth of the receive beamformer signal output.

This expression is valid at the receive focal depth, $R_r$, at the point of post-beamformer remodulation. It is again noted that there may be other terms apart from $\Delta v$ which are needed to ensure phase coherence at the beamformer output apart from equation (7). Examples of such other terms include, but are not limited to, terms which account for the offset in the beam origin, such as naturally arise in Vector®, linear, and curved linear formats, particularly with end alignment. As expected, $\Delta v = 0$ when $\omega_m^2 = \omega_m^1$, $\omega_d^2 = \omega_d^1$, and $\omega_r^2 = \omega_r^1$.

We now make the observation, from equation (7), that providing for remodulation at the post-beamformer, pre-detected output with a frequency $\omega_r$ permits scan-line-to-scan-line phase coherence by its proper selection. In particular by selecting $\omega_r^1$ and $\omega_r^2$ such that $$\omega_d^1 + \omega_r^1 = \omega_d^2 + \omega_r^2 \quad (8)$$

then the second term of equation (7) may be substantially ignored. Note that if $\omega_d$ is range dependent, such as would be the case for a range tracking system, then $\omega_r$ must also be range dependent.

The first term of equation (7), given by $(\omega_m^2 - \omega_m^1) \cdot T_p$ may be readily managed by keeping $(\omega_m^2 - \omega_m^1)$ sufficiently small. As an example, consider the requirement that $\Delta v < \pi/4$, and suppose that, as might be typical, the imaging pulse measured at the point of remodulation for a tracking focused system has a duration that is four cycles of the nominal modulation frequency. Then the required limit on scan-line-to-scan-line frequency variation becomes approximately, from equations (7) and (8), $f_m^2 - f_m^1 < f_m^1/32$. If the nominal modulation frequency is 5 MHz, then the scan-line-to-scan-line modulation frequency difference is constrained to be less than 0.156 MHz, in this example.

Thus, if post-beamformation, pre-detection receive processing requires beam-to-beam phase coherence for all beams in a scan, then the maximum transmit carrier frequency differential between any two beams in the scan should be chosen to meet the above criteria.

The above relationship (8) defining the remodulation frequencies is independent of the modulation frequencies on transmit. Such independence assumes that both the modulation signal and the demodulation signal for all transmit and receive channels are phase-locked to a common timing clock reference. That is, the phases of all such modulation and demodulation signals are defined relative to a common time reference.

The above relationship (8) also assumes that the modulation frequencies on successive transmit scan lines and the demodulation frequencies on successive receive scan lines are each slowly varying to avoid $2\pi$ phase ambiguities. That is, $f_d^1 \approx f_d^2$ and $f_m^1 \approx f_m^2$. This constraint is consistent with the problem being solved.

The above relationship (8) also assumes a "well-focused" system, wherein any observation made concerning a point in the field of view occurs at a time when the receive focus is at that point (i.e. tracking, or dynamic focus), regardless of whether a target is also at that point.

Note that while the above remodulation preferably takes place after receive beamformation and prior to detection, it can instead be performed on a per-channel basis prior to coherent channel summation. Also, note that there may be other systematic phase variations which may need to be corrected in addition to the correction for the varying modulation and demodulation frequencies, such as phase variations introduced by analog filters, transducer elements, and the like. If so, then these corrections should be made as well. Typically, they will merely be added to the phase corrections described above to produce an overall phase correction.

D. Implementation in a Digital Ultrasound Imaging System

An important feature of the present invention is the ability to translate in frequency the transmitted and received waveforms by modulation and demodulation. In the preferred embodiment, this is done in the context of a digital architecture, and in combination with coarse and fine delays, both on transmit and receive. Through such a process, there is substantially no loss of information as the carrier (or modulation) frequency is varied on a scan-line-by-scan-line basis. The digital architecture described here further permits precise control over the transmitted pulse shape and bandwidth, and further easily permits excitation with multiple beams being simultaneously transmitted and/or received. The overall block diagram of the architecture is set forth in FIGS. 2a, 2b and 2c discussed above. A more detailed description of the transmit beamformer is given in Appendix A, and a more detailed description of the receive beamformer is given in Appendix B.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, in a different embodiment, different beams in a multi-beam firing can have different carrier frequencies. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

APPENDIX A

DIGITAL TRANSMIT BEAMFORMER SYSTEM PREFERRED EMBODIMENT

VI. Digital Multichannel Transmit Processor Digital Signal Processing

In the preferred embodiment, the transmit beamformer T102 includes a substantially independent waveform generating processor for each transmit element. Transmit processors T104 are referred to herein as multi-channel processors because each of the individual transmit processors can provide multiple, programable complex envelope waveform generation. A substantially continuous range of imaging frequencies is supported.

Overall, each transmit processor performs the primary functions of (1) waveform shaping of one or more waveforms for one or more beams, (2) apodization, and (3) insertion of steering/focusing time delays for such waveforms. To perform waveform shaping for a PW transmission, the signal path begins with initial waveform samples at a rate $R_E$ below that of the DAC T121 sampling frequency $F_s$. The initial waveform samples can have a frequency spectrum centered at 0 Hz, or can be offset from 0 Hz. Waveform shaping in the present embodiment involves the steps of upsampling the initial waveform samples to $F_s$, as well as modulating the waveforms by the desired carrier frequency $F_c$. Amplitude weighting (apodization) can also be considered part of the waveform shaping operation. The steps of upsampling, modulating, apodizing and delaying, as well as appropriate filtering, can be performed in any sequence in a digital transmit beamformer, and individual ones of these steps may even be divided into sub-steps which are separated and performed at different parts of the signal path. Additionally, some steps or sub-steps may be combined for implementation in a single hardware unit.

Note that the output carrier frequency is considered herein to be substantially the same as the desired programmed carrier frequency $F_c$, but may not be identical because of filter effects in the signal path. $F_c$ is set by the central control system C104 through the download of parameters.

a. Transmit Processing Modes

Before describing the functional blocks in a digital multi-channel transmit processor of the preferred embodiment, it will be useful to understand the various processing modes (not to be confused with imaging modes discussed above) in which each transmit processor can operate. Ideally, it would be desirable for each transmit processor to be able to produce waveforms for any number of superposed and separately delayed and apodized transmit beams up to some maximum, at any carrier frequency up to some maximum, specified with initial waveform representations sampled at any sample rate up to some maximum. This would require extensive processing power, however, especially if the maximums are large. Since processing power is limited in any system, it would seem that these maximums must be kept low enough such that the hardware is able to keep up when all three parameters are specified at maximum. The present embodiment, on the other hand, makes better use of the available processing capacity by permitting trade-offs among these three parameters and allowing the central control system to choose to optimize different ones of them depending on the clinical setting.

Table A1 sets forth some of the processing modes which can be selected by central control system C107 for a given transmit processor T104 of transmit beamformer T102. Different embodiments can support fewer or greater numbers of modes and fewer or greater numbers of beams. As used in the Table:

- $F_s$ is the system clock frequency at which samples are converted by the DACs T121 (FIG. 1B). The central control system C104 can select $F_s$ from a variety of available frequencies.

- $F_0$ is a transmit signal nominal center frequency. $F_0$ is specified to the multi-channel transmitter as a fraction of $F_s$ and is equal to (or near) the carrier frequency.

- $R_E$ is the per-beam initial waveform sampling rate. The ratio $R_E/F_0$ represents the number of real or complex samples per period of the transmit signal nominal center frequency $F_0$, at which the initial waveform can be sampled.

- $\lambda_0 = c/F_0 =$ the acoustic wavelength at $F_0$.

- $c =$ the speed of sound in the body.

- $\gamma_E =$ per-beam initial waveform sample interval $= c/2R_E$.

- $N_B =$ maximum number of simultaneously-produced beams for the given transmit processing mode. (Note that the beamformer can be operated to produce fewer than $N_B$ beams if desired; for example, in a mode for which $N_B=4$, the beamformer can be operated to produce only three beams if desired, although this would not make full use of the available hardware processing power.)

TABLE A1

TRANSMIT PROCESSING MODES

| $F_0$ | $N_B = 1$ | $N_B = 2$ | $N_B = 4$ |
|---|---|---|---|
| $F_S/32$ | BW Mode 0<br>$R_E = 8F_0$<br>$\gamma_E = \lambda_0/16$ | BW Mode 1<br>$R_E = 4F_0$<br>$\gamma_E = \lambda_0/8$ | BW Mode 2<br>$R_E = 2F_0$<br>$\gamma_E = \lambda_0/4$ |
| $F_S/16$ | BW Mode 1<br>$R_E = 4F_0$<br>$\gamma_E = \lambda_0/8$ | BW Mode 2<br>$R_E = 2F_0$<br>$\gamma_E = \lambda_0/4$ | BW Mode 3<br>$R_E = F_0$<br>$\gamma_E = \lambda_0/2$ |
| $F_S/8$ | BW Mode 2<br>$R_E = 2F_0$<br>$\gamma_E = \lambda_0/4$ | BW Mode 3<br>$R_E = F_0$<br>$\gamma_E = \lambda_0/2$ | BW Mode 4<br>$R_E = F_0/2$<br>$\gamma_E = \lambda_0$ |
| $F_S/4$ | BW Mode 3<br>$R_E = F_0$<br>$\gamma_E = \lambda_0/2$ | BW Mode 4<br>$R_E\ F_0/2$<br>$\gamma_E = \lambda_0$ | N/I |
| $3F_S/8$ | BW Mode 5<br>$R_E = 2F_0/3$<br>$\gamma_E = 3\lambda_0/4$ | BW Mode 6<br>$R_E = F_0/3$<br>$\gamma_E = 3\lambda_0/2$ | N/I |

As can be seen by reading horizontally across the Table, for each transmit signal nominal center frequency $F_0$, the hardware permits a larger number $N_B$ of superposed waveforms to be traded off against an increased per-beam initial waveform sample interval $\gamma_E$, and vice-versa. A larger $N_B$ translates into a higher frame rate (since the entire field of view can be scanned with the same number of beams but fewer firings), while an enhanced initial waveform sample interval $\gamma_E$ (smaller value of $\gamma_E$) can translate into a sharper image in range, For example, therefore, in a display mode which displays a color flow Doppler (F-mode) image superimposed on a grey-scale (B-mode) image, produced by interleaving F-mode and B-mode pulse firings respectively, the central control system C104 may operate transmitters T102 at $N_B=1$ for all B-mode imaging pulses and at $N_B=2$, or $N_B=4$, for color flow Doppler imaging pulses.

Similarly, reading vertically down the Table and excluding bandwidth modes 5 and 6, it can be seen that for a given maximum number of beams $N_B$, processing modes having a higher nominal center frequency $F_0$ also have a larger (and therefore poorer) per-beam initial waveform sample interval $\gamma_E$ (relative to $\lambda_0$). (The per-beam initial waveform sample interval $\gamma_E$, when expressed as the ratio $\gamma_E/\lambda_0$, referred to herein as the frequency-normalized per-beam initial waveform sample interval.) A clinician typically selects a transducer array operable at the imaging frequency appropriate for a desired penetration. In doing so, the clinician trades off penetration for overall image resolution (ability to distinguish two targets). (The latter trade-off is inherent in the physics of ultrasound since greater penetration is achieved by reducing the imaging frequency, which in turn reduces the overall image resolution.) For a given maximum number of beams $N_B$, the desired penetration determines $F_0$ in the Table, which in turn determines a processing mode having the optimum frequency-normalized per-beam initial waveform sample interval which the hardware can provide at the selected $F_0$. That is, as $F_0$ decreases to achieve greater penetration, the signal processing path in each transmit processor T104 need not process as many samples per second per beam (at least at early stages of the signal processing pipeline). This leaves hardware processing capacity available, which the system can exploit by increasing $R_E/F_0$ and hence improving the frequency-normalized per-beam initial waveform sample interval $\gamma_E/\lambda_0$.

Further, by reading diagonally across the Table (upward to the right), and again excluding modes 5 and 6, it can be seen that the hardware permits a lower $F_0$ to be traded off for a larger number of beams $N_B$ at a constant frequency-normalized per-beam initial waveform sample interval $\gamma_E/\lambda_0$.

Described more generally, the modes with which the multi-channel transmitter T102 can be specified to operate actually offer trade-offs between three parameters: $N_B$, $F_0$ and $\gamma_E/\lambda_0$ (or equivalently, $R_E/F_0$). Thus each processing mode defines a parameter set $\{N_B, F_0, \gamma_E/\lambda_0\}$. All of the processing modes shown in Table A1 satisfy the rule that, for a given $F_s$ the product of the maximum number of beams $N_B$ and the transmit signal nominal center frequency, divided by the frequency normalized per-beam initial waveform sample interval, is constant. In addition, the following relationships hold:

$$\gamma_E = 2 \cdot c \cdot N_B / F_s$$

and $$R_E = F_s / 4 N_B.$$

Assuming each transmitter T102 is operated to produce the maximum number of beams $N_B$ in the selected processing mode, all of the modes in Table A1 fully utilize the processing capacity of the transmit processor hardware signal paths. The preferred embodiment also supports additional processing modes not shown in Table A1, and which do not fully utilize the processing capacity of the system. Furthermore, while modes 5 and 6 are included in Table A1 for completeness of the description, they are not important for an understanding of the invention and are therefore excluded from the remainder of the discussion below.

b. Coarse Time Delay

Figure 5:
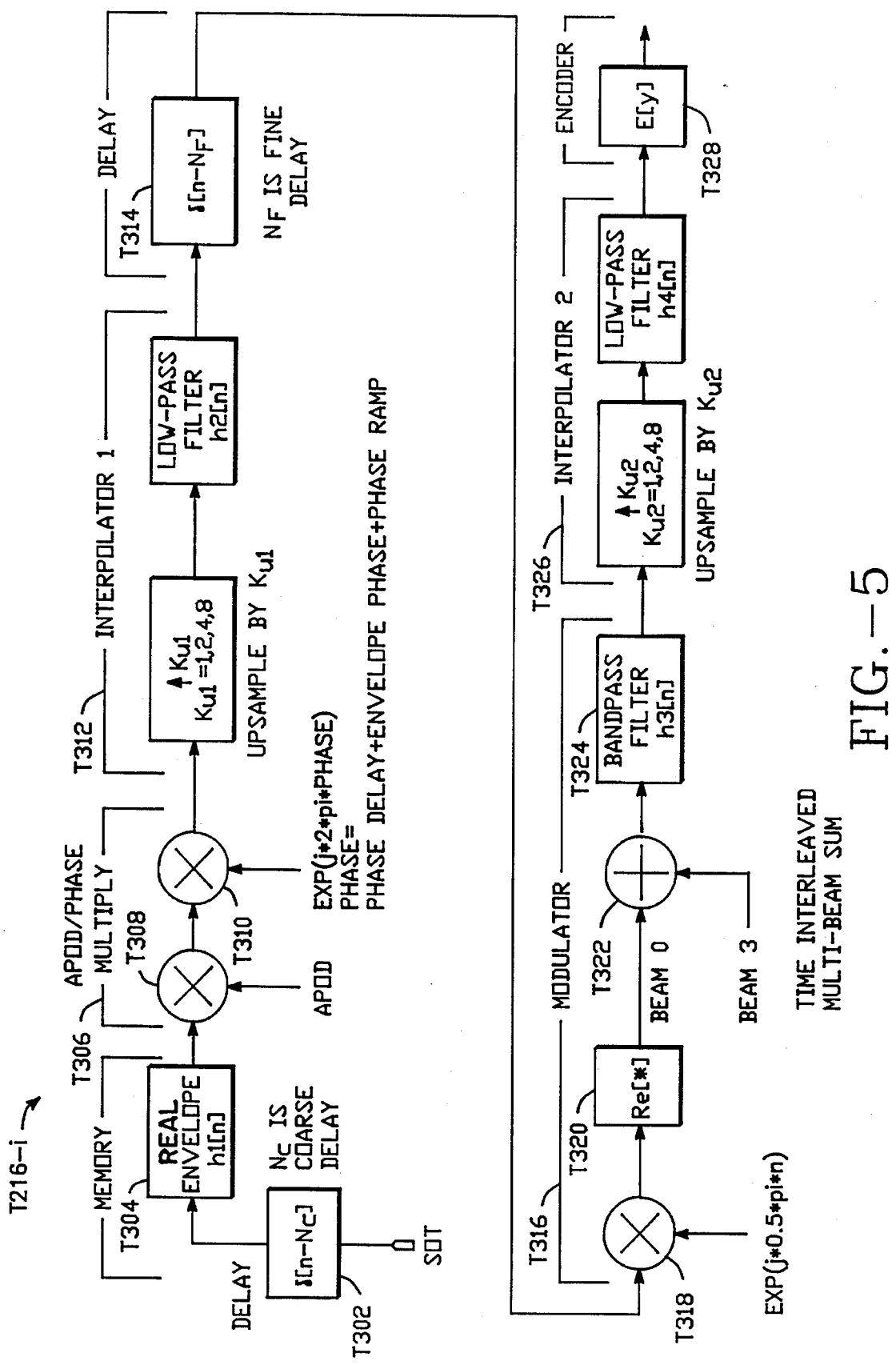
FIG. 5 is a functional block diagram of the signal path of one of the digital multichannel transmitters of FIG. 2C.

FIG. 5 is a functional block diagram of one of the digital multi-channel transmit processors T104. In this signal path, upsampling is accomplished in two sub-steps (interpolator 1 and interpolator 2). Modulation to the transmit carrier frequency $F_c$ is also accomplished in two sub-steps, and focusing is accomplished in three steps. The focusing function permits the waveform output produced by the transmitter for each beam to be delayed as necessary for beamforming, in accordance with a delay profile across all active processors. An overall delay word is provided for each beam by the central control system C104 with a high precision and is expressed in integer and fractional sample units of $T_0 = 1/F_0$. The division of this value into three components in the preferred embodiment of the transmit processor T104 involves roughly a separation of the delay word into three precision groupings. The high-order portion, down to a precision of one unit of envelope sampling time $T_E = 1/R_E$, forms the coarse delay integer value $N_C$. The middle-order portion of the word, down to a precision of four units per nominal center-frequency period $T_0 = 1/F_0$, forms the fine delay integer value $N_F$. The remaining low-order bits of the delay word are used to calculate the phase portion $\phi_D$ of the delay, according to the formula $\phi_D = -2\pi v_\phi \tau_\phi$, where $\tau_\phi$ is the low-order portion of the delay word representing fractional units of $T_0$, and $v_\phi$ is the vernier frequency scaling factor $F_c/F_0$. Note that the transmit processor T104 can also be programmed by the central control system C104 to use an alternate value for $v_\phi$ if desired.

Referring to FIG. 5, the SOT (start-of-transmit; common for all transmit processors) signal triggers a coarse delay T302, which delays the start of read-out of initial waveform samples by $N_C$ sample times at the sampling rate $R_E$ (period $T_E$). Thus the delay imposed by delay unit T302 is $N_C T_E$ relative to the SOT signal.

c. Initial Waveform Sample Memory

As can be seen in FIG. 5, the output of delay unit T302 drives the read-out from memory T304 of initial waveform samples. The output of initial waveform sample memory T304 functionally is provided to one input port of a multiplexer T305, the other input port of which receives a value of unity. For PW firings, the multiplexer selects the memory sample words to its output, whereas for generating a CW output, the multiplexer selects the constant unity input.

Waveform samples in memory T304 may be real instead of complex, saving memory space because a complex value occupies two words, whereas a real value occupies one word. Preferably, the initial waveform is at baseband (at or near 0 Hz), in which case it represents the complex envelope of the transmitter output pulse. The only limitation on number of initial waveform samples is the total number of words available for storage in memory T304. Other than that, any number of separate initial waveforms can be downloaded into the memory T304, beginning at any address. Prior to a firing, the central control system C104 can download the start address, number of samples, and actual sample values for each beam in each processor, so a wide variety of different options are available for waveform generation with each firing.

For example, a single initial waveform can entirely fill the memory T304, or multiple waveforms can fill different parts of memory T304. As another example, the central control system C104 can download two different waveforms, and by programming alternate start addresses on alternate firings, can generate differently shaped transmit pulse waveform outputs on alternate firings. This last example might be useful, for example, to interleave firings for two alternating imaging modes. Specifying different initial waveforms per beam permits depth- and angle-dependent pulse shaping, whereas specifying different initial waveforms for different imaging modes permits implementation of different mode-dependent compromises for such tradeoffs as spatial resolution versus signal-to-noise ratio (SNR).

The ability to program initial waveforms digitally not only permits the generation of pulses having a waveform approximating one that does not distort during transmission through attenuative media such as the body (e.g., a Gaussian shape), it also permits a waveform to be programmed which improves axial resolution by compensating for the undesired characteristics of transducer impulse response such as bi-modal response and long ring-down response. The choice of initial waveform samples can also pre-compensate for (1) distortions in the analog transmit and receive paths, (2) distortions in the digital filter responses in the transmit and receive beamformers, and (3) some distortions in the propagation path of the ultrasound signal. This latter compensation can reduce the effect of frequency-dependent attenuation on either the SNR or the lateral resolution. These are all significant advantages over the capabilities of prior art ultrasonic transmit beamformers.

If the initial waveform samples provided in memory T304 are complex, then in some embodiments it might be provided in in-phase/quadrature form, whereas in other embodiments it might be provided in magnitude/phase form. In the implementation of the preferred embodiment described herein (see FIG. 6), it will be seen that the information is provided in magnitude/phase form.

d. Apodization/Phasing

The initial waveform sample output of memory T304 is connected to an apodization/phase multiply unit T306, which multiplies the magnitude of each sample by an apodization value in multiplier T308, and then, in multiplier T310, rotates the phase of each sample to a phase $\phi$ given by the sum of the waveform sample phase $\phi_E$, the phase portion $\phi_D$ of the delay, and a vernier phase ramp value $\phi_R$ derived from the vernier factor $v=F_c/F_0$. $\phi_D$ is a constant during waveform generation and is calculated once during a pre-waveform-generation setup. The phase $\phi_E$ and the sample phase ramp $\phi_R$, however, change for each initial waveform sample. Thus, the sum $\phi=\phi_D+\phi_E+\phi_R$ is calculated for each initial waveform sample.

Alternatively, the low-order portion of the delay could be accomplished by an interpolation of waveform samples to create signal samples at equivalent time delay in the signal path. See section 6.3.2 of the text by Dudgeon and Mersereau for a general discussion of interpolation beamforming. In this case, $\phi=\phi_E+\phi_R$ only.

In another embodiment, the low-order portion of the delay, or even the entire delay, could be accomplished using a focusing filter, as described for filter-and-sum beamforming in section 6.2.5 of the previously cited text by Dudgeon and Mersereau. Such a filter is programmed differently for each digital multi-channel transmit processor, and each waveform associated with each beam within a transmit processor, to account for the desired signal delay versus frequency characteristic needed to support transmit beamformation. The filter will therefore generally have a nonlinear phase response. The focusing filter characteristics therefore contrast with the signal path filters associated with the interpolation and modulation operations shown in FIG. 5, which preferably have linear-phase responses (therefore yielding no distortion of signals processing through such a filter) and which are typically set to identical characteristics in all transmit processors. The interpolation and modulation operation filters are used for waveform shaping, not beam-forming, and the same waveform (with appropriate delay and apodization) is normally created in all transmit processor, although the invention supports selection of different filters among transmit processors.

$\phi_R$ is calculated as follows. As previously mentioned, the signal path of FIG. 5 modulates the initial waveform samples by the desired carrier frequency $F_c$ in two operations. For a programmed $F_c$, the central control system C104 (FIG. 1A) selects from a plurality of transmit signal nominal center frequencies $F_0$ (which sets the digital processing rate) close to $F_c$ and calculates a vernier factor $v=F_c/F_0$. As suggested in Table A1, the available values for $F_0$ each represent one of a plurality of available fractions of the DAC sampling frequency $F_s$, which the central control system C104 also selects from one of a plurality of available clock frequencies. Thus in selecting an $F_0$, the central control system C104 determines which sampling frequency $F_s$ to use and which fraction of F, should determine $F_0$.

The central control system C104 does not explicitly download $F_0$ to each transmit processor T104; rather, it controls the frequency generator T256 to generate $F_s$, and downloads a value for the interpolator 2 integer upsampling factor $K_{u2}$. That information implicitly specifies $F_0$ according to the relationship $F_0=F_s/4K_{u2}$. It should be noted, however, that the information required by each transmit processor T104 is $K_{u2}$, not $F_0$. The transmit processor T104 does not explicitly need to know $F_0$, but only information relative to the clock frequencies.

In order to account for the difference between $F_0$ and $F_c$, the central control system C104 downloads v to each transmit processor T104. Each transmit processor then computes the phase ramp term $\phi_R$ according to the formula:

$$\phi_R = 2\pi K_{u1}(v-1)n/4,$$

where n is the initial waveform sample number. Each transmit processor T104 calculates $K_{u1}$ (the upsampling factor for interpolator 1) from $K_{u1}=4N_B/K_{u2}$ based on the number of beams $N_B$ and interpolation factor $K_{u2}$, which was downloaded from the central control system C104.

Theoretically v can range from 0 (inclusive) to 2 (exclusive) (a range which can be expressed using the shorthand notation "[0,2]"). As a practical matter, however, the filter response characteristics of the filters h2, h3 and h4 in the transmit processor signal path limit the usable range for v to some smaller range within (0,2).

The frequency vernier factor v can be specified independently for different beams being produced by the transmit beamformer system T102, for example to reduce beam interference or to increase penetration of deeper focusing beams. Independent values of v could also be specified for mixed imaging modes, in order to achieve the desired imaging-mode-dependent compromises between resolution and sensitivity (which determines penetration depth). The central control system C104 also has the ability to download independently-selected v for each of the plurality of transmitters T103 (i.e., for different transducer elements T114 in the array T112), and can download values for v in advance of each firing if desired.

e. Interpolator 1

The output of apodization/phase multiplier T306 is provided to a first interpolator T312 which upsamples the sampled waveform information by the factor $K_{u1}$ and low-pass filters it using a filter h2. The factor $K_{u2}$ depends on the processing mode in which the transmit processor T104 is operating. Specifically, $K_{u1}$ takes on whichever value is necessary to bring the sample rate on the output of interpolator T312 to four samples per period of the transmit signal nominal center frequency $F_0$. In general, therefore, $K_{u1}=4F_0/R_E$. $K_{u1}$ is not downloaded to the transmit processor, but is derived by the transmit processor calculation $K_{u1}=4N_B/K_{u2}$ as mentioned above.

Filter h2 is used to low-pass filter the up-sampled output of the $K_{u1}$ up-sampler in order to remove replicated images of the original signal at higher frequencies. As used herein, the operations performed by an "interpolator" (or "upsampler") and "decimator" (or "downsampler") are reciprocal operations, and either can take place with a factor either larger or smaller than unity. Thus, for example, upsampling by a factor of ½ is the same as decimating by a factor of 2. Also as used herein, a digital signal processing interpolator, or simply "interpolator," performs both upsampling and filtering, as described in sections 2.3.3 and 2.4 of the text by Crochiere and Rabiner. The filter transfer function in an interpolator can be unity, in which case the interpolator is the same as an upsampler alone.

f. Fine-Time Delay Memory

The output of the first interpolator T312 is provided to a second delay unit T314 which delays each sample by $N_F(T_0/4)$ ($N_F$ is an integer). As set forth above, $N_F$ is the fine delay portion of the overall desired time delay. Thus, a coarse delay of $N_C T_E$ is applied in delay unit T302 to a resolution of one sample interval at the initial waveform sampling rate, and a fine delay $N_F(T_0/4)$ is applied by delay unit T314 to a resolution of ¼ period of the transmit signal nominal center frequency $F_0$ for bandwidth modes 0 through 4, and ¾ period for bandwidth modes 5 and 6. If the initial waveform sample rate is equal to four samples per cycle of $F_0$ (i.e. if $R_E=4F_0$), then delay unit T314 would introduce no additional time delay. The phase portion $\phi_D$ of the overall desired time delay (applied in the apodization/phase multiply unit) is a phase rotation at the nominal center frequency equivalent to the fractional portion of the desired time delay that is less than $(T_0/4)$.

g. Modulator

The output of delay unit T314 is provided to a modulator T316. In multiplier T318 of the modulator T316, modulation of the initial waveform by $F_0$ is accomplished by multiplying by $\exp(jn\pi/2)$, in which n corresponds to the sample index. This embodiment's choice of an intermediate sample rate (after the first interpolator) of four samples per cycle of $F_0$ is advantageous because $\exp(jn\pi/2)$ then takes on only the values (−1, 0, 1). Multiplier T318 thus can be implemented very simply in hardware by appropriate add and subtract operations. In a different embodiment, the intermediate sample rate could be made equal to two samples per cycle of $F_0$.

In functional block T320 of the modulator T316, the transmit processor takes the real part of the modulated signal output of the multiplier T318. In hardware implementation, blocks T318 and T320 can be combined by having the multiplier T318 simply not generate any of the in-phase or quadrature samples which would be discarded by block T320.

The signal path in FIG. 5 from the SOT signal through block T320 is conceptually paralleled for each beam being produced by the transducer array, effectively providing separate channels. (In implementation, the different beams are interleaved through a common set of hardware.) In summer T322 of the modulator T316, all the beams are de-interleaved and superposed together. The result is band-pass filtered through a filter h3, annotated as block T324 of the modulator T316. Filter h3 is a band-pass filter used to attenuate energy at 0 Hz and at image frequencies that were not sufficiently reduced by filter h2.

h. Interpolator 2

The output of modulator T316 is then upsampled by a second interpolator T326 to the DAC input sample frequency $F_s$. Interpolation is accomplished by upsampling the signal by the factor $K_{u2}$ and low-pass filtering the result through a filter h4. In general, $K_{u2}=F_s/4F_0=F_s/K_{u1}R_E$. Filter h4 is used to filter out unwanted images after the signal has been upsampled to the DAC sample frequency. The design of interpolation filters and interpolators is well known in the art (as described in the above-cited Multirate Digital Signal Processing by Crochiere and Rabiner) and need not be further described herein.

i. DAC Encoder

The output of interpolator T326 is encoded by encoder T328 to the form required for DAC T121 (FIG. 1B) and provided thereto. The encoder T328 also hard limits the filtered data into the available DAC range.

Note that the signal path of FIG. 5 forms a pipeline in which downstream units may be processing earlier samples of the waveform at the same time that upstream units are processing later samples of the waveform. Even though such operations run in parallel and overlap in processing time, the upstream units are still referred to herein as performing their functions "before" the downstream units. Also, while the pipelining of functions is preferred, it will be understood that in another embodiment, a digital transmit beamformer can be implemented sequentially in which each step is performed in its entirety for the entire pulse waveform before the next step is performed. Intermediate embodiments are possible as well.

1. Hardware Implementation of Signal Processing Path

As previously mentioned, several of the functions of various ones of the functional units illustrated in FIG. 5 can be combined on implementation to reduce the amount of hardware required to accomplish the joint functions. Also, in some situations, the conceptual function depicted in FIG. 5 reduces to a simple degenerate case that can be implemented using little or no hardware at all. Before describing the local control processors for the signal path of FIG. 5, it will be useful to understand some aspects of the hardware implementation of the signal path.

Figure 6:
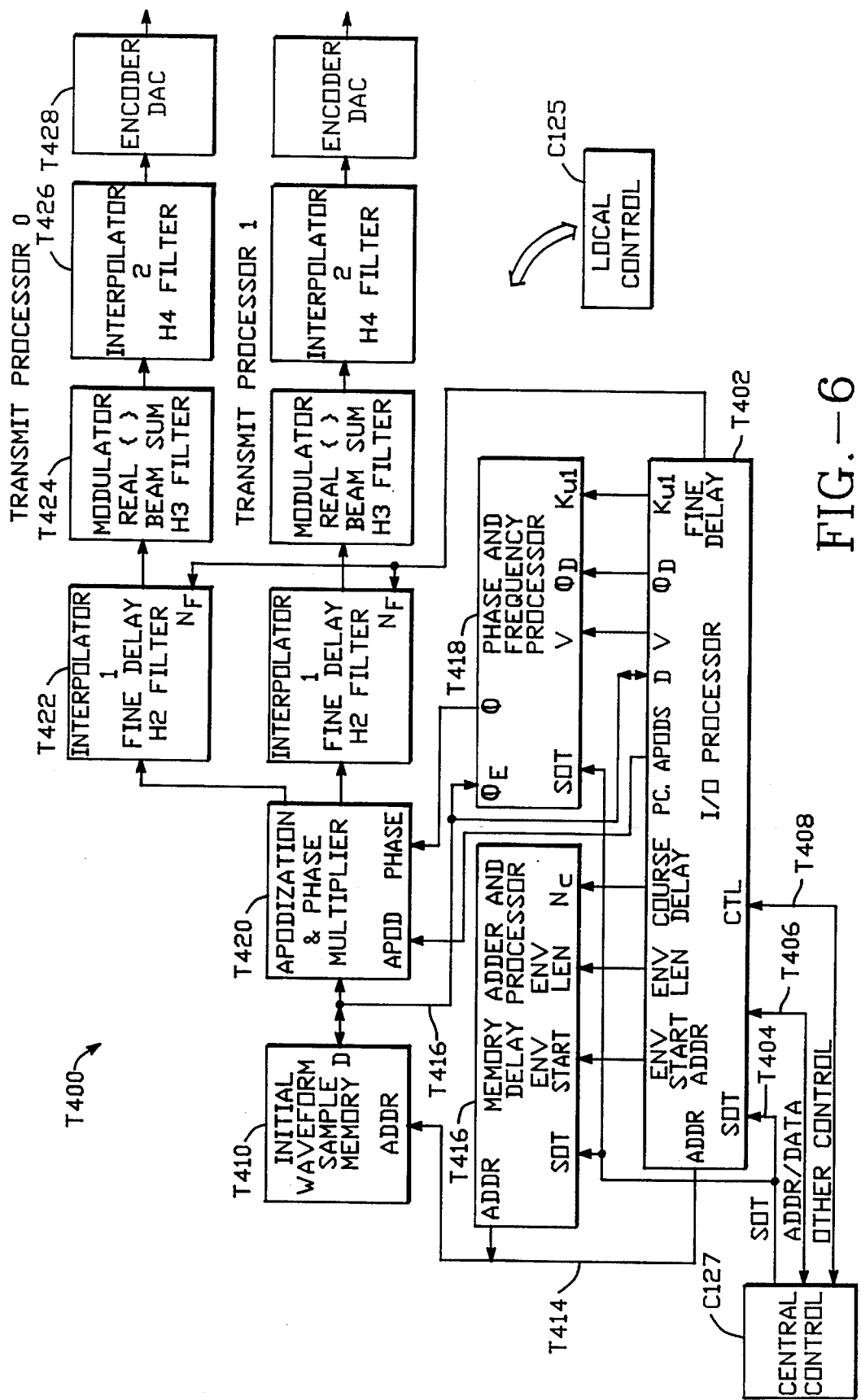
FIG. 6 is a block diagram of an implementation of apparatus which implements two transmit processors of the transmit beamformer of FIG. 2C.

FIG. 6 is a block diagram of a preferred implementation of apparatus T400 which implements two digital multi-channel transmit processors of the transmit beamformer system T102. The pairing of processors permits advantageous sharing of certain hardware as will be seen below. A portion of the transmitter pair in FIG. 6 is fabricated on a single chip.

Referring to FIG. 6, the initial waveform sample memory T410 contains the initial waveform information for all beams in both transmit processors. The sample values are written to initial waveform sample memory T410 by an I/O processor T402 (described below) in response to the downloading of the samples by central control system C104. The memory T410 is organized as a plurality of double-words or as twice as many single-words, and as viewed by the central control system, is memory-mapped in the same address space as the parameter registers in the I/O processor T402, also described below. The memory can contain any combination of real and/or complex waveforms of varying lengths as long as the total length occupied by the waveforms stored is less than or equal to the total memory space available.

Individual initial waveform samples are read out of memory T410 at the initial waveform sample rate $R_E$, which is the same for every beam of both transmit processors and is dependent on $F_0$ and $N_B$. Since multi-beam waveform samples are read from the memory T410 in a time-interleaved manner, all processing modes shown in Table A1 maximize hardware usage by using the maximum memory data rate of $R_D=2R_E N_B$ samples per unit time.

While the phase portion of each complex sample read from memory T410 is provided to the $\phi_E$ input of phase and frequency processor T418 as described below, the magnitude portion $M_E$ is provided to apodization and phase multiplier T420. Apodization and phase multiplier T420 also receives pre-computed apodization values from I/0 processor T402 (interleaved by transmit processor and beam number) and phase outputs $\phi$ of phase and frequency processor T418 in in-phase/quadrature (I/Q) format (interleaved by transmit processor and beam number). Functionally, apodization and phase multiplier T420 converts each sample value from magnitude/phase format $M_E \exp(j\phi_E)$ to I/Q format $M_E \cos(\phi_E)+jM_e \sin(\phi_E)$ at the same time that it multiplies the magnitude $M_E$ by the apodization value and adds to the phase to account for the delays and phase ramp. The output of apodization and phase multiplier T420 is produced at a rate of $4R_E N_B$ values per unit time, with values interleaved by I and Q values, by transmit processor and by beam number. These values are separated at this point into two parallel sequences, the values for transmit processor 0 being used by the transmit processor 0 path and the values for transmit processor 1 being used by the transmit processor 1 path. The individual transmit processor outputs are therefore each provided at a rate of $2R_E N_B$, in a form which is interleaved by beam number and I/Q values. At this point, only the functional blocks for the remainder of transmit processor 0 will be described since the functional blocks for the remainder of transmit processor 1 are identical.

The output of apodization and phase-multiplier T420 for transmit processor 0 is provided to a block T422 which performs the functions of both the first interpolator T312 and the fine delay unit T314 (FIG. 5), including low-pass filter h2. Specifically, it performs upsampling by $K_{u1}$, fine delay by $N_F$, and filtering by h2, and a portion of the Re{ } (real part) function, all together. Upsampling by $K_{u1}$, which theoretically requires the insertion of $(K_{u1}-1)$ zeros between samples of each waveform of each beam, is accomplished simply by observing the contents of internal pipeline registers at a rate of $K_{u1}$ times the rate at which they are being loaded.

Note that the processing block T422 does not need to generate both an in-phase (I) and quadrature (Q) component for each output sample. Due to the choice of modulation frequency described hereinafter and the sufficiency of computing only the in-phase values required by the Re{ } function, it will be appreciated by those skilled in the art that, depending on the output sample, only an I or a Q component needs alternately to be generated for each output sample.

The output of block T422 carries $K_{u1}R_E N_B=4F_0 N_B$ samples per unit time, interleaved by beam number. Again, the processing modes of transmit processors T104 permit a trade-off at this point between the transmit signal nominal center frequency $F_0$ and the number of beams $N_B$.

Processing block T424 performs all of the functions of modulator T316 (FIG. 5). Modulation by $F_0$, as well as the Re{ } function, are accomplished entirely by a selective negation operation (not shown) in the signal path. This is possible because the modulation frequency was fixed at four times the sample rate at this point.

The output of the processing block T424 is interleaved by beam. It still has a data rate of $4F_0 N_B$ samples per unit time, which by now are all real values. The processing block T424 then sums the interleaved values for the different beams to produce a composite sample for the transmit processor. All $N_B$ waveforms being produced by the transmit processor are at this point superposed. Processing block T424 then performs filtering by h3 on the composite sample stream in a conventional manner.

The output of processing block T424, which occurs at a real-valued sample rate of $4F_0$, is provided to the second interpolator block T426. As with the upsampler in processing block T422, the interpolator T426 upsamples the input sample rate to $4K_{u2}F_0=F_s$ simply by creating the output values at a rate of $F_s$ from the input values which were clocked into pipeline registers (not shown) in the block T426 at the input sample rate $4F_0$. The signal is then filtered by h4.

The output of the second interpolator T426 is connected to the input of an encoder/DAC block T428 and provided at the full DAC sampling frequency of $F_s$. The encoder/DAC T426 is described in more detail below.

2. Local Control Processors

The apparatus of FIG. 6 also includes an I/O processor T402, which handles the reads and writes to all programmable resources in the apparatus. In addition, the I/0 processor calculates some parameters during a pre-compute operation prior to each transmit firing. All downloading of parameters to the apparatus T400 occurs from the central control system C127 through an address/data multiplexed bus T406 to memory-mapped parameter registers located functionally within the I/O processor T402. Some of the registers are programmable by the central control system C104 per beam and per transmit processor, whereas others are programmable only for the transmit processor pair. Still other parameter registers in I/O processor T402 (such as $K_{u1}, N_C, N_F$ and $\phi_D$) have their contents precomputed by the I/O processor T402 prior to each firing.

The two processors in the processor pair T400 also share a common memory address and delay processor T416 and a common phase and frequency processor T418. The memory address and delay processor T416 receives the SOT signal, as well as the initial waveform sample start addresses (per beam and per transmit processor), the waveform length information (per beam and per transmit processor) and the coarse delays $N_c$ (per beam and per transmit processor) from the I/O processor T402. It provides addresses on a sample memory address bus T414 in order to read out initial waveform samples in a manner which is interleaved by transmit processor, by beam and by magnitude/phase values.

The phase and frequency processor T418 receives the SOT signal from central control system C104, as well as the input sample phases $\phi_E$ arriving from sample memory T410. From I/O processor T402, it receives the frequency vernier factors v (per beam and per transmit processor), the phase portion $\phi_D$ of the delay values (per beam and per transmit processor), and $K_{u1}$ (constant for all beams in both transmit processors). The input sample phase values arrive from waveform sample memory T410 at a rate of $2R_E N_B$, interleaved by transmit processor and beam. The phase and frequency processor T418 multiplexes the v factors in a manner which matches the interleaved arrangement of $\phi_E$'s, and multiplexes the $\phi_D$'s in the same manner.

The control processors T402, T416 and T418 will now be described in more detail. Control logic block C125 represents the timing and control logic which operates the various low-level signal path components in the hardware embodiment of FIG. 6. This logic is conventional and need not be described.

(1) I/O Processor

Figure 7:
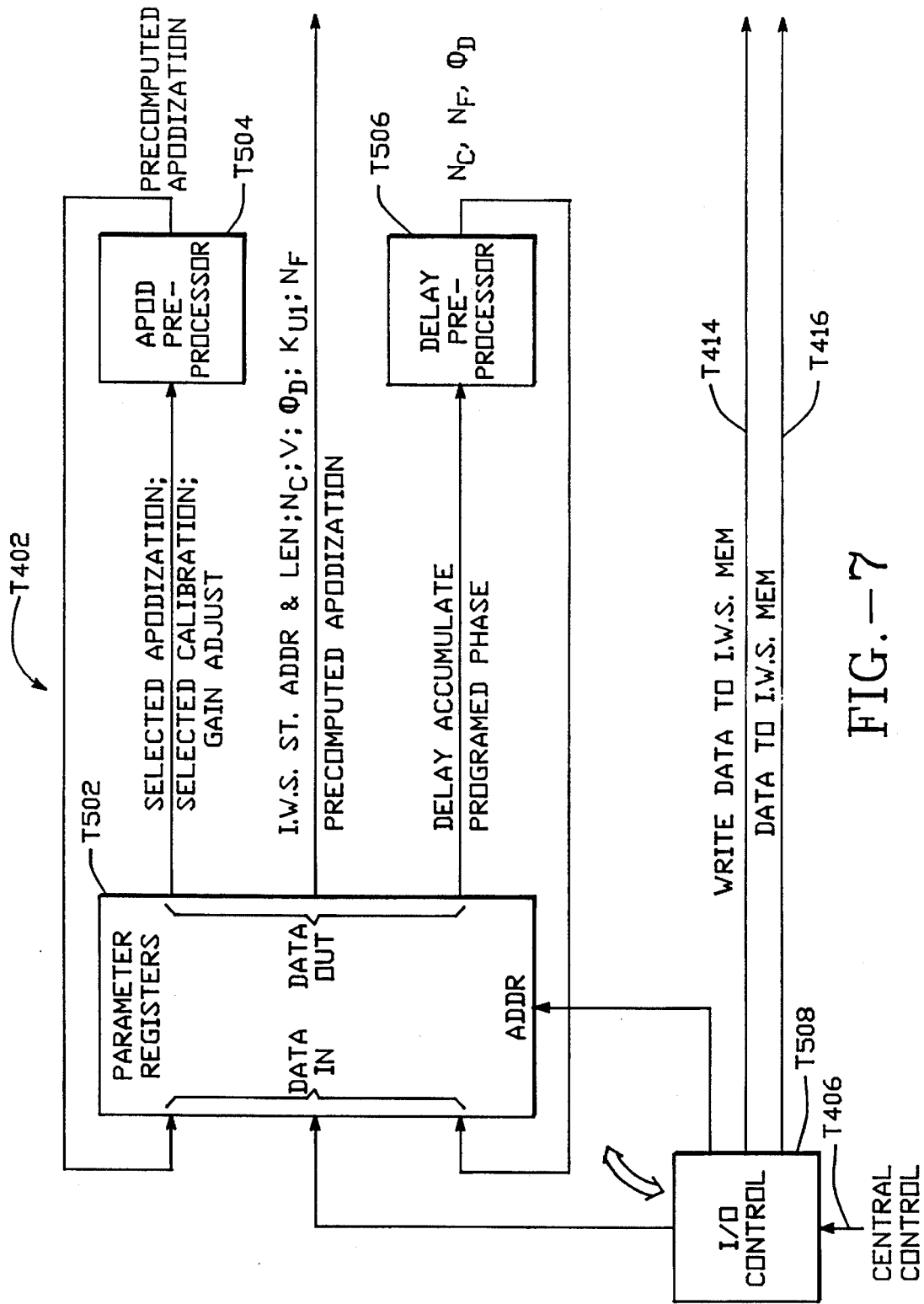
FIG. 7 is a functional block diagram of the I/O processor of FIG. 6.

FIG. 7 is a functional block diagram of I/O processor T402 (FIG. 6), It comprises a parameter register bank T502, an apodization preprocessor T504, a delay preprocessor T506 and an I/O control unit T508. All of the parameter registers T502 and all of the waveform sample memory T410 locations in all transmitters are memory-mapped in the same address space as seen by central control system C104 (FIG. 6). The central control system C104 communicates with the transmit processors (as well as with other components in the beamformer system R22) via a pair of system buses, and interface logic (not shown) combines downloaded information from both system buses onto the address/data bus T406 for individual transmit processor pairs.

The procedures for downloading parameters employ a number of techniques which minimize the overhead time required, thereby minimizing the time required to update the parameters between firings and maximizing the frame rate. For example, central control system C104 can operate in a broadcast mode in which the same information is written to all the transmit processor pairs T400. The broadcast mode is useful, for example, for downloading initial waveform samples to all transmit processors in cases where the data is to be the same for all such transmit processors. As another example, central control system C104 can write the same data simultaneously to registers associated with all beams of one or both transmit processors in a transmit processor pair. The transmit processor pair T400 also includes a register address auto-increment feature in which central control system C104 can write to sequential addresses without having to specify a new address for each write. The addresses for the parameter registers are chosen to take advantage of this feature. Parameter information can be downloaded to the transmit processors only between firings.

The parameters downloaded by central control system C104 to the I/O processor include the initial waveform samples (separately per beam and per transmit processor); initial waveform sample start address, length and type (real or complex) (one set per beam per transmit processor); interpolation factor $K_{u2}$ and number of beams $N_B$ (one set per transmit processor pair); filter programming for filters h2, h3 and h4 (one programming per filter per transmit processor pair); the frequency vernier factor v and an alternate frequency vernier factor $v_d$, together with a selection of which to use for calculation of the phase ramp term $\phi_R$ (one set per beam per transmit processor); a common delay offset term (one value per transmit processor pair); a delay value and an arbitrary additional programmed phase value (one set per beam per transmit processor); an apodization value (one value per beam per transmit processor); delay calibration values (eight values per beam per transmit processor); apodization calibration values (eight values per beam per transmit processor); a selection of which delay and apodization calibration values to use (one selection per transmit processor); overall transmit processor gain management values; and a selection of either PW or CW signal operation (one selection per transmit processor pair). Calibration is described below.

Note that each of the per-beam delay values has two register addresses: one for initializing a "delay accumulate register" with the downloaded value, and one for accumulating the downloaded value with the prior contents of the parameter register. As set forth more fully in the above-cited METHOD AND APPARATUS FOR FOCUS CONTROL OF TRANSMIT AND RECEIVE BEAMFORMER SYSTEMS co-pending patent application, the central control system translates a desired focal range and steering angle into a delay profile by using delay offsets which are predefined on a sparse grid of ranges and steering angles. The grid is predefined only for beams originating from the center of the transducer array, so the central control system performs computations to shift the grid to the desired beam origin, interpolating between transmit elements as necessary. The central control system also interpolates between steering angles on the sparse grid if the desired steering angle falls between grid angles. Interpolation is performed also in range if the desired focal range falls between ranges on the grid, but the computations of this interpolation are shared partially by the central control system and partially by each transmit processor. Specifically, the central control system scales the two nearest (in range) delay profiles by the appropriate interpolation coefficients, sums them by transmitting them to the delay accumulate registers in the parameter register bank T502.

Initial waveform samples being downloaded are received by the I/O processor T402 in the same manner as it receives parameter information. The I/O control unit T508 determines a local sample memory address from the address specified by the central control system C104, and provides that address on sample memory address bus T414. It drives the sample data onto sample memory data bus T416.

Each pulse firing by transmitter pair T400 is preceded by a pre-computation period. During the pre-computation period, the apodization pre-processor T504 is provided with the selected apodization values for the individual waveforms to be produced, the selected apodization calibration values for such waveforms, and a gain adjust value (one of the downloaded gain management values). The apodization pre-processor T504 multiplies these together in a conventional manner to produce "pre-computed apodization" values for each waveform to be generated by each transmit processor. These values are written into respective additional ones of the parameter registers T502.

Also during the pre-computation period, I/O processor T402 computes $K_{u1}$ from $K_{u1}=4N_B/K_{u2}$ by means not shown in FIG. 7.

Also during the pre-computation period, delay pre-processor T506 computes the three delay components $N_C$, $N_F$ and $\phi_D$, one set per beam per transmit processor. It does so by taking into account the accumulated delay value in the delay accumulate register, the programmed phase value, and the individual per-transmit processor, per-beam pipeline and filter delays of the signal path. Ignoring the signal path delays for simplicity, the delay pre-processor calculates the delay portions $N_C$, $N_F$ and $\phi_D$ by division into high-order, mid-order and low-order bit words, as previously discussed.

Thus all of the parameter registers T502 which are needed to generate $N_B$ properly shaped, delayed, apodized and modulated waveforms in each transmit processor have been downloaded or pre-computed before waveform generation begins.

a. Memory Address and Delay Processor

Figure 8:
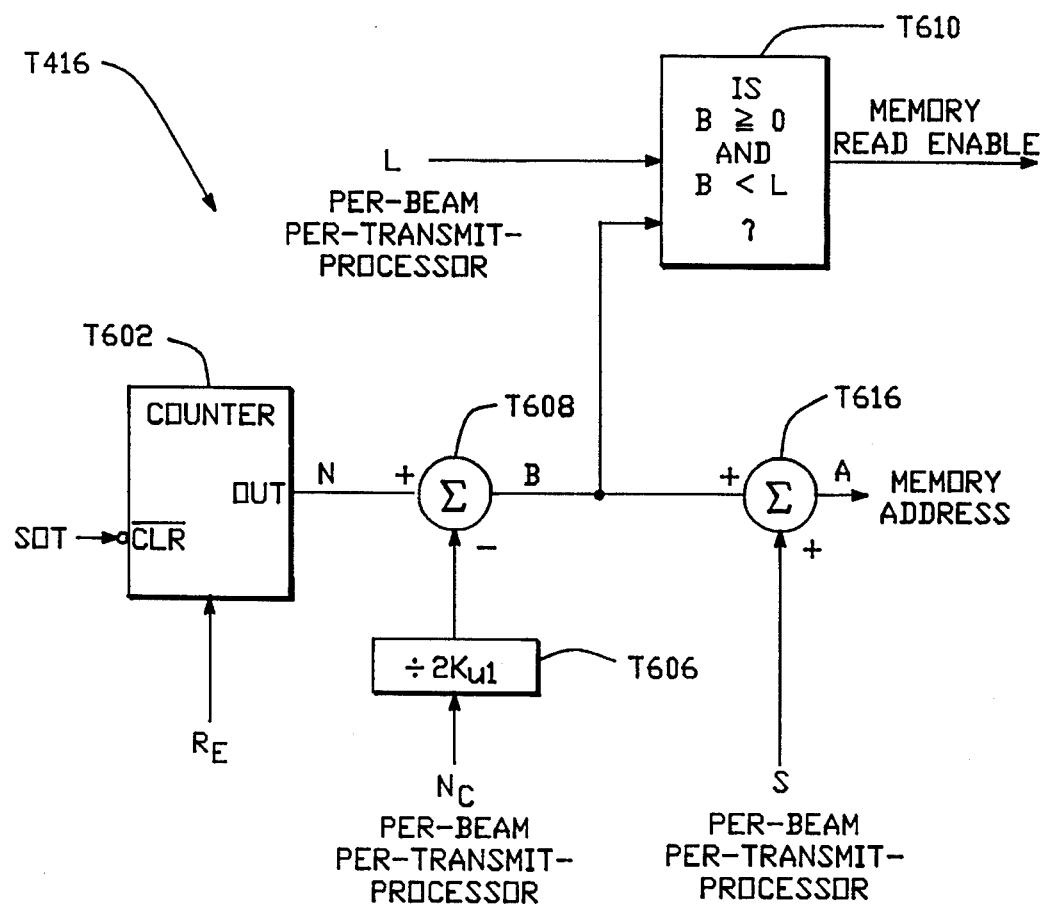
FIG. 8 functionally illustrates computations made by the memory address and delay processor of FIG. 6.

FIG. 8 functionally illustrates the computations made by memory address and delay processor T416. As shown in the diagram, the address processor T416 performs the following functions. At the SOT signal, a counter T602 begins counting in units of $T_E=1/R_E$. Both transmit processors have the same number of beams and upsampling rates, and therefore share the same count. Call the current count N. The $N_C$ term for all beams and both transmit processors are then selected in interleaved fashion. A complete cycle of beams and processors is made for each N (i.e., for each period of $R_E$). The $N_C$'s are divided by $2K_{u1}$ (divider T606) and subtracted (T608) from the count in a time-multiplexed fashion. Call this sum B, given by $B=N-N_C/2K_{u1}$. B is compared with zero (comparator T610) and with the initial waveform length L to determine if memory should be read. A sample is not read if $B<0$ or $B \geq L$. If reading out of memory, the memory address is given by $A=B+S$, where S is the start address of the initial waveform. This sum is performed by summer T616.

Each address of the envelope memory T410 corresponds to a double-word. In normal operation, the most significant bits (MSBs) represent amplitude and the least significant bits (LSBs) represent phase. Initial waveform samples may also be stored as real samples only, in which case the MSBs represent one real sample and the LSBs represent the next real sample. The memory is thus accessed at a rate of $R_E$ samples (real or complex samples) per unit time for each beam of each transmit processor, which is a total data rate of $R_D=2 \cdot N_B \cdot R_E$ samples per unit time.

The memory read enable (T610) could be used directly as the source of initial waveform samples instead of the memory output if the flexibility of programmed waveform samples is not desired. Also, other more complicated real-time computational schemes could be used to provide the initial waveform samples instead of the memory. However, the use of a memory for the source of waveform samples is preferred.

Note that the calculation of address A does not take into account the sign bit of B. This is acceptable since samples will not be read out of memory when B is negative. Also note that the sum may overflow. An initial waveform representation may therefore wrap around the waveform memory.

b. Phase and Frequency Processor

Figure 9:
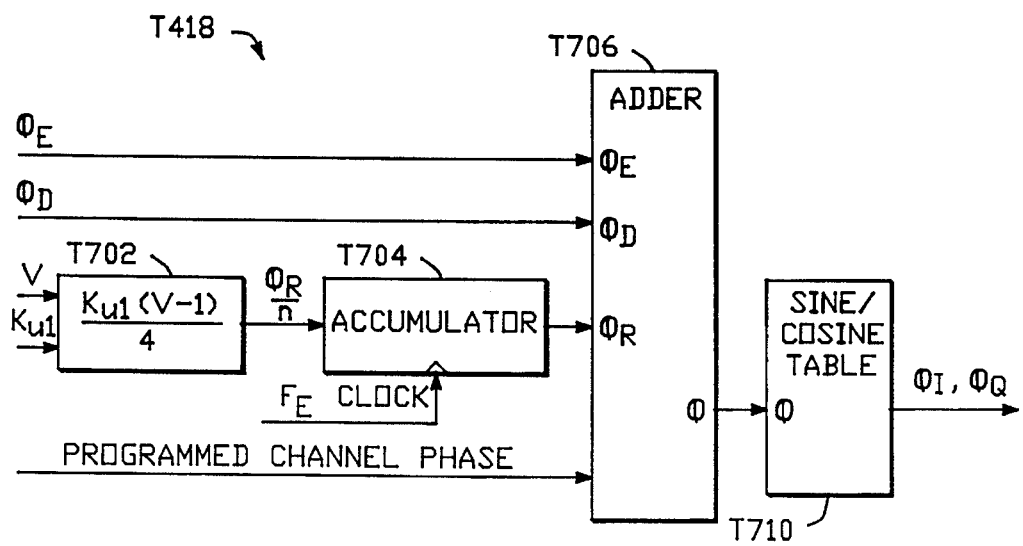
FIG. 9 functionally illustrates the calculations performed by the phase processor of FIG. 6.

FIG. 9 functionally illustrates the calculations performed by phase and frequency processor T418 on one beam of one transmit processor. In implementation, the hardware can be multiplexed in the same manner as the interleaving of $\phi_E$'s, similarly to FIG. 8. Phase and frequency processor T418 includes a block T702, which calculates the per-sample phase ramp increment from $\phi_R/n=K_{u1}(v-1)/4$ and provides the result to an accumulator T704. The accumulator T704 adds to itself the output of block T702 once every $R_E$ clock cycle, which corresponds to once for each initial waveform information sample for the beam and transmit processor. The output of accumulator T704 is $\phi_R$, and is provided to one input of a 4-port adder T706. The other three ports of adder T706 receive $\phi_E$, $\phi_D$ and the programmed transmit processor phase. The sum output of adder T706 is $\phi$, which is then provided to a sine/cosine table T710. The sine/cosine table T710 is operated alternately as a sine table and as a cosine table. The output of sine/cosine table T710 is the quadrature portion $\sin(\phi)$ of $\exp(j\phi)$ interleaved with the in-phase portion $\cos(\phi)$ of $\exp(j\phi)$. Because of the multiplexing of the hardware in phase processor T418, $\sin(\phi)$ and $\cos(\phi)$ are provided interleaved with each other at a data rate of $2R_E N_B$ full $\phi$'s per unit time. Overall, the $\phi$'s are interleaved by $\sin(\phi)$ and $\cos(\phi)$, by transmit processor number and by beam number.

3. Output Signal Path a. Encoder/DAC

Figure 10:
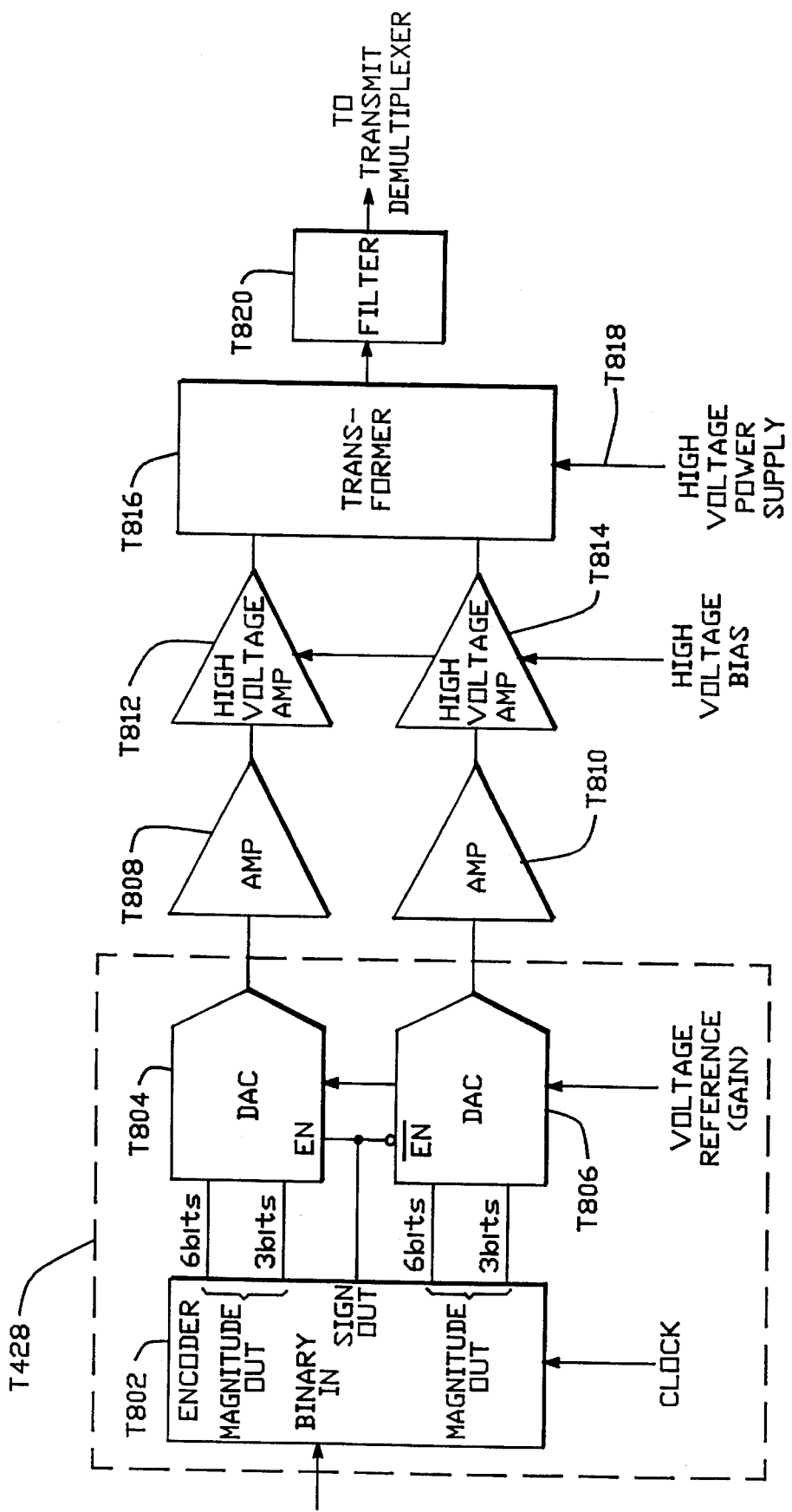
FIG. 10 functionally illustrates the encoder/DAC of FIG. 6.

Returning to FIG. 6, the output of processing block T426 in each transmit processor is provided to an encoder/DAC T428. The encoder/DAC T428 is illustrated functionally in FIG. 10. As shown in FIG. 10, the binary input sample values are provided to an encoder T802 which encodes it into the form of six thermometer-code (equally weighted) MSBs, three binary LSBs, and a sign bit. The encoder T802 also performs either ratiometric compression or hard limiting of the input sample value in order to narrow the dynamic range to that of the encoded output scheme.

The coded output of encoder T802 is provided to a pair of current-output DACs T804 and T806, one for positive values and one for negative values. The sign output of encoder T802 is used to enable only the appropriate DAC. Although not depicted by FIG. 10, the encoder and the DAC bit switches are all located on the same integrated circuit (IC) as the remainder of the circuitry shown in FIG. 6, the resistors driven by the DAC switches and other active circuits used to implement DACs T804 and T806 are all located separately. The choice of six thermometer-coded bits is made in order to limit the current through any one DAC switch, whereas the choice of only three binary-coded bits is made to minimize the pin count of the IC where the current drive requirements are not great. The current from each of the resistors turned on by the DAC switches are summed to form the output current of the DAC. A voltage reference is used to set the current across the DAC resistors and can be adjusted to control the gain of the DAC.

The mixed use of thermometer-coded DAC bits and binary-weighted DAC bits to construct a DAC, the adjustment of voltage references to set the level of DAC output, and the summation of resistor currents selected by DAC switches to form DAC output current are individually well known in the art, but the manner described herein for use in an ultrasonic digital transmit beamformer is not.

The output signal path could consist entirely of a DAC connected directly to a transducer element, but this would not be the preferred implementation.

b. Output Amplifier

The differential current outputs provided by DACs T804 and T806 are provided to a respective pair of current amplifiers T808 and T810, to reduce the current output requirements on the DACs. The amplifier outputs are provided to a pair of high voltage output stages T812 and T814 that drive the differential inputs of one of the windings of a transformer T816. The center tap T818 of that winding is tied to the high voltage programmable power supply. The high voltage level can be adjusted to control power drawn from the high voltage power supply. The output signal is taken single-ended from the other side of the transformer. The transformer is followed by an output filter T820 to reduce the aliasing products generated by the DACs. The signal is then sent to the transmit demultiplexers.

Although the design of current amplifiers, the use of high voltage output stages to differentially drive transformers, and the use and design of transformers and output filters are individually conventional, they have not heretofore been combined in the manner described herein in an ultrasonic digital transmit beamformer.

Note that other less preferred implementations are possible to perform the Encoder/DAC/Current Amplifier functions, such as a single-ended DAC driving a single-ended amplifier (possibly requiring no encoder), or other DAC implementations (e.g. thermometer plus R–2R, binary plus R–2R, and so on). Alternative DAC implementation techniques are described in Analog Devices, "Analog-Digital Conversion Handbook," 3d ed. (1986), incorporated herein by reference in its entirety. By combining these functions in the manner described herein, a highly programmable digital multi-channel transmitter is achieved.

4. Calibration

The transmit multiplexer T-106 (FIG. 1A) permits connection of transmitters to different transducers. As previously mentioned, parameter registers T502 (FIG. 7) include registers to store apodization calibration values and registers to store phase calibration values. Thus calibration values can be stored to compensate for variations in gain and delay for several analog transmit path conditions. This is advantageous because the active aperture may move across the face of the transducer array during a scan, requiring different element connections. Different firings in a scan also may utilize different transmit frequencies, which could also affect the calibration values. By pre-calibrating the transmitters for each of the possible connections and/or frequencies which will be used in a particular scan, only a calibration register select need be sent by central control system C104 to the transmitters in advance of each firing in the scan.

In order to calibrate the transmitters, the central control system C104 operates the transmit demultiplexers T-106 to couple electrically the transmitters to a calibration receiver. A first connection is first selected, and a single transmitter is fired. The output of the calibration receiver is sent back to the central control system C104, which uses the information to write the appropriate phase and apodization corrections into the phase and apodization calibration registers for the selected transmitter and connection selection. The process is repeated for each connection arrangement in each of the transmitters, and if desired, for each transmit frequency which will be used in the scan.

During the scan, the central control system C104 can specify selection of a calibration register using either a group configuration mode or an individual configuration mode. In the group configuration mode, all transmitters compute their own configuration register select value. The central control system C104 broadcasts a parameter to all of the transmitters specifying the position of the aperture across the transducer array for the next firing. Each transmitter uses this value, together with its own position in the overall transducer array to independently calculate its own calibration register select value.

In the individual configuration mode, the central control system C104 determines a calibration register select for each of the transmitters and downloads the select values to parameter registers in each of the transmit processors.

The transmitters support a per-transducer element frequency response calibration. Each element in a transducer array has its frequency response measured (and/or has the frequency response of its analog signal path measured), which is processed to generate and store a correction inverse impulse response. The central control convolves (combines) this correction impulse response with the desired transmitter initial waveform and downloads the corrected initial waveform into the initial waveform sample memories for each of the transmitters. Alternately, the correction response and the desired response can be convolved (combined) with off-line means, in which case the central control only has to download the corrected initial waveform.

Additional information on the calibration process can be found in the above-cited METHOD AND APPARATUS FOR FOCUS CONTROL OF TRANSMIT AND RECEIVE BEAMFORMER SYSTEMS and METHOD AND APPARATUS FOR RECEIVE BEAMFORMER SYSTEM co-pending patent applications.

APPENDIX B

DIGITAL RECEIVE BEAMFORMER SYSTEM
PREFERRED EMBODIMENT

1. Analog Front End:

a. Low Noise, Variable Time-Gain Amplifier:

As is known in the art, a time-varying gain is applied to the receive signal to compensate for attenuation with depth. In this embodiment, the gain is applied by an analog low noise, time-gain amplifier R-116 (FIG. 2b). There is one low noise, time-gain amplifier R-116 for each digital multi-channel receiver R-101. A common gain function is applied to all amplifiers R-116, although independent gains could be applied to each amplifier R-116. The gain varies with the range (or time, as range and time are related to each other in accordance with the speed of sound in the medium being imaged) from the object being imaged to the transducer elements.

b. Analog-To-Diqital Converter (ADC):

The analog-to-digital converter (ADC) R-118 (FIG. 2b) in the preferred embodiment oversamples the signal by at least four times (preferably four, eight, sixteen or thirty-two times) the receive signal nominal center frequency $F_o$. It is to be understood that the oversample rate can be lower or greater than four times in a different embodiment. Thus, if the system is imaging at 10 MHz, the ADC R-116 is sampling at a rate of 40 MHz. Preferably the ADC R-116 is an eight or more bit ADC. However, it is to be understood that as is evident from the patents listed before, many types of ADCs can be used with the beamformer in different embodiments.

Figure 11:
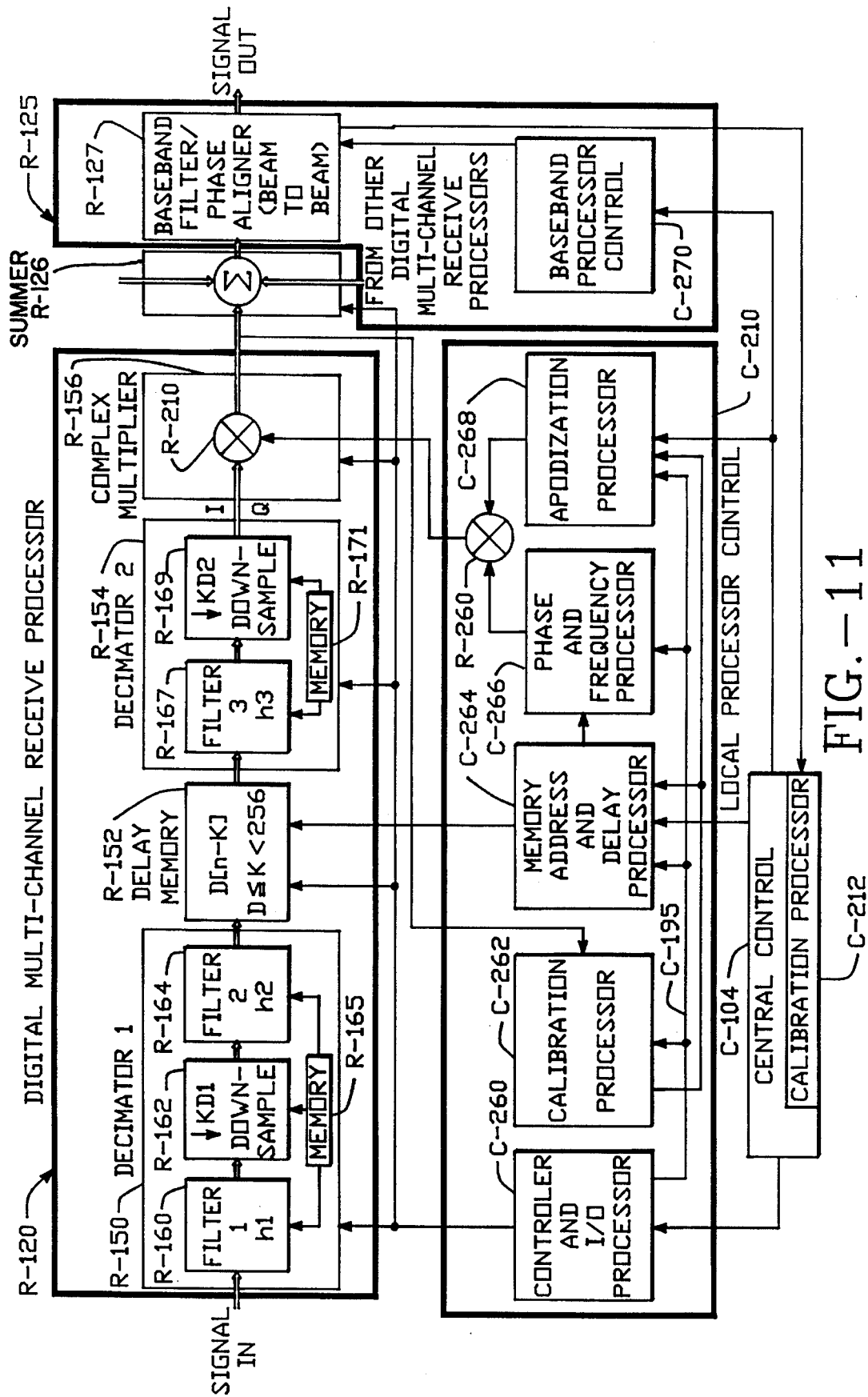
FIG. 11 depicts a detailed block diagram of an embodiment of a digital multi-channel receive processor and baseband multi-beam processor of the invention of FIG. 2.

2. Multi-Channel Digital Signal Processing (Digital Multi-Channel Receive Processor R-120):

a. Processing Modes:

Before describing the functional blocks in FIG. 11, it will be useful to understand the various processing modes in which each receive processor can operate. Ideally, it would be desirable for each receive processor to be able to process any number of superposed and separately delayed and apodized receive beams up to some maximum, at any receive signal nominal center frequency $F_0$ up to some maximum, specified by a receive signal spatial range resolution $\gamma_B$ (inversely related to receive signal bandwidth) up to some maximum. This would require extensive processing power, however, especially if the maximums are large. Since processing power is limited in any system, it would seem that these maximums must be kept low enough such that the hardware is able to keep up when all three parameters are specified at maximum. The present embodiment, on the other hand, makes better use of the available processing power by permitting trade-offs among these three parameters and allowing the central control system to choose among processing modes depending on the clinical setting. It is to be understood that once the user selects a transducer, a mode and scan format pursuant to the clinical setting, that preferably the method and apparatus automatically selects from the preselected and pre-stored processing modes.

Table B1 sets forth some of the processing modes which can be selected by central control system C-104 to be applied to all digital multi-channel receive processors R-120 of receive beamformer R-100. Different embodiments can support fewer or greater numbers of modes and fewer or greater numbers of beams. As used in the Table:

$F_s$: is the system clock frequency. The central control C-104 can set $F_s$ at any of a variety of frequencies.

$F_{ADC}$: is the ADC sampling frequency or the rate at which samples are converted by the ADC R-118 (FIG. 2b), where typically $F_{ADC}=F_s$ or $F_s/2$.

$F_0$: is a receive signal nominal center frequency. $F_0$ is equal to, or near, the actual signal carrier frequency $F_c$ and is therefore considered to be the nominal receive signal frequency. $F_o$ is specified for each digital multi-channel receiver R-101 as a fraction of $F_s$. $F_0$ is programmable by the central control C-104 for each digital multi-channel receiver R-101 based on pre-stored values.

c: is the speed of sound in the body.

$\lambda_0$: is the acoustic wavelength of $F_0$; $\lambda_0 c/F_0$.

$F_C$: is the receive signal carrier frequency (an imaging frequency). The digital multi-channel receiver R-101 can be tuned by verniering $F_0$ to $F_c$. $F_c$ and $F_o$ are related in the present embodiment by a frequency scaling factor or frequency vernier factor v, such that $v \cdot F_o = F_c$ as pre-stored in the central control. The range of the carrier frequencies $F_c$ for which an embodiment can be tuned ranges theoretically between $0 \times F_o$ to $2 \times F_o$, but typically is 75% of $F_o$ to 125% of $F_o$.

$R_o$: is the per-beam complex (I/Q-pair) output sampling rate or per beam processing rate. The ratio $R_0/F_0$ represents the number of complex samples per period of the receive signal nominal center frequency $F_0$.

$\gamma_B$: is the per-beam spatial range resolution. Note that $\gamma_B = c/2R_o = \lambda_0/(2R_o/F_0)$.

Spatial Range Resolution (or bandwidth modes (BW Mode)) selected at Decimator Two: There are 6 spatial range resolutions (or bandwidth modes) in the preferred embodiment, accounting for spatial range resolution between values $F_0/2$ to $4F_0$. Values outside these values are possible in a different embodiment.

Spatial range resolution (Bandwidth Modes):

BW MODE 1: $R_0 = 4F_0$ or $\gamma_B = \lambda_0/8$.
BW MODE 2: $R_0 = 2F_0$ or $\gamma_B = \lambda_0/4$.
BW MODE 3: $R_0 = F_0$ or $\gamma_B = \lambda_0/2$.
BW MODE 4: $R_0 = F_0/2$ or $\gamma_B = \lambda_0$.
BW MODE 5: $R_0 = 2F_0/3$ or $3\gamma_B = \lambda_0/4$.
BW MODE 6: $R_0 = F_0/3$ or $3\gamma_B = \lambda_0/2$.

$N_B$=maximum number of simultaneously produced beams for the given processing mode. (Note that the beamformer can be operated to produce fewer than $N_B$ beams if desired; for example, in a mode for which $N_B=4$, the beamformer can be operated to produce only three beams if desired, although this would not make full use of the available hardware processing power.)

N/I=Mode not implemented in preferred embodiment.

TABLE B1

| | RECEIVE PROCESSING MODES (Output of Decimator Two) | | |
|---|---|---|---|
| $F_0$ (MHz) | $N_B = 1$ | $N_B = 2$ | $N_B = 4$ |
| $F_S/32$ | N/I | BW Mode 1<br>$R_O = 4F_0$<br>$\gamma_B = \lambda_0/8$ | BW Mode 2<br>$R_O = 2F_0$<br>$\gamma_B = \lambda_0/4$ |
| $F_S/16$ | BW Mode 1<br>$R_O = 4F_0$<br>$\gamma_B = \lambda_0/8$ | BW Mode 2<br>$R_O = 2F_0$<br>$\gamma_B = \lambda_0/4$ | BW Mode 3<br>$R_O = F_0$<br>$\gamma_B = \lambda_0/2$ |
| $F_S/8$ | BW Mode 2<br>$R_O = 2F_0$<br>$\gamma_B = \lambda_0/4$ | BW Mode 3<br>$R_O = F_0$<br>$\gamma_B = \lambda_0/2$ | BW Mode 4<br>$R_O = F_0/2$<br>$\gamma_B = \lambda_0$ |
| $F_S/4$ | BW Mode 3<br>$R_O = F_0$<br>$\gamma_B = \lambda_0/2$ | BW Mode 4<br>$R_O = F_0/2$<br>$\gamma_B = \lambda_0$ | N/I |
| $3F_S/8$ | BW Mode 5<br>$R_O = 2F_0/3$<br>$\gamma_B = 3\lambda_0/4$ | BW Mode 6<br>$R_O = F_0/3$<br>$\gamma_B = 3\lambda_0/2$ | N/I |

As can be seen by reading horizontally across Table B1, for each receive signal nominal center frequency $F_0$, the hardware permits a larger number $N_B$ of superposed beam waveforms to be traded-off against some degradation of the per-beam spatial range resolution $\gamma_B$, and vice-versa. A larger $N_B$ translates into a higher frame rate (since the entire field of view can be scanned with only half or one quarter the number of firings), while an enhanced spatial range resolution $\gamma_B$ (smaller value of $\gamma_B$) translates into a sharper image in range. For example, therefore, in a display mode which displays a color flow Doppler image superimposed on a grey-scale image, produced by interleaving B-mode and F-mode pulse firings, the central control C-104 could reprogram the receive beamformer R-100 to operate at $N_B=1$ for all B-mode imaging pulses and at $N_B=2$ or even $N_B=4$ for color flow Doppler imaging pulses, assuming both modes share the same $F_0$.

Similarly, reading vertically down Table B1, and excluding modes 5 and 6 for this example, it can be seen that for a given maximum number of beams $N_B$, processing modes having a higher carrier frequency (approximately $F_0$), have a larger relative per-beam spatial range resolution $\gamma_B$. A clinician typically selects a transducer operable at the carrier frequency appropriate for a desired depth penetration. In doing so, the clinician trades off penetration for overall image resolution (ability to distinguish two targets). (The latter trade-off is inherent in the physics of ultrasound since greater penetration is achieved by reducing the imaging frequency, which in turn reduces the overall image resolution.) For a given maximum number of beams $N_B$, the desired tissue penetration determines $F_0$ (Table B1), which in turn determines a processing mode having the optimum per-beam spatial range resolution which the hardware can provide at the selected $F_0$. That is, as $F_0$ decreases relative to $F_s$ to achieve greater penetration, the signal processing path in each receive channel R-101 need not process as many samples per second. This leaves hardware processing capacity available, which the system takes advantage of by increasing $R_0/F_0$ and hence improving the normalized per-beam relative spatial range resolution $\gamma_B/\lambda_0$. Further, by reading diagonally across Table B1 (upward to the right), and again excluding modes 5 and 6 for this example, it can be seen that the hardware permits a lower $F_0$ to be traded off for a larger number of beams $N_B$ at a constant receive spatial resolution $\gamma_B$.

In summary the modes with which the receive channel R-101 can be specified to operate offer tradeoffs among three parameters: $N_B$, $F_0$, and $\gamma_B$. Thus each processing mode defines a parameter set $\{N_B, F_0, \gamma_B\}$. In general, all of the processing modes shown in Table B1 satisfy the rule that for a given $F_s$, the product of the maximum number of beams $N_B$ and the channel processing rate $F_0$, divided by the normalized per-beam spatial range resolution $\gamma_B/\lambda_0$, is constant. Further, the preferred embodiment also supports additional processing modes not shown in Table B1, and which do not fully utilize the total processing capability of the system.

b. Decimator One:

As can be seen in FIG. 11, the beamformer processor R-120 is comprised of decimator one R-150, time delay memory R-152, decimator two R-154 and complex multiplier R-156. Decimator one R-150 is programmable (as previously defined) and is also referred to as a variable rate decimator filter or a multi-rate decimator filter with a variety of programmable decimation factors and associated programmable filter coefficients. Decimator one R-150, in a preferred embodiment, is functionally comprised of a first filter (filter one) R-160 which has first programmable filter coefficients h1, a decimator R-162 which down-samples at a decimation factor of $K_{D1}$ (Table B2), and a second filter (filter two) R-164 which has second programmable filter coefficients of h2. In a preferred embodiment filter one (h1) is a FIR (finite impulse response), anti-aliasing low/high-pass filter. Filter one (h1) filters out the ADC quantization noise and odd harmonics of the receive signal nominal center frequency $F_0$. Preferably, filter two (h2) is a FIR, anti-alias, band-pass filter which filters out the even harmonics of the receive signal nominal center frequency $F_0$. The filter profiles and decimation rate values are programmable depending upon the receive signal nominal center frequency $F_0$ and the ADC sampling rate ($F_{ADC}$). Such filters can perform the additional programmable task of signal shaping.

In implementation, the functional features of the filter one (h1) R-160 and the decimator R-162 are accomplished simultaneously. It is to be understood, however, that the filtering and decimating operations can occur separately and in a less computationally efficient order in other embodiments.

Further it is to be understood that an embodiment can be implemented with filters with a variety of lengths and using fixed or floating point operations.

A digital signal processing decimator performs both filtering and downsampling, as described in Sections 2.3.2 and 2.4 of the text by Crochiere and Rabiner, *Multirate Digital Signal Processing*, Prentice Hall 1983. Decimator filter design is disclosed in Crochiere and Rabiner and in *Digital Signal Processing Applications Using the ADSP*-2100 *Family*, volume 1, edited by Amy Mar of Analog Devices, DSP division, Prentice Hall 1992, which are hereby incorporated by reference.

In accordance with the same definition of programmable, the programming of filters and filter coefficients and decimation rates is accomplished by the central control C-104 which coordinates the operation of the digital multi-channel transmitter T-103 and the digital multi-channel receivers R-101. Such filter coefficients and filter values and decimation factor values can be downloaded to memory R-165 of decimator one R-150 from the central or primary control C-104. Accordingly, primary control C-104 can program memory R-165 and can select from the values programmed into memory R-165 in order to operate decimator one R-150. Alternatively such values can be permanently pre-stored in a memory such as memory R-165, with the primary control C-104 selecting among the pre-stored values depending upon the processing mode in accordance with the above definition of programmable. Further, decimation factors other than those specified in Table B2 can be selected in a different embodiment.

According to the Nyquist sampling rule, a real signal must be sampled by at least a factor of two over the highest frequency of the signal in order to be able to reconstruct the signal successfully. For the signals which are received by the digital multi-channel receive processor R-120, there is a significant frequency content above the signal nominal center frequency $F_0$, and at an oversample rate of four times $F_o$ (See Table B2), these frequencies are adequately sampled. In a preferred embodiment if the data from the ADC R-118 is already at four times $F_o$, no decimation is performed. Thus, one of the normal decimation modes of decimator one R-150 is that decimator one R-150 does not decimate at all. With a beam having a signal center frequency $F_c=F_o$ of 10 MHz, and with a sampling frequency $F_s$ of 40 MHz, then the output of decimator one R-150 without decimation would be 40 MHz, or four times oversampled. Data from the ADC R-118, which is sampled at greater than four times the receive signal nominal center frequency $F_0$, is down-sampled to four times the receive signal nominal center frequency $4F_0$, as is evident from Table B2. The decimation factors $K_{D1}$ are selected to accomplish this rate of decimation as a function of the ADC sampling rate $F_{ADC}$.

Accordingly, in this embodiment, the relationship between the decimation factor $K_{D1}$ for decimator one and the channel processing rate or center frequency $F_0$ and the ADC sampling rate $F_{ADC}$ is $$K_{D1}=F_{ADC}/4F_0$$

where $$F_{ADC}=F_s \text{ or } F_s/2.$$

It is to be understood that oversampling by less than or greater than a factor of 4 (and thus with different integer and/or rational decimation factors $K_{D1}$) can be accomplished in a different embodiment.

Further, for the filter one (h1) R-160 and the filter two (h2) R-162 the filter coefficients can be selected in order to cause these filters to operate in a bypass mode (i.e., without filtering) for each of the specified decimation factors. Such bypass operation may be utilized for diagnostic purposes. Additionally for maximum wide-band processing, filter one can perform no filtering.

TABLE B2

DECIMATION FACTORS FOR DECIMATOR ONE

Figure 13A:
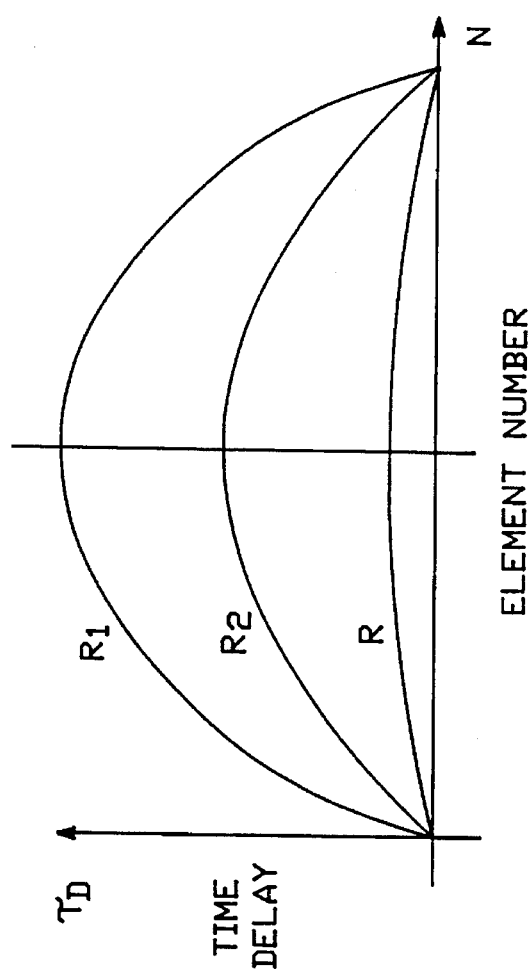
FIGS. 13a and 13b depict graphs of typical time delay profiles which can be applied to the variable time delay memory of FIG. 12.

| $F_0$ | $K_{D1}$ Decimation Factor | Decimator One Output Rate |
|---|---|---|
| $F_s/32$ | 8 | $4F_0$ |
| $F_s/16$ | 4 | $4F_0$ |
| $F_s/8$ | 2 | $4F_0$ |
| $F_s/4$ | 1 | $4F_0$ |
| $3F_s/8$ | 2 | $4F_0/3$ | c. Time Delay Memory:

As can be seen in FIG. 13a, the time delay profile across the aperture of a transducer is a function of both the transducer element position and the range of the object to be imaged from the transducer array. Generally, for the case where the scan line is steered straight ahead, more delay is applied in the center of the aperture (FIG. 13a) than is applied to the signals at the edges of the transducer array. This is due to the fact that it takes longer for the receive (return echo) ultrasound signals from the object to be imaged to reach the outer transducer elements than to reach the more central transducer elements or elements closer to the object to be imaged.

Also as shown in FIG. 13a for the case where the scan line is steered normal to the transducer array face, the reason that the time delay profiles are flatter as a function of range (or time to the object to be imaged) is that as the range increases to infinity, the distances from any particular transducer element to the object to be imaged converge to equal values reducing the need for time delays in order to properly sum the receive signals.

In a preferred embodiment, different time delay profiles are assigned to reference range boundaries of range zones (FIGS. 13a and 5c and as explained below). The spacing between the reference range boundaries may be equal and/or unequal as desired. Further, it is to be understood that these time delays represent a coarse time delay applied to the signal as explained below, with a fine focusing time delay implemented as a phase shift applied by the complex multiplier R-156 (FIG. 11).

Figure 13B:
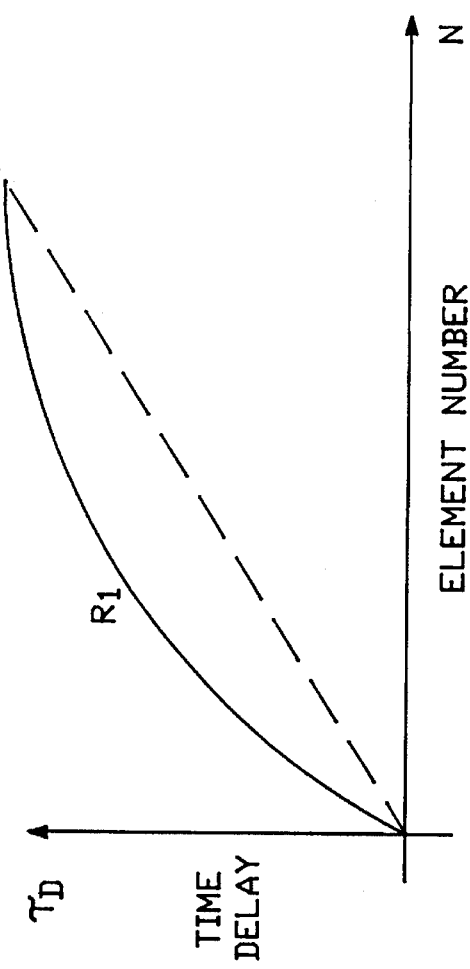
Figure 13C:
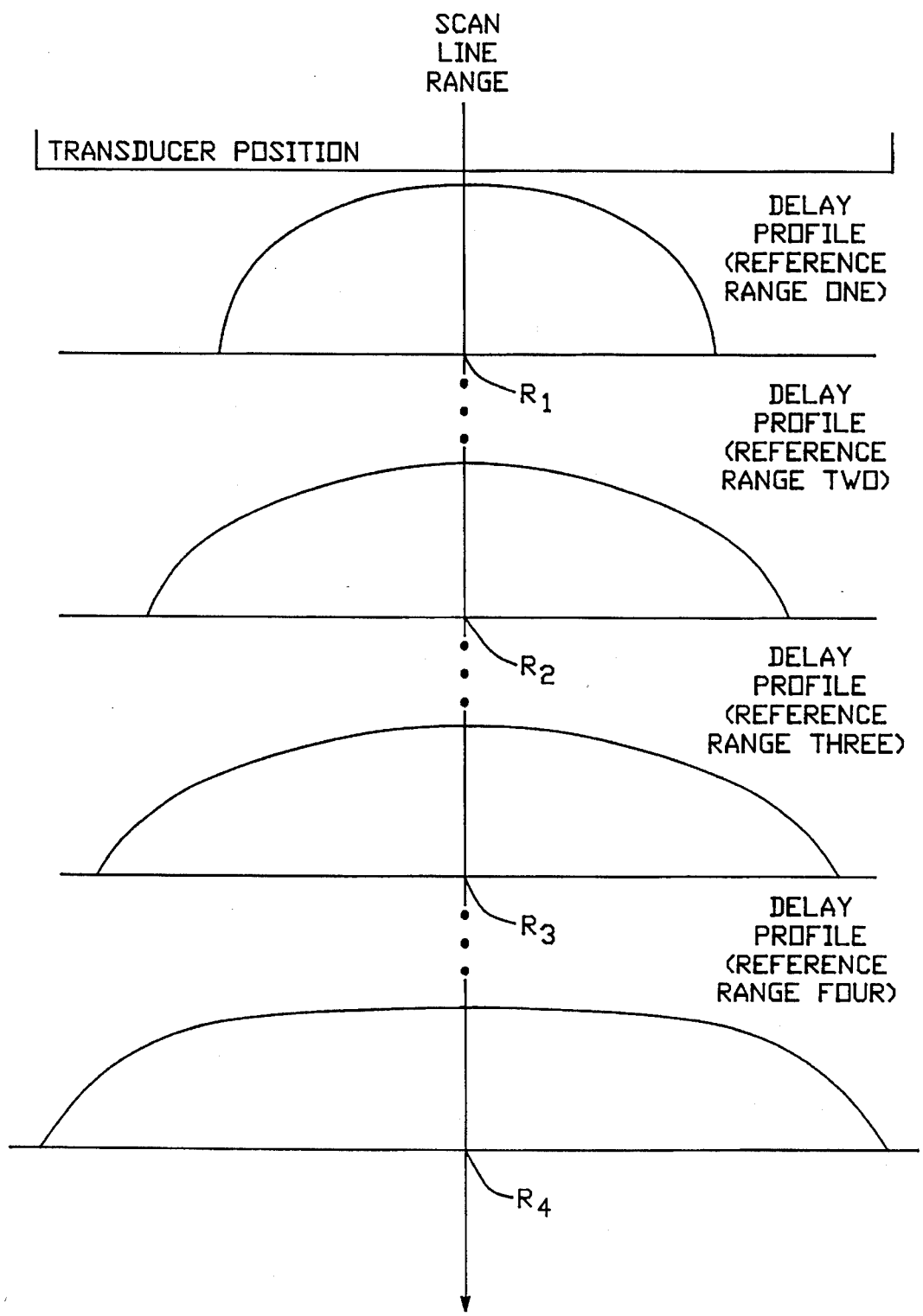
FIG. 13c depicts a series of evolving delay profiles which have increasing aperture widths with increased range along a receive scan line centered on and normal to the transducer array.

Tracking receive beams that are steered relative to the transducer aperture is a matter of changing the time delay profile with respect to the number of the transducer element and the range, as can be seen in FIG. 13b. Thus, by changing the time delay profile which is applied to select time-indexed receive data from memory, the desired beams can be steered and focused.

Figure 12:
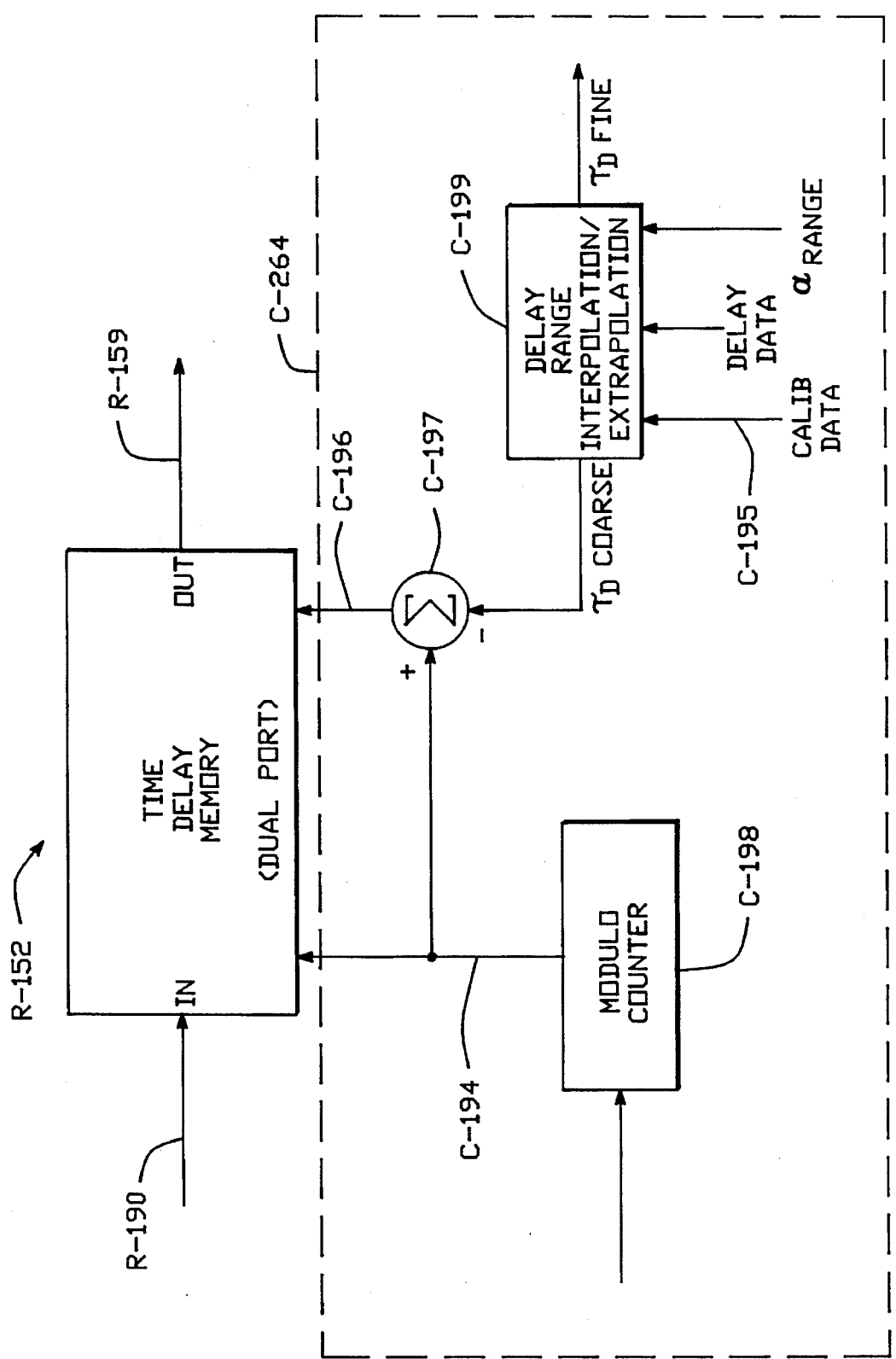
FIG. 12 depicts a schematical representation of the variable time delay memory of the digital multi-channel receive processor of FIG. 11 of the invention, along with an embodiment of the memory address and delay processor.

FIG. 12 depicts a schematic of the programmable, variable time-delay, two-port memory R-152 of the preferred embodiment. Data is read out of the memory R-152 based on continuously updated addresses derived from variable time delay profiles (such as for example described above), supplied by the central control system C-104 and the local control processor system C-210, in order to provide dynamic focusing.

Shown in FIG. 12 are data-in line R-190 and data-out line R-159 as well as in-address line C-194 and out-address line C-196. The in-address line R-194 is updated at a constant rate with a modulo counter C-198. The out-address C-196 is variable and is comprised of a combination of the in-address less a coarse time delay component of the time delay which is supplied by the central control system C-104 and the local control system C-210. In a preferred embodiment the coarse time delay represents the most significant bits (MSB) and the fine time delay represents the least significant bits (LSB) of a time delay word from the local control system C-210. In the preferred embodiment for bandwidth modes 1 to 4 and with $T_0=1/F_0$, the coarse time delay represents integer units of quarter cycles ($T_0/4$) of the receive signal nominal center frequency $F_0$ and the fine time delay (phase shift) represents a fractional value of a quarter cycle. For Bandwidth Modes 5 and 6 the coarse time delay represents integer units of three quarter cycles ($3T_0/4$) and the fine phase shift represents fractional values of three quarter cycles.

The memory R-152 is organized as a circular buffer which writes over the oldest stored data. The memory does not hold data for the entire scan or receive line, but just enough data to satisfy the span between the minimum and the maximum time delay that could be applied in order to select stored signal data. Thus, the necessity of having a much larger memory to store all the data from a scan line is avoided. In a preferred embodiment, the memory for each channel captures the most recent 256 data samples along a scan line at a rate of $4F_o$. The 256 data samples correspond, in a preferred embodiment, to a total delay range of $256 \times T_0/4 = 64T_0$ for Bandwidth Modes 1 to 4 and a total delay range of $256 \times 3T_0/4 = 192T_0$ for Bandwidth Modes 5 and 6.

In FIGS. 14a, 14b and 14c, strings of data stored at times $t_{k-1}$, $t_k$, and $t_{k+1}$ are depicted for data on three receive channels for adjacent transducer elements (N−1, N, N+1). The FIGS. 14a, 14b and 14c thus represent a snapshot of the stored signals from three transducer elements frozen in time for the three specified times. Applying the appropriate time delay value along the time axis of the figures selects the desired data from the string of stored data. Dynamic focusing results from real time selection of time delay values in order to determine the data to be read out of the memory R-152. FIGS. 14a, 14b and 14c depict read out of samples of S3, S4 and S5 from the data sequences stored at time $t_k$ from the three channels at the selected time delays. Thus, the ability exists to dynamically select from the stored data samples according to the different time delay values in order to provide for dynamic focusing.

Figure 15:
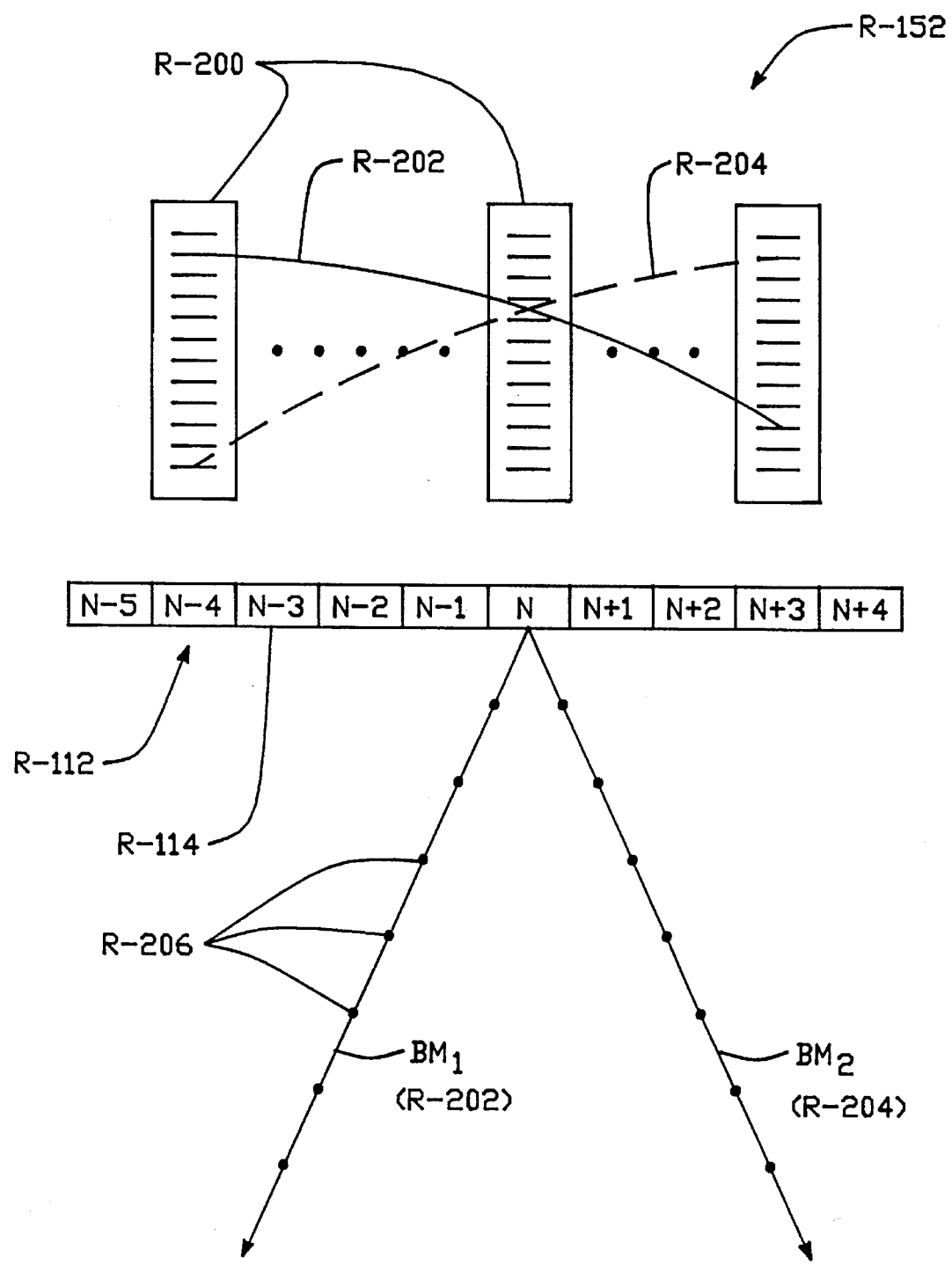
FIG. 15 depicts schematically the selection of data stored in the variable time delay memory of FIG. 12 for purposes of outputting delay data representative of that used to form multiple beams.

As can be seen in FIG. 15, applying different time delay profiles to the same data stored in the memory R-152 allows the receive beamformer processor R-120 to track and, as depicted, form two receive beams from the receive signals at each element.

More particularly, FIG. 15 schematically represents the manner that multiple beam data is selected from and read out of the memory R-152. Essentially interleaved time delay values from two or more time delay profiles at each desired range are applied to the same data stored in the memory R-152. Each time delay profile causes data corresponding to a different beam directed in a different direction to be retrieved from the memory and output over the data-out line R-192. Thus, the appropriate selection of time delay profiles causes data to be focused for different beams.

More particularly, FIG. 15 depicts a phased array transducer R-112 with transducer elements N-5 to N+4, R-114. Schematically, sequences of data R-200 (such as depicted in FIGS. 14a, 14b and 14c) which are stored in memory R-152 for each transducer element at time "t" are shown associated with the respective elements. Superimposed over the sequences of data are first and second time delay profiles R-202, R-204 representing profiles for first and second beams ($BM_1$, $BM_2$). By selecting the appropriate time delay values for each transducer element from the time delay profiles for each beam (as provided by the central and local control system), individual focal points R-206 of first and second beams can be formed from the appropriate data from each data sequence.

It is to be understood that the time delay profile can be dynamically changed for every instance in time. Thus, any desired beam which is contained in the data can be tracked and formed out of the data stored in memory R-152.

Further emphasizing the computational flexibility of this digital receive beamformer system and referring to Table B1, if it is assumed that a single beam has a nominal center frequency $F_0$ of 10 MHz, with a sampling rate $F_s$ of 40 MHz, then only one dynamically focused beam could be formed with a $\lambda_0/2$ spatial range resolution (BW Mode 3). If, however, the beam had a center frequency of 5 MHz, then there is sufficient computational bandwidth in the system such that two beams can be formed with $\lambda_0/2$ spatial range resolution (BW Mode 3). In a preferred embodiment, up to four time-interleaved data streams can be created from the data stored in memory R-152 by applying four sets of independent time delay profiles, one set for each beam. Other prior art systems are not as flexible and require a separate beamformer for each additional beam that is to be formed from data from the same transducer element. Such prior art systems do not have the ability to apply completely independent delay, phase and apodization values on a sample-by-sample basis for either single or multiple receive beams.

A further key advantage of this architecture is that up to and through the storage of receive signal data in the memory R-152, no distinction or segregation in the data is made between beams. Thus, all of the front end processing and amplification, the ADC operation and the computations by the decimator one, all of which are very computational intensive, as well as the process of storing data in the memory R-152 is done transparent to the number of beams in the receive signal. Were multiple beams individually tracked and identified earlier in the signal processing chain, then the computations in the decimator one, for example, would need to be run at a multiple of the number of beams times the present sampling rate. Thus, the present system affords a substantial hardware savings by not distinguishing between beams until the data is read out of memory R-152, and by efficient and maximum use of the computational capacity by a trade-off among the number of beams $N_B$ processed, the receive signal nominal center frequency $F_0$ for each beam, and the normalized per-beam relative spatial range resolution $\gamma_B/\lambda_0$.

d. Decimator Two:

The second decimator, decimator two R-154, is programmable and has a filter and decimation structure (variable rate decimation filter) that is similar to decimator one R-150, but uses programmable complex filter coefficients h3 for the third filter R-167. The third filter acts as an anti-aliasing, complex band-pass filter and selects the positive image frequencies, and filters out negative image frequencies and out-of-band noise. This process of filtering and decimating in R-154 can also, in a preferred embodiment, demodulate the signal to or near baseband and convert the signal to a complex quadrature signal pair of I (in-phase) and Q (quadrature).

As discussed below, with respect to the preferred embodiment the data output from decimator two represents data from one, two or four beams, with the data representing two or four beams being time interleaved. As demonstrated in the Tables 1, 2 and 3, decimator two R-154 is where the receive sample bandwidth trade-off becomes most evident and the spatial range resolution is finally determined through the selection of the decimation factor $K_{D2}$.

Memory R-171 (FIG. 11) is programmable (as the term programmable is defined above) by central control C-104 with multiple complex filter coefficients and multiple decimator factors. The filter coefficients and decimator factors are programmed by the central control C-104 in accordance with the particular imaging task to be accomplished in the digital multi-channel receiver.

TABLE B3

| DECIMATION FACTORS FOR DECIMATOR TWO | | |
|---|---|---|
| Decimator Two Modes | $K_{D2}$ Decimation Factor | Decimator Two Output Rate $R_O$ |
| BW Mode 1 | 1 | $4F_0$ |
| BW Mode 2 | 2 | $2F_0$ |
| BW Mode 3 | 4 | $F_0$ |
| BW Mode 4 | 8 | $F_0/2$ |
| BW Mode 5 | 2 | $2F_0/3$ |
| BW Mode 6 | 4 | $F_0/3$ |

The relationship of the decimation factor of decimator two to the nominal center frequency $F_0$ defines the output sampling rate $R_o$ as set out in Table B3 where $K_{D2}=4F_0/R_o$ for Bandwidth Modes 1 to 4 and where $K_{D2}=4F_0/3R_o$ for Bandwidth Modes 5 and 6.

Accordingly, it is evident that as the decimation factor goes down to a smaller value, the sample rate per beam increases with the decimator two R-154 working at a constant full maximum capacity in all situations. Thus, this preferred embodiment uses decimator two R-154 in order to keep the computational rate at a maximum constant.

It is to be understood that the bypass modes of decimator two, as for decimator one, enables the isolation of decimator two for diagnostic purposes and/or when a signal with a wider bandwidth is desired. By way of example, for Bandwidth Mode 1, decimator two R-154 can be bypassed. Further, decimator two R-154 can be operated simply as a downsampler without performing a filtering operation.

From the above, it is evident that the beamformer processor R-120 decimates the signal to the lowest rate for maximum computational efficiency consistent with the number of beams utilized and spatial range resolution requirements.

Thus, it is evident that the above receive signal processing architecture provides for (1) a variable time delay memory, and (2) a second programmable decimator which affords the above advantage with respect to full and maximum signal processing computational bandwidth utilization. The relationship among (1) receive signal nominal center frequency $F_0$, (2) receive signal spatial range resolution $\gamma_B$, and (3) the number of simultaneously received beams $N_B$, can be programmed with decimation factors with respect to the decimators and in particular the second decimator, and with respect to the application of time delay values to the memory in order to distinguish between beams. Such advantages are independent of where signal demodulation occurs in the signal path.

e. Complex Multiplier:

Complex multiplication to handle the complex phase rotation for fine time delay is very computational intensive;

however, at this point in the signal path the signal is decimated down to the lowest sample rate in the signal path, and thus complex multiplication can be handled very efficiently. The complex multiplier R-156 accomplishes true complex multiplication with a cross-multiplication as explained below.

In the complex multiplier R-156 signal demodulation to or near baseband occurs in order to account for verniering of $F_o$ to $F_c$. However, as explained above such demodulation to or near baseband, when for example there is no verniering of $F_o$, can occur at other locations in the signal path, such as decimator two, in a different embodiment.

In the complex multiplier R-156, a weighting term which is a function of the apodization value and the focusing phase shift (corresponding to a fine time delay) is multiplied by the signal input from decimator two R-154. The apodization value and the phase shift value can change dynamically on a sample-by-sample, per receive processor, per beam basis. Thus, these values can dynamically vary across the aperture of the transducer as well dynamically vary in time (See FIGS. 13a, 13b, 13c and 19). These values are supplied by the central control system C-104, which is the subject of the above referenced patent application, and the local processor control C-210.

In FIG. 11, the preferred embodiment of the complex multiplier R-156 is conceptually shown with a complex I/O signal sample multiplied in multiplier R-210 by a complex phase value and real apodization value which are combined in a complex multiplier R-260. The complex multiplier R-210 is preferably accomplished by four real multiplication operations performed by a time shared Booth multiplier. Alternatively a separate phase multiplier and a separate apodization multiplier can be used in order to focus the signal. In yet another embodiment, the separate phase multiplier can be implemented with a Cordic multiplier, and the separate apodization multiplier can be implemented by a Booth multiplier.

The output of the complex multiplier R-156 is represented as follows:

$$Y = A \cos \phi \cdot I - A \sin \phi \cdot Q + j (A \cos \phi \cdot Q + A \sin \phi \cdot I)$$

where I+jQ is the input channel sample signal to complex multiplier R-156, A is the apodization value and $\phi$ is the phase shift value.

It is evident from the above and in particular with respect to the memory R-152 and complex multiplier R-156, that the present embodiment implements true dynamic focusing and dynamic apodization as each data sample per beam per receive processor can be modified dynamically with delay values, phase values and apodization values as supplied by the central control system and local processor control systems. Thus, the present embodiment is capable of using instantaneous delay, phase and apodization values calculated by the central control system for every data sample.

As indicated above, the complex multiplier as well as the rest of the functional blocks of FIG. 11 are preferably implemented in high speed digital hardware. In a different embodiment, however, such functional blocks as, for example, for the complex multiplier, can be implemented in software with general purpose microprocessors and in a different computational order and with different algorithms other than specified above. By way of example only, in the complex multiplier the apodization value could be multiplied after the complex I and Q multiplication occurs. Further, the prior art describes other methods of implementing a complex multiplier.

f. Focusing Filter

In another embodiment, the fine focusing delay can also be accomplished with a delay interpolator, such as a linear interpolation between the two samples closest to the desired delay. A generalization of the delay interpolator is a focusing filter, as described for filter-and-sum beamforming in section 6.2.5 of the text by Dudgeon and Mersereau (*Multirate Digital Signal Processing,* Prentice Hall, 1985). Such a filter is programmed differently for each digital multi-channel receive processor, and each waveform associated with each beam within a receive processor, to account for the desired phase-shift-versus-frequency characteristic needed to support receive beamformation. The filter will therefore generally have a nonlinear phase response. The focusing filter characteristics therefore contrast with the signal path filters associated with the decimation and demodulation operations which preferably have linear-phase responses (therefore yielding no distortion of signals in a filter's pass band) and which are typically set to identical characteristics in all receive processors. The decimator and demodulation operation filters are used for waveform shaping, not beamforming, and the same waveform (with appropriate delay and apodization) is normally created in all receive processors, although the invention supports selection of different filter characteristics among receive processors.

3. Per Channel Local Processor Control System:

Secondary or local processor control C-210 (FIG. 11) for the digital multi-channel receiver R-101, receives control data from the primary or central control C-104. The secondary or local processor control C-210 includes a controller and I/O processor C-260, a calibration processor C-262, a memory address and delay processor C-264, a phase and frequency processor C-266, and an apodization processor C-268. The local processor control C-210 is responsible for providing to the digital multi-channel receive processor R-120 frequency values (i.e. demodulation frequency, phase correction frequency, and receive signal nominal center frequency $F_0$, delay values, phase shift values, apodization values and calibration values per digital receive sample and per beam as discussed in detail below. The central control system C-104, as discussed in the above-referenced patent application, is responsible for providing to the local processor control C-210 the following: (1) filter coefficient programming (in line with the definition of programmable above), decimation factor programming, and calibration value programming per imaging mode, (2) frequency parameters as specified below per scan line and per beam, (3) delay and apodization values per dynamic range zone and per beam and (4) delay interpolation/extrapolation coefficients per sample. The local processor control C-210 also controls the sampling rate of the ADC R-118.

a. I/O Processor:

With respect to the secondary or local control C-210, the controller and I/O processor C-260 controls all of the read and write operations.

b. Memory Address and Delay Processor:

In a preferred embodiment, the memory address and delay processor C-264 calculates an interpolated and/or extrapolated delay value for each output sample of each beam of its associated beamformer processor R-120, using zone boundary delay values and the interpolation and/or extrapolation coefficients ($\alpha_{range}$) which are provided by the central control C-104 through a primary delay processor of a focus control C-132. The zone boundary delay values are defined for example by delay profiles (FIG. 13c) at specified range boundaries. The coefficients, $\alpha_{range}$, allow for interpolation (and/or extrapolation) in range between (and/or outbound of) the delay profile boundaries in order to increase the density of delay values between the range boundaries. As can be appreciated, each digital multi-channel receive processor R-120 has a memory address and delay processor C-264 associated with it in order to afford the dynamic focusing. For multiple beam operation, delay interpolations are time interleaved. The delay processor C-264 performs local interpolation/extrapolation in order to increase the density of the sparse, decimated delay profile data set communicated to the memory address and delay processor C-264 from the focus processor C-132 of the central control C-104. After the interpolation/extrapolation step in interpolator C-199 (FIG. 12), the delay value is divided with the most significant bits (coarse delay) being sent to the time delay memory R-152 in order to facilitate the selection of samples for desired beam or beams. The least significant bits (fine time delay) of the time delay value is sent to the phase and frequency processor C-266 where it is turned into a phase value as described more fully hereinbelow.

If selected, the architecture provides for a delay calibration value which can be added to the delay data prior to interpolation in interpolator C-199. The digital receive path delay calibration values from the calibration processor C-262 are supplied on line via C-195 to interpolator C-199.

Figure 18D:
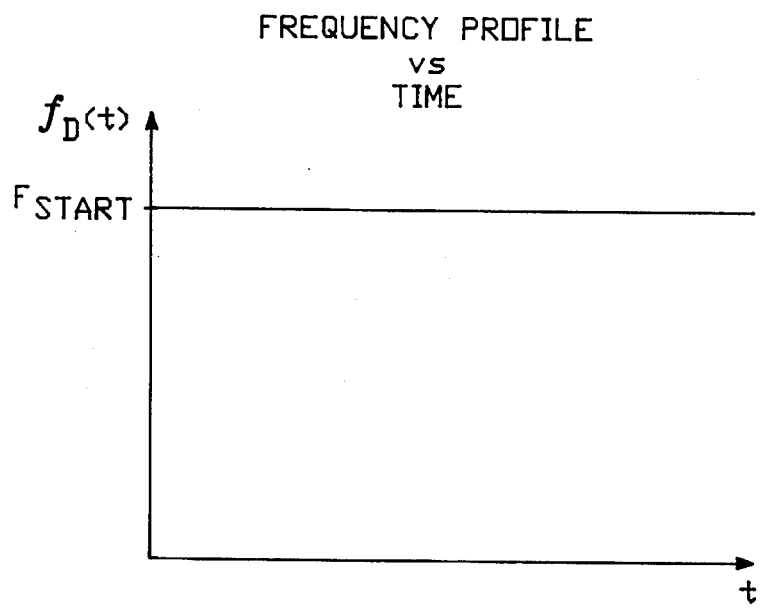
FIGS. 18d, 18e and 18f depict graphs of signal frequency downshifting profiles appropriate for signal demodulation.
Figure 18E:
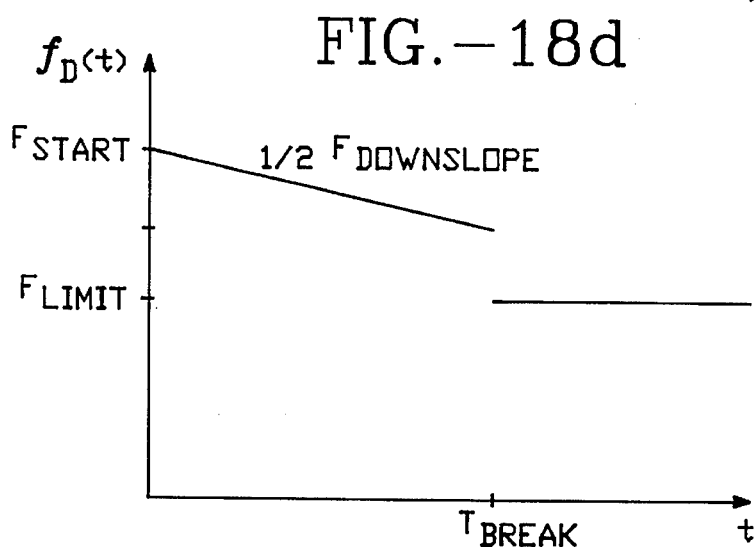
Figure 18F:
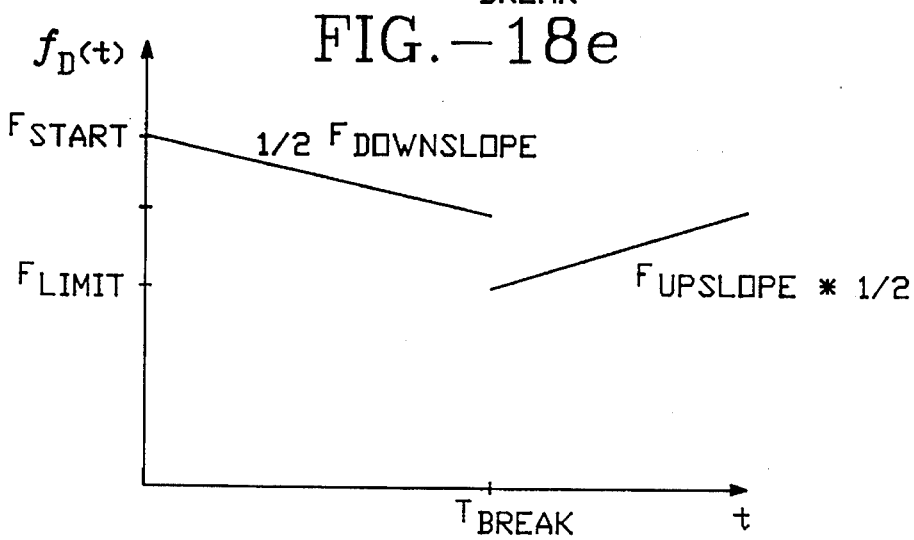
Figure 19:
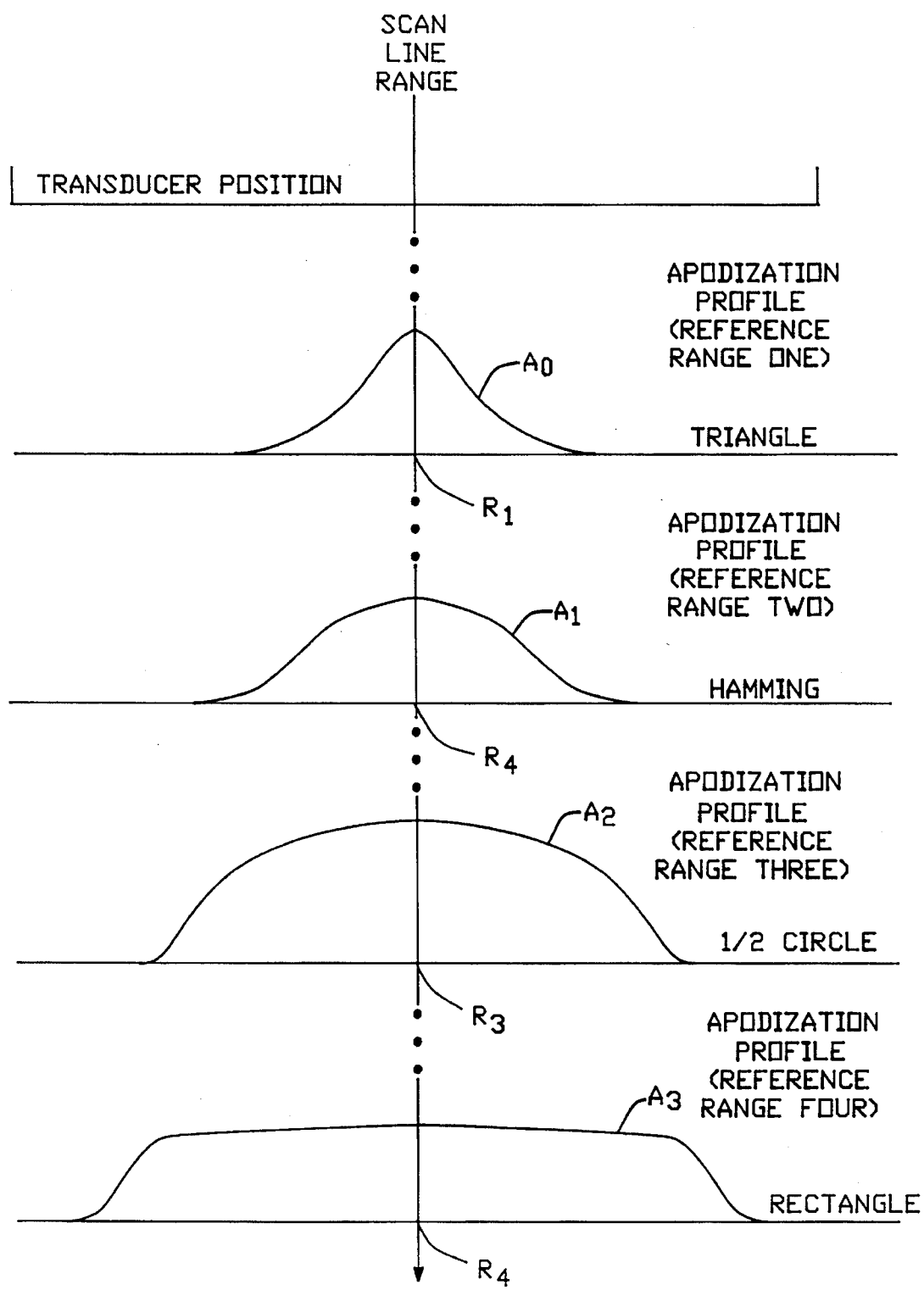
FIG. 19 depicts a series of differently evolving apodization profiles which have increasing aperture widths with increased range along a receive scan line centered on and normal to the transducer array.

Alternative embodiments can have less than a one-to-one relationship between beamformer processor R-120 and memory address and delay processor C-264. Further, such coefficients $\alpha_{range}$ can be locally generated by the memory address and delay processor C-264. Further it is to be understood that still different delay value generation schemes can be employed. By way of example, an accumulator structure similar to accumulator C-272 of the local apodization processor C-268 can be used to generate appropriate delay values.

c. Phase and Frequency Processor:

The phase and frequency processor C-266 (FIGS. 11,16) of local or secondary control C-210 generates demodulation phase values (to, for example, account for the verniering of $F_o$ by the transmit beamformer system), and also phase shift correction values determined by the central control system C-104. The demodulation phase values are ideally calculated as an integration of the demodulation frequency (FIGS. 18a, 18b and 18c) generated from the frequency profile generator C-141. As hardware that accomplishes such integration is expensive, the demodulation phase values are preferably calculated as the sum of (1) a product, computed in multiplier C-140 of the demodulation frequency specification profiles $f_D(t)$ FIGS. 18d, 18e, and 18f, from the frequency profile generator C-141 and a demodulation reference time from the memory address and delay processor C-264 synchronized with the input of data to the delay memory R-152 and (2) a constant value added by adder C-141, as more fully explained below.

The fine focusing phase correction values, as computed in multiplier C-138, are the product of the instantaneous phase correction frequency $f_p(t)$ from the frequency profile generator C-141 (FIGS. 18a, 18b and 18c) and the residual or fine delay time (LSBs of delay time) from the memory address and delay processor C-264. Both the demodulation frequency and the phase correction frequency used in computing the focusing phase values are computed by choosing, in a preferred embodiment, one of the respective frequency profiles generated in the frequency profile generator C-141. The two phase values, the fine phase shift value and the demodulation phase value are added by summer C-142 and communicated to a look-up table C-144 where the phase value is converted into a complex I/Q value.

In a preferred embodiment all demodulation to or near baseband occurs in the complex multiplier. However, in other situations such as by way of example only, where there are frequency offsets, such demodulation can occur alternatively in decimator two through the use of complex filter coefficients with residual demodulation occurring in the complex multiplier. Such frequency offsets can, by way of example only, result when the carrier frequency is verniered from the receive signal nominal center frequency $F_0$ by the above referenced digital transmit beamformer system T-100. Such verniered center frequency can be the same for all beams transmitted from the transmit beamformer T-100 or different for each of multiple transmit beams.

The frequency for demodulation and for phase shift or rotation can be independently programmed in order to select one of the following three frequency-vs-time profiles:

(1) The frequency remains at a constant start frequency $F_{start}$ (generally the carrier frequency $F_c$) which is time independent as shown in FIG. 18a; or (2) The frequency is shifted down from the start frequency ($F_{start}$) by downshift slope $\Delta F_{downslope}$, until it either: (a) saturates at a constant limit frequency, $F_{limit}$, in one embodiment, or (b) reaches a specified time limit, $T_{break}$, and thereafter remains at a constant frequency as shown in FIG. 18b; or (3) The frequency is first shifted down from the start frequency, $F_{start}$, by a downshift slope, $\Delta F_{downslope}$, until it either: (a) saturates at a constant limit frequency, $F_{limit}$, in one embodiment, or (b) reaches a specified time limit, $T_{break}$, and thereafter is immediately shifted up by an upshift slope, $\Delta F_{upslope}$, until the frequency either: (a) saturates at the start frequency, $F_{start}$, or (b) is allowed to continue without saturating at the start frequency (FIG. 18c).

Both the demodulation frequency, $f_D(t)$, and the frequency $f_P(t)$ applied to generate the focusing phase shift value, can be selected from any of the above similar frequency profiles. Thus, the same profile can be applied to both multipliers C-138 and C-140. Different frequency profiles can also be applied to these multipliers in a different embodiment.

These profiles model frequency attenuation of ultrasound signals transmitted through tissue. Thus, for example, the longer that a broadband signal is propagated through tissue, the more that the center frequency of the signal will be downshifted due to such attenuation. In this embodiment, all the profiles began at frequency $F_{start}$. This frequency can be the carrier frequency $F_c$ of the receive beam. It is understood that although the transmit carrier frequency and the corresponding receive carrier frequency can be the same, there is no requirement that they are in fact the same. Accordingly, the start frequency of the frequency profiles can be that of the center frequency of the receive beamformer should it be different from that of the center frequency of the transmit beamformer. Accordingly $F_{start}$ can be any value. However, $F_{start}$ is preferably the transmit carrier frequency $F_c$ which is equal to the vernier factor times the center frequency, $vF_o$.

The parameters for defining the above frequency profiles are stored in the central control C-104. The frequency profile generator C-141 of the phase and frequency processor C-266 receives these parameters and calculates the frequency values on a receive-sample-by-receive-sample basis. These frequency values define the frequency profiles of FIGS. 18a, 18b and 18c.

For one embodiment, the parameters downloaded from the central control and programmed into the local control include the start frequency, the frequency limit, the frequency downslope, and the frequency upslope. As indicated above, the start frequency is generally the carrier frequency $F_c$. The frequency limit is the lowest frequency value used for the above calculations. It is understood that the numbers stored in the central control C-104 can be updated at any time based on new data which can, for example, be introduced and stored on the central control C-104 for example, from hard disk memory.

In another preferred embodiment, the downloaded parameters include the start frequency, the break time, $T_{break}$, the frequency downslope and the frequency upslope. In this embodiment, the downslope is limited not by a limit frequency but by time, $T_{break}$. Thus, the frequency profile in FIG. 18c is allowed to slope down until the $T_{break}$ has expired. At that point, the frequency profiles slopes up.

Preferably, the phase and frequency processor C-266 calculates all profiles simultaneously and then the central and/or local processor control selects the frequency profile, based on criteria pre-stored in the central control C-104, for each imaging mode, to calculate a demodulation phase value and a residual time delay phase value in order to provide the most optimally enhanced image.

Additionally, it is understood that in a multiple beam situation, each of the beams can be received with a different carrier frequency, $F_c$. The central processor could, for example, select different frequencies, slopes, and time limits for each of the beams in order to provide for an enhanced image. In such a situation, the start frequencies for each of the above three frequency profiles would depend upon the frequency for the particular beam formed by the beamformer processor. Thus the frequency profiles for each beam could be specified with entirely different parameters.

As indicated above, as preferably implemented, the demodulation phase value is the sum of (1) a product in multiplier C-140 of the demodulation frequency $f_D(t)$ (FIGS. 18d, 18e, and 18f) from the frequency profile generator C-141 and a demodulation reference time t from the memory address and delay processor C-264 and (2) a value added by adder C-141. If the reference time t is given by $0 \leq t \leq T_{break}$, hen multiplexer C-143 causes t to be multiplied by $f_D(t)$ at multiplier C-140 and multiplexer C-145 causes a zero value to be added by adder C-141. Accordingly, the demodulation phase value is $f_D(t) \cdot t$. If, On the other hand, the reference time t is given by $T_{break} \leq t$ then multiplexer C-143 causes $t-T_{break}$ to be multiplied by $f_D(t)$ and multiplexer C-145 causes the constant value $f_D(T_{break}) \cdot T_{break}$ (see discontinuities in FIGS. 18e and 18f) to be added to the result. Accordingly, the demodulator phase value is $f_D(t) \cdot T - T_{break}) + f_D(T_{break}) \cdot T_{break}$.

d. Apodization Processor:

The apodization processor C-268 (FIG. 18) obtains a sparse table of range bounded apodization values from the focus processor C-132 of the central control C-104. Also obtained from the central control C-104 is the zone width $2^B$ between the range bounded apodization value, which zone width is specified by a value B. If one zone boundary apodization value is $A_1$ (FIG. 19) and the other zone boundary apodization value is $A_2$, then the accumulator C-272 (FIG. 16) of apodization processor C-268 can generate incremented apodization values between $A_1$ and $A_2$ by preferably adding $$\frac{A_2 - A_1}{2^B}$$

to the accumulated apodization values (with the starting value being $A_1$). Accordingly, apodization values are generated every $2^B$ intervals between $A_1$ and $A_2$ in order to fill out the sparse data set sent by the central control. This above operation is implicitly a linear interpolation. However, non-linear techniques can also be implemented as well as extrapolation techniques.

Alternatively, it is to be understood that local apodization processor C-268 can internally calculate the interpolation/extrapolation range coefficients in a local range coefficient generator based on scan geometry parameters supplied from the central control C-104. These parameters define the particular scanning format that is being used. Further in still other embodiments such apodization interpolation/extrapolation coefficients can be pre-stored in the central control and downloaded to the local apodization processor.

The apodization processor C-268 calculates an interpolated/extrapolated apodization value for each output sample of each beam. To support multiple beam operation, the apodization processor C-268 interleaves interpolation/extrapolation calculations. As with the delay values, the apodization values, if desired, can be modified by supplying the apodization calibration values from the calibration processor before the apodization value is applied to the complex multiplier.

The complex value representation of the phase shift and the apodization values, multiplied together in multiplier R-260, are sent to the complex multiplier R-156 to be multiplied with the complex sample signal value.

e. Calibration Processor:

The calibration processor C-262 is activated when a scan format or transducer is changed. During calibration, a common calibration signal from, for example, the transmit beamformer system T-100 is injected into all receive channels. The component tolerances in analog circuitry prior to digitization in ADC R-118 can result in analog-path-to-analog-path signal variances. The local calibration processor compares the output signal to a fixed calibration reference value which is stored in the local calibration processor. The local calibration processor computes delay and apodization correction values for the local control in order to drive the difference between the output signals and the reference signal to zero through an iterative process.

These correction values are sampled on an analog signal path basis and supplied by the calibration processor C-262, with respect to magnitude, to the apodization processor C-268 and, with respect to delay and phase, to the memory address and delay processor C-264.

For operations including, by way of example only, sliding aperture, random aperture and synthetic aperture, multiple fixed calibration reference values can be stored.

In addition to the above locally computed calibration values, calibration values can be downloaded from the central control. For example, calibration values for each type of transducer can be pre-stored in central control or provided to central control when a new transducer is selected. Such calibration values can then be downloaded to the local calibration processor to be combined with the locally generated calibration values, if appropriate.

Figure 17:
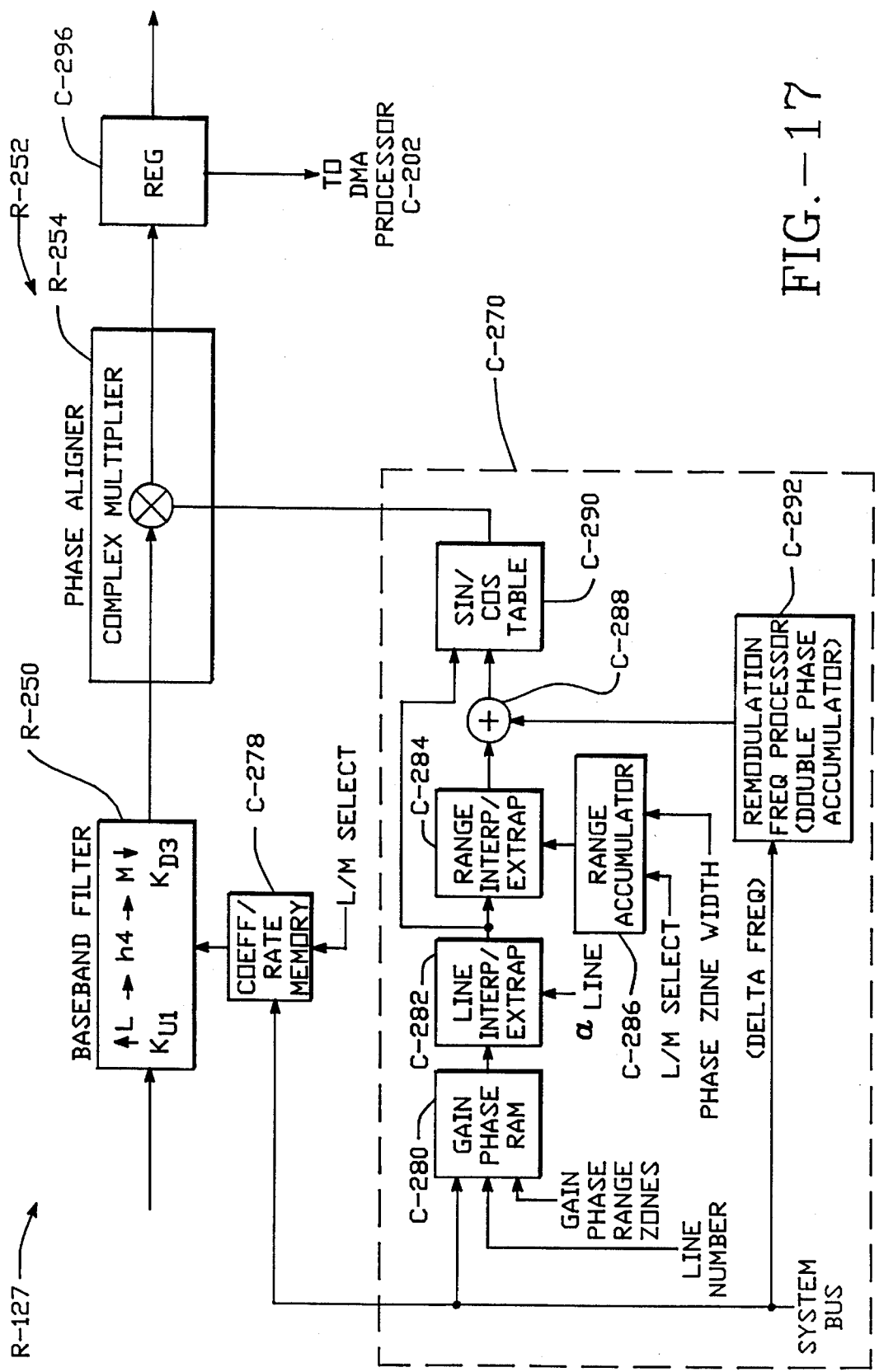
FIG. 17 is a block diagram schematic of an embodiment of a phase aligner of the invention which provides for phase alignment among receive scan lines in conjunction with a decimator, and a phase aligner (gain, phase and frequency) control processor.

4. Final Beamformation Processor (Baseband Multi-Beam Processor):

The digital multi-channel receive processors R-120 are summed by the summer R-126 and the results communicated to the baseband multi-beam processor R-125 (FIG. 2b) which comprises a baseband filter and phase aligner R-127 (FIGS. 2b, 11, 17) and a baseband processor control C-270 (FIGS. 2b, 11, 17).

a. Subarray Summer:

As is known in the art, two standard methods to sum multiple inputs are parallel summation and sequential summation. The present embodiment combines aspects of these two approaches for a fast and efficient summation process. FIG. 2b depicts the summation process of the present digital receive beamformer system. Pairs of digital multi-channel receive processors R-120 are combined through parallel summation. Eight pairs of processors R-120 are sequentially summed by a subarray summer (subarray sums block R-126, FIG. 2b). The summers for this first summation step can be accomplished outside the processors R-120. Alternatively, the processors R-120 can include summers to effect this step. After the above summation, then four such subarray sums are summed in parallel by a semi-final summer (final sums block R-126). Following this step is a parallel summation step where the sums from two semi-final summers are summed in parallel in final summer (sum block R-126). It is to be understood that alternative combinations of parallel and sequential summation techniques or all parallel summation or all sequential summation techniques could be used in a different embodiment.

b. Baseband Filter and Phase Aligner:

The complex baseband signal (or signals in the multiple beam case) from the digital multi-channel receive processors R-120 which represent the summation of all the signals from the elements sampled across the face of the transducer, is communicated to a baseband filter and phase aligner block R-127. Block R-127 includes a baseband filter R-250 (FIG. 17) which performs filtering and rational sample rate conversion (interpolation and decimation). Block R-127 also includes a phase aligner R-252 (FIG. 17) which provides for (1) scan-line-dependent and range-dependent phase adjustments of the signal required to correct for phase differences resulting from line-to-line apodization changes, scan geometry, and non-aligned effective transmit and receive origins, (2) remodulation (frequency alignment) of the signal to correct for phase differences resulting from different transmit frequencies per scan line, and (3) gain adjustment per scan line. An advantage of the use of a scan-line-to-scan-line variable frequency mode on transmit and receive beamformation is the reduction of grating lobes as described in the present patent application. Such phase alignment and remodulation between desired scan lines and particularly two or more adjacent scan lines is, for example, for purposes of implementing coherent image processing techniques as described in the above co-pending application entitled: METHOD AND APPARATUS FOR COHERENT IMAGE FORMATION.

Thus, the purpose of the phase aligner is to maintain scan-line-to-scan-line coherency for (1) adjustable frequency operation, (2) synthetic scan line operation, as well as for (3) synthetic aperture operation, and (4) future operations on coherent beam samples.

Baseband filter R-250 preferably includes a multi-tap FIR filter which is programmable with both real and complex coefficients h4, and a rational sample rate converter. The rational sample rate converter includes an interpolator which has an integer upsampling factor L and a decimator with an integer down sampling factor M. Baseband filter R-250 accordingly accomplishes the following tasks.

First, baseband filter R-250 increases the signal-to-noise ratio by rejecting out-of-band noise frequencies, and/or maximizing the signal-to-noise ratio with a matched filter or quasi-matched filter design, preferably for matching to substantially Gaussian transmit pulses as well as pulses of other shapes. Gaussian pulses are especially useful as they represent waveforms that do not distort during transmission through attenuative media such as the body.

Second, baseband filter R-250 enables pulse equalization and shaping by compensating for both the transducer frequency response and the analog signal path prior to the ADC R-118.

Third, baseband filter R-250 performs a sample rate conversion (decimation function) based upon the rational (non-integer) decimation factor L/M (where L and M are integers). Accordingly, the sample rate is converted to a rate that is advantageous for an image display.

Examples of such decimation can be found in the references identified with the above discussion of decimator one and decimator two. The filter coefficients and non-integer decimation factors for baseband filter R-250 are programmed into baseband filter/phase aligner R-127 by being downloaded from the central control C-104 to coefficient and rate memory C-278. The downloaded coefficients and factors can be changed at any time by introducing new coefficients and factors into the central control C-104. The coefficients and factors stored in the coefficient and rate memory C-278 are selectable by the central control C-104 for programming the filter and decimation ratio L/M of the baseband filter R-250.

The complex multiplier R-254 of phase aligner R-252 operates in a manner similar to complex multiplier R-156 (FIG. 11).

Following complex multiplier R-254 is a register C-296 which stores scan line sample data so that it can be reported to the DMA processor C-202 of the central control C-104 for providing scan-line-to-scan-line calibration.

c. Baseband Processor Control:

The phase aligner includes a control function which is contained in a baseband processor control C-270 (FIGS. 2b, 11, 17). In this baseband processor control C-270, a scan-line-to-scan-line or beam-to-beam gain adjustment value and a phase adjustment value are generated in a time interleaved manner. As discussed above, the phase correction value is the sum of the phase terms including: (1) a phase adjustment term required to correct for phase differences due to scan-line-to-scan-line apodization changes, and scan geometry which results in non-aligned effective transmit and receive origins (the scan-line-dependent and range-dependent phase adjustment term) and (2) a phase term required to remodulate the signal as though each line had used a common carrier frequency. As discussed herein and in co-pending U.S. patent application entitled: METHOD AND APPARATUS FOR TRANSMIT BEAMFORMER SYSTEM, using a frequency scaling factor or frequency vernier factor, each beam can have a different carrier frequency. The phase aligner accordingly provides for remodulation between beams so that all beams are adjusted for differences in carrier frequencies.

In operation a source data set including scan format geometry parameters, sparse scan line gain and delay value, interpolation coefficient and non-integer decimation factors are downloaded from the central control C-104 to the baseband processor control C-270. Additionally, frequency parameters used in the frequency profile generator of the central control C-104 in accordance with FIGS. 18a, 18b and 18c are downloaded to the baseband processor control C-270.

Figure 16:
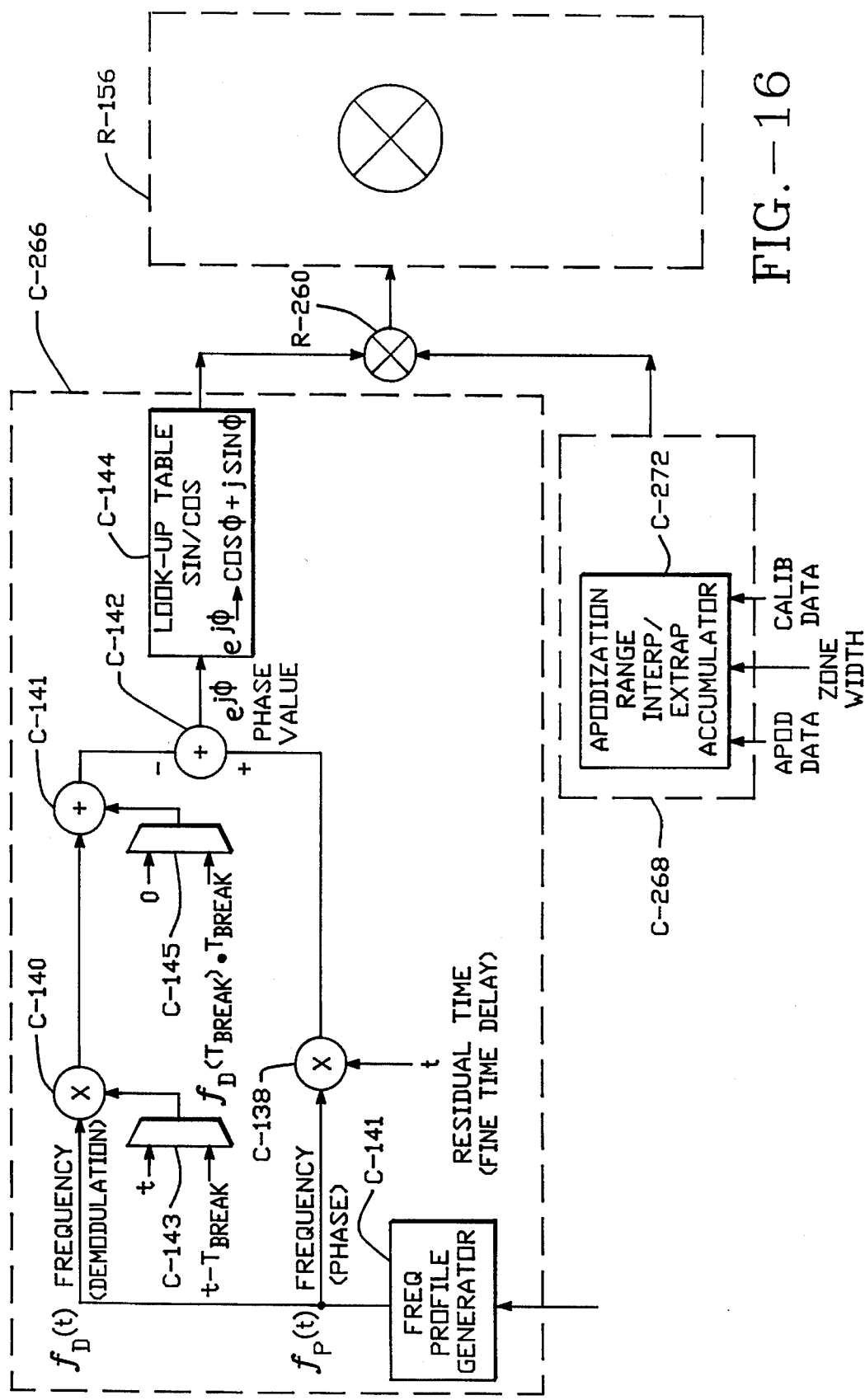
FIG. 16 depicts a schematic of an embodiment of the complex multiplier, the phase and frequency processor, and the apodization processor of the local processor control of the invention.

The baseband processor control C-270 of FIG. 17 includes a gain and phase RAM C-280, a line interpolator C-282 which is supplied with pre-calculated and pre-stored line interpolation coefficients ($\alpha_{line}$) by the central control C-104, and a range interpolator C-284 with a range accumulator C-286, which is supplied with a rational decimation factor L/M and a phase zone width, both of which values are pre-calculated and pre-stored in the central control C-104. The rational decimation factor L/M is the same value supplied to the baseband filter R-250. Accumulator C-286 operates in the same manner as does accumulator C-272 of the local apodization processor C-268 (FIG. 16). Additionally as is known in the art a sample rate conversion in accordance with the rational decimation factor L/M is accomplished in order to match the sample data rate of the baseband filter R-250.

Alternatively the range interpolator/extrapolator C-284 can be supplied with programmable (as defined above) interpolation/extrapolation coefficients which are, by way of example, either (1) pre-calculated and pre-stored in or calculated by the central control or (2) calculated locally in baseband processor control C-270 by a coefficient generator.

The baseband processor control C-270 also includes a remodulation frequency processor C-292 which is preferably implemented as a double phase accumulator. The double phase accumulator calculates phase adjustment values to correct for line-to-line frequency differences and thus to remodulate the signal as though a common carrier frequency had been used across all scan lines.

From the central control C-104, pre-calculated and pre-stored values representing the frequency differences between scan lines (delta frequency values) are sent to the remodulation frequency processor C-292. These frequency difference values are based on frequencies and frequency slopes such as specified in FIGS. 18a, 18b and 18c. By way of example only, let it be assumed that the frequency profiles for two scan lines look like FIG. 18b but with different start frequency, $F_{start}$, values and different downshift slope, $\Delta F_{downslope}$, values. Accordingly, downloaded to baseband processor control C-270 from the central control for the two scan lines are the difference in frequencies between the scan lines and the difference in the rate of change of the frequency profiles over time. These values are calculated by the acquisition processor C-130 based on stored parameters and dependent upon the particular rational conversion factor L/M currently being used. The first accumulator of processor C-292 accumulates the difference in the rates of change of the frequency profiles over time between scan line while the second accumulator accumulates the difference in the frequencies between the scan lines over time. If there is no difference in the rate of change of the frequency profile over time, (i.e. the profile are the same exact for initially different $F_{start}$ values, or after $T_{break}$ in FIG. 18b when the slope goes to zero) the first accumulator performs no function. With no difference in the rate changes of the frequencies between the scan lines, only the second accumulator accumulates the frequency differences over time resulting in a corrective remodulation phase value.

The phase adjustment due to scan-line-to-scan-line apodization changes, scan geometry which results in non-aligned transmit and receive origins, and the phase adjustment due to remodulating the signal to an effective common carrier frequency are added in a summer C-288 and the summed phase value is then converted in a look-up table C-290 to sine and cosine representations. As part of the look-up table C-290 function, the gain is multiplied by the sine and cosine representations. This value is applied to complex multiplier R-252.

It is to be understood that other embodiments of the baseband processor control are possible.

As indicated above the phase aligner R-127 ensures that coherent signal and sample relationships are maintained between scan lines. The transmit samples and the echo or receive samples of the signals from beams are defined as being coherent when sufficient information is stored, preserved, or maintained to enable the samples of the return signals to be phase and amplitude corrected from scan-line-to-scan-line. The process of actually making the phase and amplitude corrections need not have yet taken place, as long as sufficient information with respect to a reference is maintained.

When a signal sample is processed coherently, the processing continues to maintain sufficient information to perform phase and amplitude correction at a later time. When two or more samples are processed coherently (e.g., coherently summed), the phase and amplitude corrections necessary for phase and amplitude alignment must have previously been performed.

Coherent processing of two or more signal samples yields significant benefits, such as being able to calculate synthetic samples, as described in the above co-pending application.

Due to the beamformer control C-104 specifying and accounting for all aspects of the transmit and receive signal, the entire system maintains all signal samples as coherent samples throughout the transmit and receive signal path, until the signal is finally detected in an operation which is external to beamformation.

It is to be understood that although scan- line-to-scan-line phase alignment is accomplished by baseband filter/phase aligner R-127 after beamformation, that such phase alignment can be provided prior to beamformation in the digital multi-channel receive processor R-120. By way of example, such phase alignment can be accomplished in each complex multiplier R-156 of each processor R-120.

5. Synthetic Aperture

Synthetic aperture, in the preferred embodiment, is characterized by: (1) partitioning the array of transducer elements into a plurality of independent or substantially independent subarrays for transmission and/or reception, each subarray consisting of multiple transducer elements; (2) executing a plurality of transmit/receive sequences with a subarray pair; (3) for each sequence, acquiring the coherent samples; and (4) combining, preferably by summation or weighted summation, all corresponding coherent samples. With such an arrangement, the number of transmit and/or receive electronic paths is effectively increased, and the transducer aperture on transmission and/or reception is increased. Synthetic aperture scanning is described, for example, in Klahr U.S. Pat. No. 3,805,596, entitled: "High Resolution Ultrasonic Imaging Scanner," and in Saugeon U.S. Pat. No. 4,733,562, entitled: "Method And Apparatus For Ultrasonic Scanning Of An Object." Synthetic aperture scanning is also identified in Kino, "Acoustic Imaging for Nondestructive Evaluation," and Sutton, "Underwater Acoustic Imaging," both in Proceedings of the IEEE, Vol. 67, April 1979. All the above references are incorporated herein by reference.

The present digital receive beamformer system supports synthetic aperture operations. The calibration processor stores gain and phase corrections for the subarray receive apertures used in the synthetic aperture operations. The phase aligner maintains coherency of the separately received subarray receive aperture beams so that a summer can combine the signals to form a synthetic aperture scan line.

Further description of such synthetic aperture operation can be found in co-pending application entitled: METHOD AND APPARATUS FOR COHERENT IMAGE FORMATION.

We claim:

1. A method for scanning a field of view with a plurality of ultrasonic transmit beams, at least a first and a second of which traverse different paths through said field of view, comprising the steps of:

modulating baseband waveforms for at least said first and said second of said transmit beams to ultrasonic frequencies, wherein an ultrasonic frequency to which said first transmit beam is modulated is higher than an ultrasonic frequency to which said second transmit beam is modulated; and for at least said first and second of said transmit beams, exciting each respective transducer in an array of ultrasonic transducers with a respective excitation signal which is responsive to a respective one of said modulated baseband waveforms to produce the transmit beam.

2. A method according to claim 1, wherein said field of view has a central region and an outer region extending laterally from said central region in said field of view, and wherein said first beam traverses said central region and said second beam traverses said outer region.

3. A method according to claim 2, wherein the frequencies for all of the beams in said plurality of ultrasonic beams which traverse said central region are equal to the frequency for said first beam, and wherein the frequencies for all of the beams in said plurality of ultrasonic beams which traverse one of said outer regions are equal to the frequency of said second beam.

4. A method according to claim 1, wherein said field of view has two laterally opposite edges, a central region, and a pair of outer regions each extending laterally from said central region to a respective one of said edges of said field of view, and wherein said first beam traverses said central region and said second beam traverses one of said outer regions.

5. A method according to claim 4, wherein the frequencies for all of the beams in said plurality of ultrasonic beams which traverse said central region are equal to the frequency for said first beam, and wherein the frequencies for all of the beams in said plurality of ultrasonic beams which traverse one of said outer regions are equal to the frequency of said second beam.

6. A method according to claim 1, wherein each of said beams in said plurality of ultrasonic beams has a different apparent steering angle relative to a normal to a surface of said array.

7. A method according to claim 6, wherein the frequencies for the beams in said plurality of ultrasonic beams step down in more than two frequency steps from a beam with the smallest absolute apparent steering angle to a beam with the largest absolute apparent steering angle, inclusive.

8. A method according to claim 6, wherein the frequencies for the beams in said plurality of ultrasonic beams step down in at least one frequency step from a beam with the smallest absolute apparent steering angle to a beam with the largest absolute steering angle, inclusive.

9. A method according to claim 8, wherein the maximum steering angle $\theta_{S,max}$ any of the beams in said plurality which are in each of said frequency steps, is related to the frequency f for the beams in such frequency step according to the relationship $$\sin(\theta_{S,max}) \leq \{\kappa/(2 \cdot f_\#)\}\{-b + \{b^2 - b + (\lambda/d \cdot f_\#)^2\}^{1/2}\}$$

where $\lambda = c/f$;

c is a constant approximating the speed of sound in the human body;

$b = (1 - \{\lambda/(2d)\}^2)$;

$f_\#$ is the f-number defined by the focal length r divided by the active aperture width D;

d is the transducer element spacing in said array; and $\kappa$ is a desired value which is constant over all of said frequency steps, $0 < \kappa < 1$.

10. A method according to claim 8, wherein the frequency $f_i$ for the i'th one of the beams in said plurality of beams is approximately:

$$f_i = (c/d)\{\sin(|\theta_{S,i}|) + k(\theta_{S,max})\}^{-1},$$

where c is a constant which approximates the speed of sound in the human body;

d is the transducer element spacing in said array;

$\theta_{S,i}$ is the steering angle for said i'th beam; and $k(\theta_{S,max})$ is a constant which depends upon the maximum steering angle $\theta_{S,max}$.

11. A method according to claim 6, wherein the frequency $f_i$ for the i'th one of the beams in said plurality of beams is approximately:

$$f_i = (c/d)\{\sin(|\theta_{S,i}|) + k(\theta_{S,max})\}^{-1},$$

where c is a constant which approximates the speed of sound in the human body;

d is the transducer element spacing in said array;

$\theta_{S,i}$ the steering angle for said i'th beam; and $k(\theta_{S,max})$ is a constant which depends upon the maximum steering angle $\theta_{S,max}$.

12. A method according to claim 11, wherein $\theta_{S,max} \approx 45°$.

13. A method according to claim 11, wherein $k(\theta_{S,max}) \approx 1.29$.

14. A method according to claim 1, wherein each of said beams in said plurality of ultrasonic transmit beams has a different apparent point of intersection with a surface of said array.

15. A method according to claim 14, wherein each of said beams in said plurality of ultrasonic transmit beams also has a different apparent steering angle relative to a normal to said surface of said array.

16. A method according to claim 14, wherein the frequency for the beams in said plurality of ultrasonic transmit beams step down in more than two steps from a beam whose point of intersection is nearest the center of said surface of said array.

17. A method according to claim 1, further comprising the step of repeating the steps of modulating and exciting, to produce a plurality of scans of said field of view separated in time, the ultrasonic frequency for each respective beam in said plurality of beams being the same in all of said scans.

18. A method according to claim 1, further comprising the steps of;

forming at least one ultrasonic receive beam corresponding to each of the beams in said plurality of ultrasonic transmit beams, each of said receive beams being represented with a plurality of input waveforms received from corresponding ones of said transducers and containing information for a plurality of ranges along the receive beam, at least a first and a second one of said receive beams traversing different paths through said field of view; and demodulating the input waveforms of each of said receive beams with a respective demodulation frequency for the receive beam, the demodulation frequency for said first receive beam being higher than the demodulation frequency for said second receive beam for information at the same range.

19. A method according to claim 1, further comprising the steps of:

forming at least one ultrasonic receive beam corresponding to each of the beams in said plurality of ultrasonic transmit beams, each of said receive beams being represented with a plurality of input waveforms received from corresponding ones of said transducers and containing information for a plurality of ranges along the receive beam, at least a first and a second one of said receive beams traversing different paths through said field of view;

demodulating and combining the demodulated input waveforms of each of said receive beams to produce a beam output waveform for each of said receive beams; and filtering across the beam output waveforms for different ones of said receive beams.

20. A method according to claim 1, further comprising the step of exciting said array of ultrasonic transducers during said scan to produce an additional ultrasonic beam which is not in said plurality of ultrasonic beams.

21. A method according to claim 1, wherein said baseband waveforms have frequency spectrums centered at approximately 0 Hz.

22. A method according to claim 1, wherein said baseband waveforms have frequency spectrums centered at frequencies which are as low as possible on a given apparatus.

23. A method according to claim 1, wherein said baseband waveforms are the same for all of said beams.

24. A method according to claim 1, wherein said ultrasonic beams in said plurality of ultrasonic beams are all separated in time.

25. A method according to claim 1, wherein said step of exciting each respective transducer in an array of ultrasonic transducers with a respective excitation signal comprises the steps of:

exciting each respective transducer in said array with a respective excitation signal which is responsive to a respective one of said modulated baseband waveforms for one of said transmit beams; and simultaneously exciting each respective transducer in said array with a respective excitation signal which is responsive to a respective one of said modulated baseband waveforms for another of said transmit beams.

26. A method according to claim 1, wherein a surface of said array of transducers is planar.

27. A method according to claim 1, wherein a surface of said array of transducers is curved.

28. The method for scanning a field as in claim 1 wherein a baseband waveform from which said first beam is formed is identical to a baseband waveform from which said second beam is formed.

29. The method for scanning a field as in claim 1 in which said baseband waveforms are comprised of initial waveform samples.

30. The method according to claim 1 wherein each of said baseband waveforms is a baseband waveform envelope.

31. A method for scanning a field of view with a plurality of ultrasonic receive beams to form an image, each of said receive beams being represented with a plurality of input waveforms received from corresponding transducers in an array of transducers and containing ensonified object responses for a plurality of ranges, at least a first and a second one of said receive beams traversing different paths through said field of view comprising the steps of:

forming said receive beams; and demodulating the input waveforms to form baseband waveforms for each of said receive beams with at least one respective demodulation frequency, a demodulation frequency for said first receive beam at a given range being higher than a demodulation frequency for said second receive beam at said given range.

32. A method according to claim 31, wherein the demodulation frequency for each particular one of said receive beams is constant for all ranges of said particular receive beam.

33. A method according to claim 31, wherein the demodulation frequency for each of said receive beams varies as a function of range.

34. A method according to claim 31, wherein said field of view is two-dimensional.

35. A method according to claim 31, wherein the step of forming said receive beams comprises, for each particular one of said receive beams, the step of combining waveforms responsive to the input waveforms of the particular receive beam to produce a beam waveform for the particular receive beam, further comprising the step of phase-aligning the beam waveforms to achieve phase coherence for said first and second receive beams at said given range.

36. A method according to claim 35, wherein said step of phase-aligning comprises the step of remodulating the beam waveform for at least one of said first and second beams at said given range with respective remodulation frequencies $\omega_r^1$ and $\omega_r^2$ such that $$\omega_d^1 + \omega_r^1 = \omega_d^2 + \omega_r^2$$

where $\omega_d^1$ is the demodulation frequency for said first receive beam at said given range, and $\omega_d^2$ is the demodulation frequency for said second receive beam at said given range.

37. A method according to claim 36, wherein said demodulation frequencies $\omega_d^1$ and $\omega_d^2$ and said remodulation frequencies $\omega_r^1$ and $\omega_r^2$ vary with range.

38. A method according to claim 36, wherein said ensonified object responses are represented in complex format, and wherein said step of phase-aligning further comprises the step of additionally phase-rotating the ensonified object responses at each range in the beam waveform for said first receive beam by an additional range-dependent phase correction term.

39. A method according to claim 31, wherein said steps of forming and demodulating collectively comprise, for each particular one of said receive beams, the steps of:

selectively delaying waveforms responsive to the input waveforms for the particular beam by differing amounts according to a delay profile;

demodulating waveforms responsive to each of said input waveforms with the demodulation frequency for the particular beam; and summing waveforms responsive to said input waveforms after said step of delaying and demodulating waveforms responsive to the input waveforms.

40. A method according to claim 39, wherein each said input waveforms contain ensonified object responses represented in complex format at said plurality of ranges, further comprising the step of phase-rotating waveforms responsive to each input waveform for at least one of said first and second beams at said given range to phase-align said first and second beams with each other at said given range.

41. A method according to claim 31, wherein said field of view has a central region and an outer region extending laterally from said central region in said field of view, and wherein said first beam traverses said central region and said second beam traverses said outer region.

42. A method according to claim 31, wherein said field of view has two laterally opposite edges, a central region, and a pair of outer regions each extending laterally from said central region to a respective one of said edges of said field of view, and wherein said first beam traverses said central region and said second beam traverses one of said outer regions.

43. A method according to claim 31, further comprising the step of repeating the steps of forming and demodulating, to produce a plurality of scans of said field of view separated in time, the demodulation frequency for each of said receive beams being the same in all of said scans.

44. The method of claim 31 in which the demodulation frequency of said first receive beam is responsive to a transmit excitation at a first ultrasound frequency and the demodulation frequency of said second receive beam is responsive to a transmit excitation at a second ultrasound frequency.

45. A method for scanning a field of view with a plurality of ultrasonic transmit beams, at least a first and a second of which traverse different paths through said field of view, comprising the steps of:

providing at least one baseband waveform for different ones of said transmit beams;

modulating each of said baseband waveforms for each given one of said transmit beams to an ultrasonic frequency for said given transmit beam, the ultrasonic frequency for said first transmit beam being higher than the ultrasonic frequency for said second transmit beam;

for each given one of said transmit beams, exciting each respective transducer in an array of ultrasonic transducers with a respective excitation signal which is responsive to a respective one of said modulated baseband waveforms for the given transmit beam;

forming a plurality of ultrasonic receive beams, each of said receive beams being represented with a plurality of input waveforms received from corresponding transducers in said array of transducers and containing ensonified object responses for a plurality of ranges along the receive beam, at least a first and a second one of said receive beams traversing different paths through said field of view; and demodulating the input waveforms with a respective demodulation frequency to form demodulated baseband waveforms for each of said receive beams the demodulation frequency for said first receive beam at a given range being higher than the demodulation frequency for said second receive beam at said given range.

46. A method according to claim 45, wherein said first transmit beam intersects a surface of said array at a point, and with a same steering angle relative to a normal to said surface, as those of said first receive beam; and wherein said second transmit beam intersects said surface at the point, and with the same steering angle relative to a normal to said surface, as those of said second receive beam.

47. A method according to claim 46, wherein said field of view has a central region and an outer region extending laterally from said central region in said field of view, wherein said first transmit beam and said first receive beam both traverse said central region, and wherein said second transmit beam and said second receive beam both traverse said outer region.

48. A method according to claim 46, wherein said field of view has two laterally opposite edges, a central region, and a pair of outer regions each extending laterally from said central region to a respective one of said edges of said field of view, wherein said first transmit beam and said first receive beam both traverse said central region, and wherein said second transmit beam and said second receive beam both traverse one of said outer regions.

49. A method according to claim 45, wherein said plurality of ultrasonic receive beams further includes third and fourth receive beams each traversing a respective path through said field of view, both different from the paths of both said first and second receive beams, wherein said first and third receive beams are both formed in response to said first transmit beam, and wherein said second and fourth receive beams are both formed in response to said second transmit beam.

50. A method according to claim 45, wherein said field of view is two-dimensional.

51. The method for scanning a field as in claim 45 wherein a baseband waveform from which said first beam is formed is identical to a baseband waveform from which said second beam is formed.

52. The method for scanning a field as in claim 45 in which said baseband waveforms are comprised of amplitude and phase samples.

53. A method according to claim 45 wherein the baseband waveforms are initial waveform envelopes.

54. A method according to claim 45 wherein the baseband waveforms comprise initial waveform samples.

55. A method according to claim 45 wherein the demodulated baseband waveforms comprise demodulated waveform samples.

56. A method for scanning a field of view with a plurality of ultrasonic transmit beams transmitted from a transducer array comprised of a plurality of elements and responsive to a beamformer, wherein at least a first and a second of said ultrasonic transmit beams extend at a same angle relative to a respective normal to a surface of an array of transducers but have different points of intersection with said surface, comprising the steps of:

producing said first transmit beam with a first ultrasonic frequency; and producing said second transmit beam with a second ultrasonic frequency below said first ultrasonic frequency.

57. A method according to claim 56, wherein said field of view has a central region and an outer region extending laterally in said field of view, and wherein said first beam traverses said central region and said second beam traverse said outer region.

58. A method according to claim 57, further comprising the steps of:

forming a plurality of ultrasonic receive beams, each of said receive beams being represented with a plurality of input waveforms received from corresponding transducers in said array of transducers and containing ensonified object responses for a plurality of ranges along the receive beam, at least a first and a second one of said receive beams extending at a same angle relative to a respective normal to said surface of said array of transducers but having different points of intersection with said surface; and demodulating the input waveforms for each of said receive beams with a respective demodulation frequency, a demodulation frequency for said first receive beam range being higher than a demodulation frequency for said second receive beam for a same range, said first receive beam traversing said central region and said second receive beam traversing one of said outer regions.

59. A method according to claim 58, wherein all of said beams in said plurality of ultrasonic receive beams traverse parallel pats through said field of view.

60. A method according to claim 56, wherein said field of view has two laterally opposite edges, a central region, and a pair of outer regions each extending laterally from said central region to a respective one of said edges of said field of view, and wherein said first beam traverses said central region and said second beam traverses one of said outer regions.

61. A method according to claim 56, wherein said step of producing said first transmit beam comprises the steps of:

providing at least one baseband waveform for said first transmit beam;

modulating each of said baseband waveforms for said first transmit beam to the first ultrasonic frequency for said first transmit beam; and exciting each respective transducer in said array of ultrasonic transducers with a respective excitation signal which is responsive to a respective one of said modulated baseband waveforms for said first transmit beam, and wherein said step of producing said second transmit beam comprises the steps of:

providing at least one baseband waveform for said second transmit beam;

modulating each of said baseband waveforms for said second transmit beam to the second ultrasonic frequency for said second transmit beam; and exciting each respective transducer in said array of ultrasonic transducers with a respective excitation signal which is responsive to a respective one of said modulated baseband waveforms for said second transmit beam.

62. A method according to claim 56, wherein all of said beams in said plurality of ultrasonic transmit beams traverse parallel paths through said field of view.

63. A method according to claim 56, wherein said field of view is two-dimensional.

64. Apparatus for scanning a field of view with a plurality of ultrasonic transmit beams, including a first and a second of said beams, comprising:

an array of ultrasonic transducers having a surface;

modulation circuitry for modulating of at least one baseband waveform for each of said transmit beams to an ultrasonic frequency for said each transmit beam, the ultrasonic frequency for said first transmit beam being higher than the ultrasonic frequency for said second transmit beam; and excitation circuitry which, for each of said transmit beams, excites each transducer in an array of ultrasonic transducers with an excitation signal which is responsive to said modulated baseband waveforms for the transmit beams, said first and second transmit beams being produced from said array with different paths through said field of view.

65. Apparatus for scanning a field of view with a plurality of ultrasonic receive beams including a first and a second of said receive beams, each of said receive beams being represented with a plurality of input waveforms received from corresponding transducers in an array of transducers and containing information at a plurality of ranges, comprising:

an array of transducers having a surface;

beamformation apparatus forming said receive beams, at least said first and second receive beams traversing different paths through said field of view; and demodulation circuitry for demodulating the input waveforms to demodulated baseband waveforms for each of said receive beams with a respective demodulation frequency for each receive beam, a demodulation frequency for said first receive beam at a given range being higher than a demodulation frequency for said second receive beam at said given range.

66. Apparatus for scanning a field of view with a plurality of ultrasonic transmit beams including a first and a second of said transmit beams, and a plurality of ultrasonic receive beams including a first and a second of said receive beams, each of said receive beams being represented with a plurality of input waveforms received from corresponding transducers in an array of transducers containing ensonified object responses at a plurality of ranges, comprising:

an array of ultrasonic transducers having a surface;

modulation circuitry for modulating of at least one baseband waveform for each of said transmit beams to an ultrasonic frequency for said transmit beam, the ultrasonic frequency for said first transmit beam being higher than the ultrasonic frequency for said second transmit beam; and excitation circuitry which, for each one of said transmit beams, excites each transducer in said array of ultrasonic transducers with a respective excitation signal which is responsive to one of said modulated baseband waveforms for the transmit beam, said first and second transmit beams being produced from said array with different paths through said field of view;

beamformation apparatus forming said receive beams, at least said first and second receive beams traversing different paths through said field of view; and demodulation circuitry for demodulating the input waveforms for each of said receive beams with a respective demodulation frequency for each receive beam, a demodulation frequency for said first receive beam at a given range being higher than a demodulation frequency for said second receive beam at said given range.

67. Apparatus for scanning a field of view with a plurality of ultrasonic transmit beams including a first and a second one of said transmit beams, comprising:

an array of ultrasonic transducers having a surface;

means for exciting multiple elements of said array of transducers with appropriate time delays to produce said first transmit beam with a first ultrasonic frequency, said first transmit beam extending at a first angle relative to a normal to said surface of said array and having a first point of intersection with said surface of said array;

means for exciting said array of transducers to produce said second transmit beam with a second ultrasonic frequency, said second transmit beam extending at said first angle relative to a normal to said surface of said array and having a second point of intersection with said surface of said array, wherein said second point of intersection is different from said first point of intersection, and wherein said second ultrasonic frequency is below said first ultrasonic frequency.

68. A method for scanning a field of view with a plurality of ultrasonic transmit beams, at least a first and a second of which traverse different paths through said field of view, comprising the steps of:

generating a waveform for each of said transmit beams at an ultrasonic frequency, the ultrasonic frequency for said first transmit beam being higher than the ultrasonic frequency for said second transmit beam; and for each of said transmit beams, exciting each respective transducer in an array of ultrasonic transducers with a respective excitation signal which is responsive to a respective one of said generated waveforms to produce the given transmit beam.

69. A method for scanning a field of view with a plurality of ultrasonic transmit beams, at least a first and a second of which traverse different paths through said field of view, comprising the steps of:

generating a set of waveform samples for each of said transmit beams at an ultrasonic frequency, the ultrasonic frequency for said first transmit beam being higher than the ultrasonic frequency for said second transmit beam;

for each of said transmit beams, exciting each respective transducer in an array of ultrasonic transducers with a respective excitation signal which is responsive to a respective one set of said generated waveform samples to produce the transmit beam;

forming a plurality of ultrasonic receive beams, each of said receive beams being represented with a plurality of input waveforms received from corresponding transducers in said array of transducers and containing information for a plurality of ranges along the receive beam, at least a first and a second one of said receive beams traversing different paths through said field of view; and demodulating the input waveforms to form demodulated baseband waveforms for each of said receive beams with a respective demodulation frequency, a demodulation frequency for said first receive beam at a given range being higher than a demodulation frequency for said second receive beam at said given range.

70. Apparatus for scanning a field of view with a plurality of ultrasonic transmit and receive beams, including with a first and a second transmit beam, and first one or more receive beams corresponding to said first transmit beam and second one or more receive beams corresponding to said second transmit beam comprising:

an array of ultrasonic transducers; and circuitry for modulating waveforms to create transmit excitation waveforms associated with transmit beams, and for demodulating waveforms associated with receive beams, said circuitry including means for producing excitation waveforms at a higher ultrasonic frequency associated with said first transmit beam and a lower ultrasonic frequency associated with a second transmit beam;

wherein said first and second transmit beams are produced from said array along different paths through said field of view.

71. The apparatus of claim 70 wherein said modulation circuitry modulates baseband waveforms to produce first modulated waveforms applied to said ultrasonic transducers to produce said first transmit beam and modulates baseband waveforms to produce second modulated waveforms applied to said ultrasonic transducers to produce said second transmit beam.

72. The apparatus of claim 70 further comprising beamforming apparatus for forming said first one or more receive beams corresponding to said first transmit beam, and for forming said second one or more receive beams corresponding to said second transmit beam.

73. The apparatus of claim 72 wherein said demodulation circuitry produces first demodulated baseband waveforms from input waveforms which are combined to form said first one or more receive beams, and second demodulated baseband waveforms from input waveforms which are combined to form said second one or more receive beams.

74. The apparatus of claim 73 wherein said demodulation circuitry produces demodulated baseband waveforms from input waveforms for each receive beam, said first one or more receive beams having a higher demodulation frequency than said second one or more receive beams.

75. The apparatus of claim 73 further including remodulation circuitry to produce first one or more remodulated waveforms associated respectively with said first one or more receive beams, and second one or more remodulated waveforms associated respectively with said second one or more receive beams, wherein phase coherence is maintained between said first one or more and said second one or more remodulated waveforms corresponding respectively to said first one or more and second one or more receive beams.

76. The apparatus of claim 75 wherein the sum of a first demodulation frequency corresponding to said first demodulated waveforms plus a first remodulation frequency corresponding to said first remodulated waveforms is equal to the sum of a second demodulated frequency corresponding to said second demodulated waveforms plus a second remodulation frequency corresponding to said second remodulated waveforms.

77. The apparatus of claim 70 or claim 76 wherein each transmit beam is associated with a single receive beam.

78. The apparatus of claim 70 or claim 76 wherein each transmit beam is associated with a plurality of receive beams.

79. The apparatus of claim 70 wherein a surface of said array of transducers is planar.

80. The apparatus of claim 70 wherein a surface of said array of transducers is curved.

* * * * *

UNITED STATES PATENT AND TRADEMARK OFFICE
CERTIFICATE OF CORRECTION

PATENT NO. : 5,549,111
DATED : August 27, 1996
INVENTOR(S) : Wright et al.

It is certified that error appears in the above-identified patent and that said Letters Patent is hereby corrected as shown below:

In column 10, line 66, replace "C104," with --C-104,--.

In column 22, line 32, after "power.)" insert a new paragraph as follows:

--N/I=Mode not implemented in the embodiment described herein.--

In column 22, line 47, replace "$R_E$ $F_0/2$" with --$R_E = F_0/2$--.

In column 22, line 61, immediately after "range" replace "," with --.--.

In column 23, line 7, replace "$\gamma/_E\lambda_o$," with --$\gamma_E/\lambda_o$,--.

In column 26, line 21, replace "F," with --$F_s$--.

In column 26, line 49, replace "(0,2)" with --[0,2]--.

In column 27, line 2, replace "$K_{u2}$" with -$K_{u1}$--.

In column 29, line 28, replace "I/0" with --I/O--.

In column 31, line 25, immediately after "FIG. 6)" replace "," with --.--.

UNITED STATES PATENT AND TRADEMARK OFFICE
CERTIFICATE OF CORRECTION

PATENT NO. : 5,549,111
DATED : August 27, 1996
INVENTOR(S) : Wright et al.

It is certified that error appears in the above-identified patent and that said Letters Patent is hereby corrected as shown below:

In column 36, line 44, replace "Diqital" with --Digital--.

In column 37, line 38, replace "$\lambda_o c/F_o$" with --$\lambda_o = c/F_o$--.

In column 39, line 2, begin a new paragraph immediately after ".".

In column 41, line 64, replace "R-194" with --C-194--.

In column 41, line 65, replace "C-198" with --C-196--.

In column 49, line 47, replace "hen" with --then--.

In column 49, lines 55-56 replace "T-$T_{break}$) with --(t-$T_{break}$)--.

In Claim 18, line 2, immediately after "of" replace ";" with --:--.

In Claim 59, line 3, replace "pats" with --paths--.

UNITED STATES PATENT AND TRADEMARK OFFICE
CERTIFICATE OF CORRECTION

PATENT NO. : 5,549,111
DATED : August 27, 1996
INVENTOR(S) : Wright et al.

It is certified that error appears in the above-identified patent and that said Letters Patent is hereby corrected as shown below:

In Claim 69, line 27, replace "frequency-for" with --frequency for--.

Signed and Sealed this

Twenty-eighth Day of April, 1998

Attest:

BRUCE LEHMAN

Attesting Officer

Commissioner of Patents and Trademarks